United States Patent
Ochi et al.

(10) Patent No.: US 10,358,971 B2
(45) Date of Patent: Jul. 23, 2019

(54) CONTROL APPARATUS FOR INTERNAL COMBUSTION ENGINE

(71) Applicant: TOYOTA JIDOSHA KABUSHIKI KAISHA, Toyota-shi, Aichi (JP)

(72) Inventors: Yuta Ochi, Susono (JP); Toshimi Kashiwagura, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 143 days.

(21) Appl. No.: 15/511,846

(22) PCT Filed: Aug. 31, 2015

(86) PCT No.: PCT/JP2015/004431
§ 371 (c)(1),
(2) Date: Mar. 16, 2017

(87) PCT Pub. No.: WO2016/042718
PCT Pub. Date: Mar. 24, 2016

(65) Prior Publication Data
US 2017/0284282 A1 Oct. 5, 2017

(30) Foreign Application Priority Data
Sep. 18, 2014 (JP) ................. 2014-190459

(51) Int. Cl.
*F02B 23/10* (2006.01)
*F02D 41/00* (2006.01)
(Continued)

(52) U.S. Cl.
CPC ........ *F02B 23/101* (2013.01); *F02D 41/0057* (2013.01); *F02D 41/3011* (2013.01);
(Continued)

(58) Field of Classification Search
CPC .............. F02B 23/101; F02B 2023/103; F02D 41/3011; F02D 41/3023; F02D 41/40;
(Continued)

(56) References Cited

U.S. PATENT DOCUMENTS

| 4,621,599 A | 11/1986 | Igashira et al. |
| 6,101,998 A * | 8/2000 | Tamura ............... F02D 41/3029 123/295 |

(Continued)

FOREIGN PATENT DOCUMENTS

| CN | 1367861 A | 9/2002 |
| DE | 102015210745 A1 | 12/2015 |

(Continued)

OTHER PUBLICATIONS

Communication dated Jul. 17, 2018 from the U.S. Patent and Trademark Office in U.S. Appl. No. 15/482,041.

(Continued)

Primary Examiner — Joseph J Dallo
(74) Attorney, Agent, or Firm — Sughrue Mion, PLLC

(57) ABSTRACT

An object of the invention is to reduce the amount of smoke generated and to improve the stability of diesel combustion in cases where an EGR apparatus is used in an internal combustion engine that performs diesel combustion using fuel having a relatively high self-ignition temperature. A control apparatus performs first injection at a first injection time during the compression stroke, causes spray guide combustion to occur, and starts to perform second injection at such a second injection time that causes combustion of injected fuel to be started by flame generated by the spray guide combustion, thereby causing self-ignition and diffusion combustion of fuel to occur. The apparatus changes the ratio of the first injected fuel quantity to the total fuel injection quantity and the ratio of the second injected fuel (Continued)

quantity to the total fuel injection quantity for the same total fuel injection quantity in one combustion cycle, based on the EGR rate in the intake air.

11 Claims, 22 Drawing Sheets

(51) Int. Cl.
  *F02D 41/30* (2006.01)
  *F02D 41/40* (2006.01)
  *F02D 41/10* (2006.01)
  *F02D 41/12* (2006.01)
  *F02D 41/38* (2006.01)

(52) U.S. Cl.
  CPC ......... *F02D 41/3023* (2013.01); *F02D 41/40* (2013.01); *F02D 41/403* (2013.01); *F02B 2023/103* (2013.01); *F02D 41/10* (2013.01); *F02D 41/12* (2013.01); *F02D 41/3818* (2013.01); *F02D 2041/389* (2013.01); *F02D 2200/021* (2013.01); *F02D 2200/602* (2013.01); *F02D 2250/38* (2013.01); *Y02T 10/125* (2013.01); *Y02T 10/42* (2013.01); *Y02T 10/44* (2013.01); *Y02T 10/47* (2013.01)

(58) Field of Classification Search
  CPC ............... F02D 41/403; F02D 41/0057; F02D 2250/38; F02D 2041/389; F02D 2200/021; Y02T 10/42; Y02T 10/47; Y02T 10/44; Y02T 10/125
  See application file for complete search history.

(56) References Cited

U.S. PATENT DOCUMENTS

| | | | | |
|---|---|---|---|---|
| 6,659,073 | B1* | 12/2003 | Franke | F02D 35/027 123/299 |
| 6,968,825 | B2 | 11/2005 | Hitomi et al. | |
| 7,021,279 | B1* | 4/2006 | Pott | F02B 31/00 123/301 |
| 7,171,953 | B2 | 2/2007 | Altenschmidt | |
| 7,204,228 | B2 | 4/2007 | Oechsle et al. | |
| 7,314,036 | B2 | 1/2008 | Altenschmidt | |
| 7,370,616 | B2* | 5/2008 | Kuo | F01L 1/344 123/568.14 |
| 7,441,537 | B2 | 10/2008 | Szekely, Jr. et al. | |
| 7,565,892 | B1* | 7/2009 | Cleary | F02B 17/005 123/295 |
| 7,603,226 | B2* | 10/2009 | Henein | F02D 35/021 701/109 |
| 7,723,257 | B2* | 5/2010 | Bosteels | B01D 53/9413 123/670 |
| 8,091,536 | B2* | 1/2012 | Munshi | C10L 3/06 123/525 |
| 8,469,009 | B2* | 6/2013 | Munshi | C10L 3/06 123/525 |
| 9,745,914 | B2 | 8/2017 | Ochi et al. | |
| 2002/0007816 | A1* | 1/2002 | Zur Loye | F02B 1/04 123/295 |
| 2002/0026921 | A1* | 3/2002 | Ueno | F02D 37/02 123/295 |
| 2005/0257769 | A1 | 11/2005 | Li et al. | |
| 2006/0005804 | A1* | 1/2006 | Kuo | F02M 26/01 123/295 |
| 2006/0005818 | A1* | 1/2006 | Kuo | F02D 13/0207 123/568.13 |
| 2006/0196466 | A1* | 9/2006 | Kuo | F01L 1/344 123/295 |
| 2006/0196467 | A1* | 9/2006 | Kang | F02B 47/08 123/305 |
| 2006/0196468 | A1* | 9/2006 | Chang | F02D 13/0219 123/305 |
| 2006/0196469 | A1* | 9/2006 | Kuo | F02D 9/02 123/305 |
| 2006/0243241 | A1* | 11/2006 | Kuo | F01L 13/00 123/295 |
| 2007/0220873 | A1* | 9/2007 | Bosteels | B01D 53/9413 60/299 |
| 2008/0040020 | A1* | 2/2008 | Henein | F02D 35/021 701/109 |
| 2009/0120385 | A1* | 5/2009 | Munshi | C10L 3/06 123/3 |
| 2009/0272363 | A1* | 11/2009 | Yun | F02B 1/12 123/295 |
| 2009/0299587 | A1 | 12/2009 | Ueda et al. | |
| 2010/0228466 | A1* | 9/2010 | Ekchian | F02D 13/0215 701/113 |
| 2012/0118267 | A1* | 5/2012 | Kang | F02D 13/0207 123/406.26 |
| 2012/0160221 | A1* | 6/2012 | Munshi | C10L 3/06 123/575 |
| 2012/0191326 | A1* | 7/2012 | Sukegawa | F02D 13/0261 701/105 |
| 2013/0081592 | A1* | 4/2013 | Boer | F02M 53/02 123/299 |
| 2013/0213349 | A1* | 8/2013 | Sellnau | F02B 23/101 123/295 |
| 2015/0128909 | A1* | 5/2015 | Guralp | F02D 41/1454 123/478 |
| 2015/0315957 | A1* | 11/2015 | Bergin | F02B 23/0651 123/295 |
| 2016/0017834 | A1* | 1/2016 | Yun | F02P 5/045 123/406.47 |
| 2016/0053700 | A1 | 2/2016 | Thomas | |
| 2016/0115895 | A1 | 4/2016 | Ochi et al. | |
| 2016/0153376 | A1* | 6/2016 | Katayama | F02D 41/0052 123/445 |
| 2016/0333817 | A1 | 11/2016 | Ochi et al. | |
| 2016/0333818 | A1 | 11/2016 | Ochi et al. | |
| 2017/0107932 | A1 | 4/2017 | Ochi et al. | |
| 2017/0292463 | A1 | 10/2017 | Ochi | |

FOREIGN PATENT DOCUMENTS

| | | |
|---|---|---|
| EP | 0 952 323 A2 | 10/1999 |
| EP | 1445461 A2 | 8/2004 |
| JP | 2000038950 A | 2/2000 |
| JP | 2002-276442 A | 9/2002 |
| JP | 2003506608 A | 2/2003 |
| JP | 2003-254105 A | 9/2003 |
| JP | 2009-228641 A | 10/2009 |
| JP | 2009264332 A | 11/2009 |
| JP | 2009287526 A | 12/2009 |
| JP | 2010-90847 A | 4/2010 |
| JP | 2011-153562 A | 8/2011 |
| JP | 2015-137585 A | 7/2015 |
| JP | 2015-137586 A | 7/2015 |
| JP | 2016-969 A | 1/2016 |
| WO | 2016/042718 A1 | 3/2016 |

OTHER PUBLICATIONS

International Search Report for PCT/JP2015/004431 dated Jan. 4, 2016 [PCT/ISA/210].
Written Opinion for PCT/JP2015/004431 dated Jan. 4, 2016 [PCT/ISA/237].
Communication dated Jan. 11, 2019 from the United States Patent and Trademark Office in U.S. Appl. No. 15/482,041.
Notice of Allowance dated Apr. 4, 2019, which was issued for related U.S. Appl. No. 15/482,041.
Notice of Allowance dated May 20, 2019, which issued during the prosecution of U.S. Appl. No. 15/482,041.

* cited by examiner

[Fig. 1]
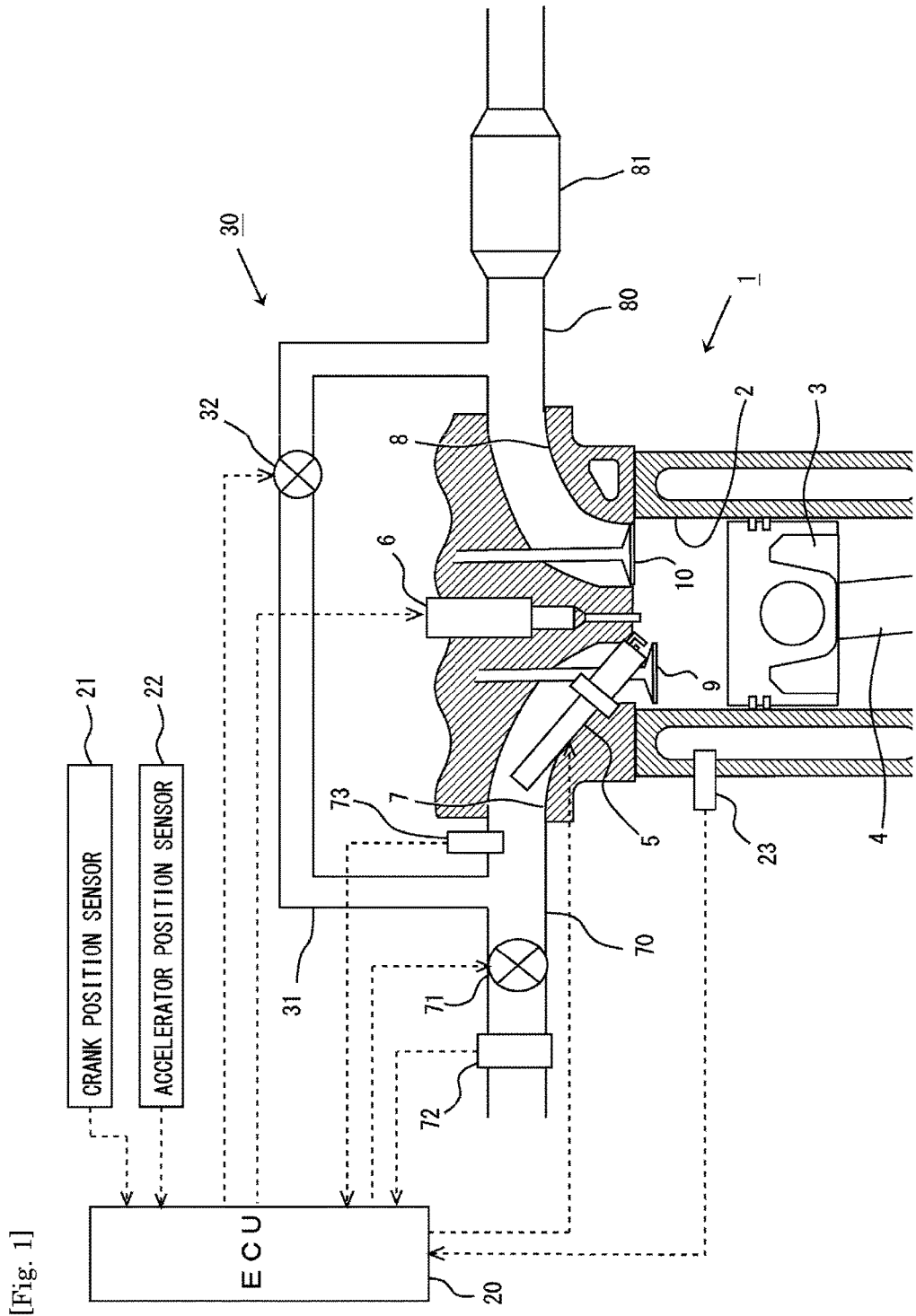

[Fig. 2]
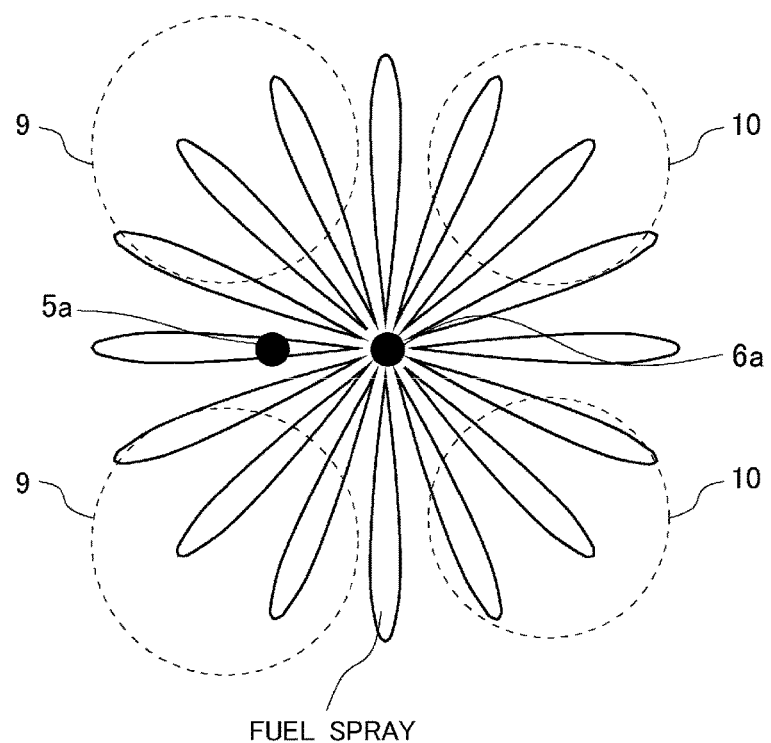
FUEL SPRAY

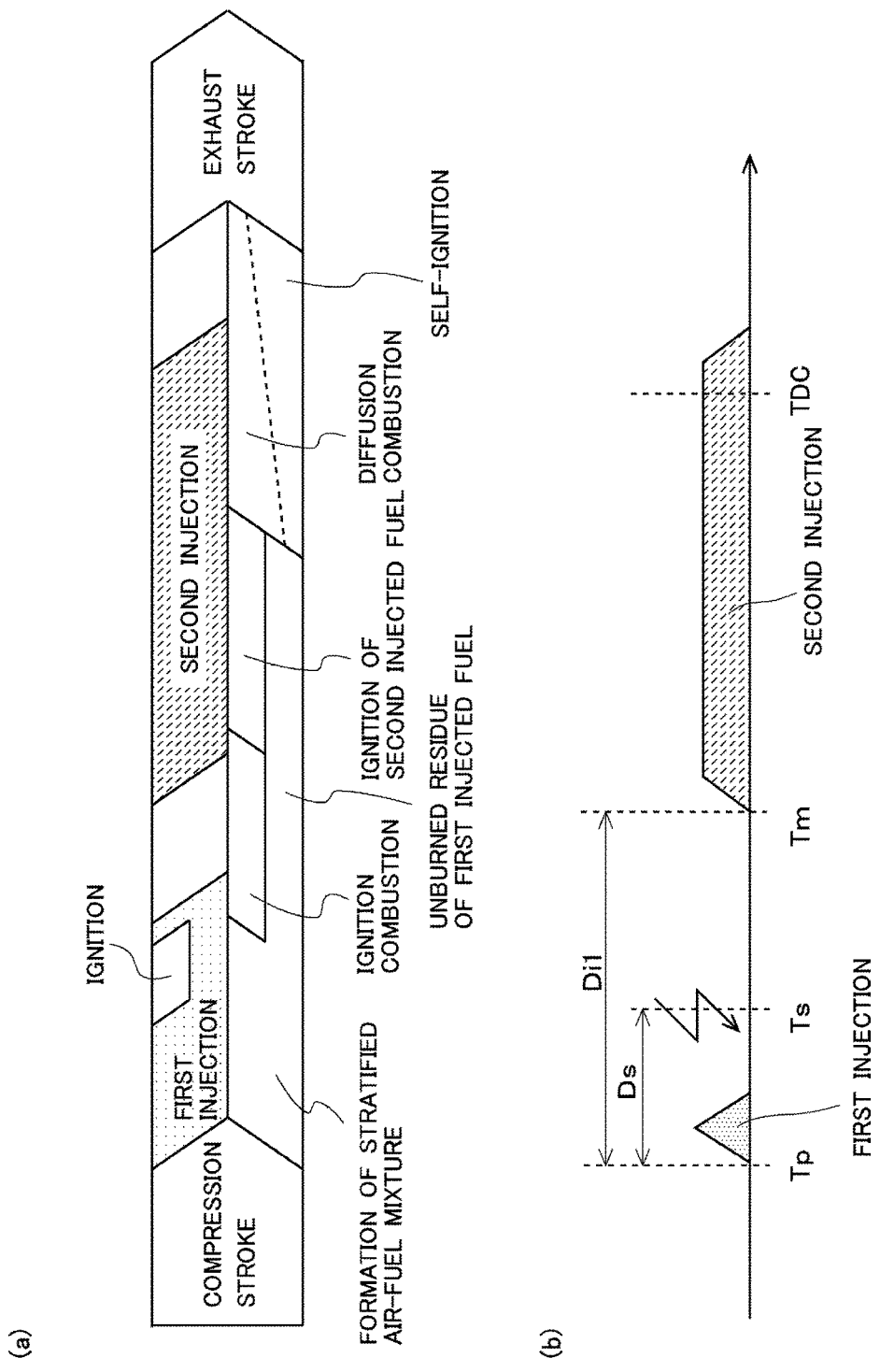

[Fig. 4]
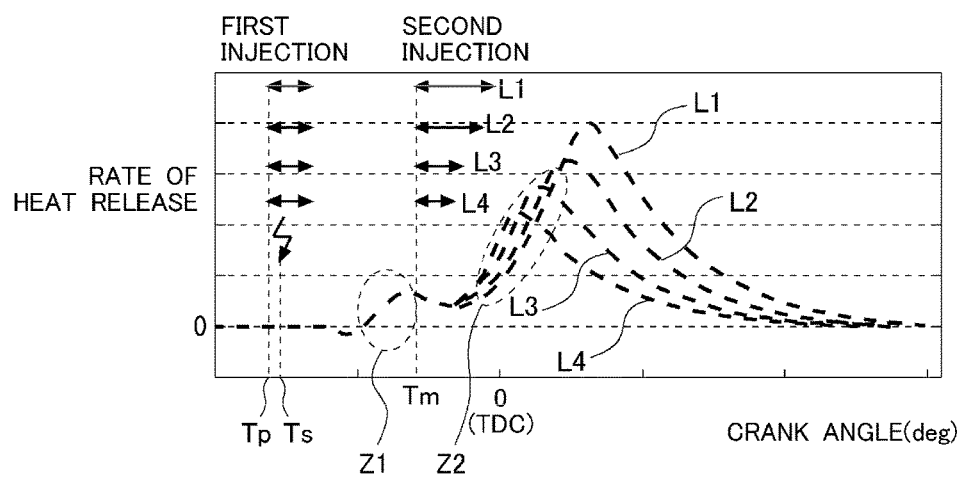

[Fig. 5]
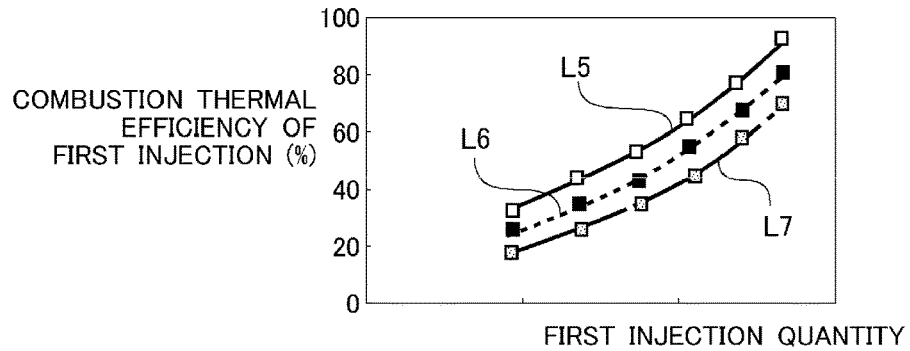
[Fig. 6]
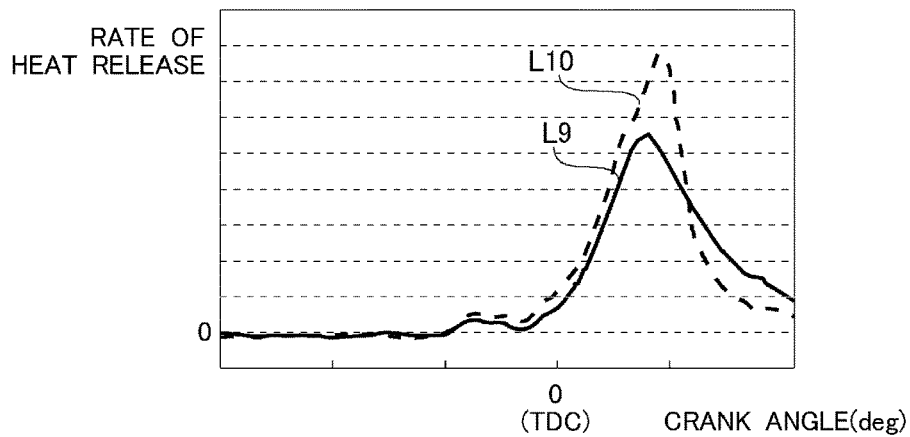
[Fig. 7]
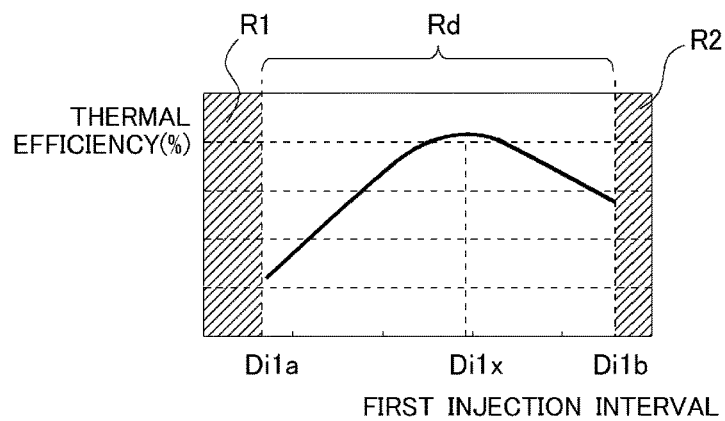

[Fig. 8]
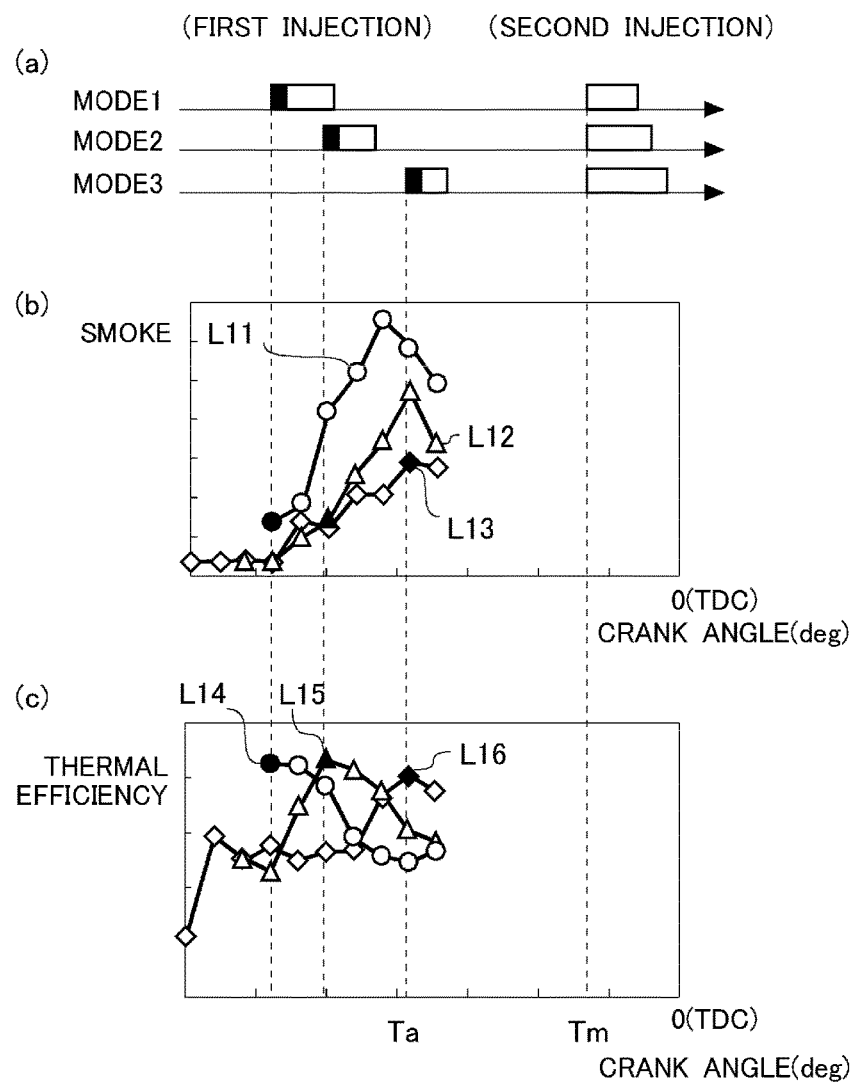

[Fig. 9]
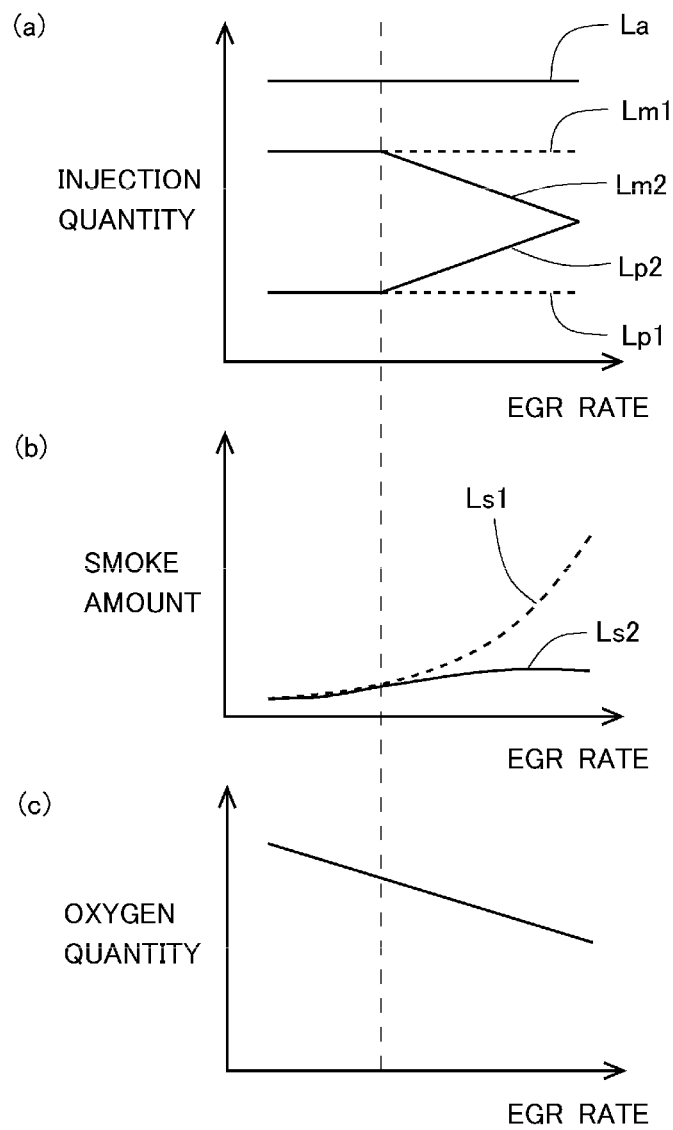

[Fig. 10]
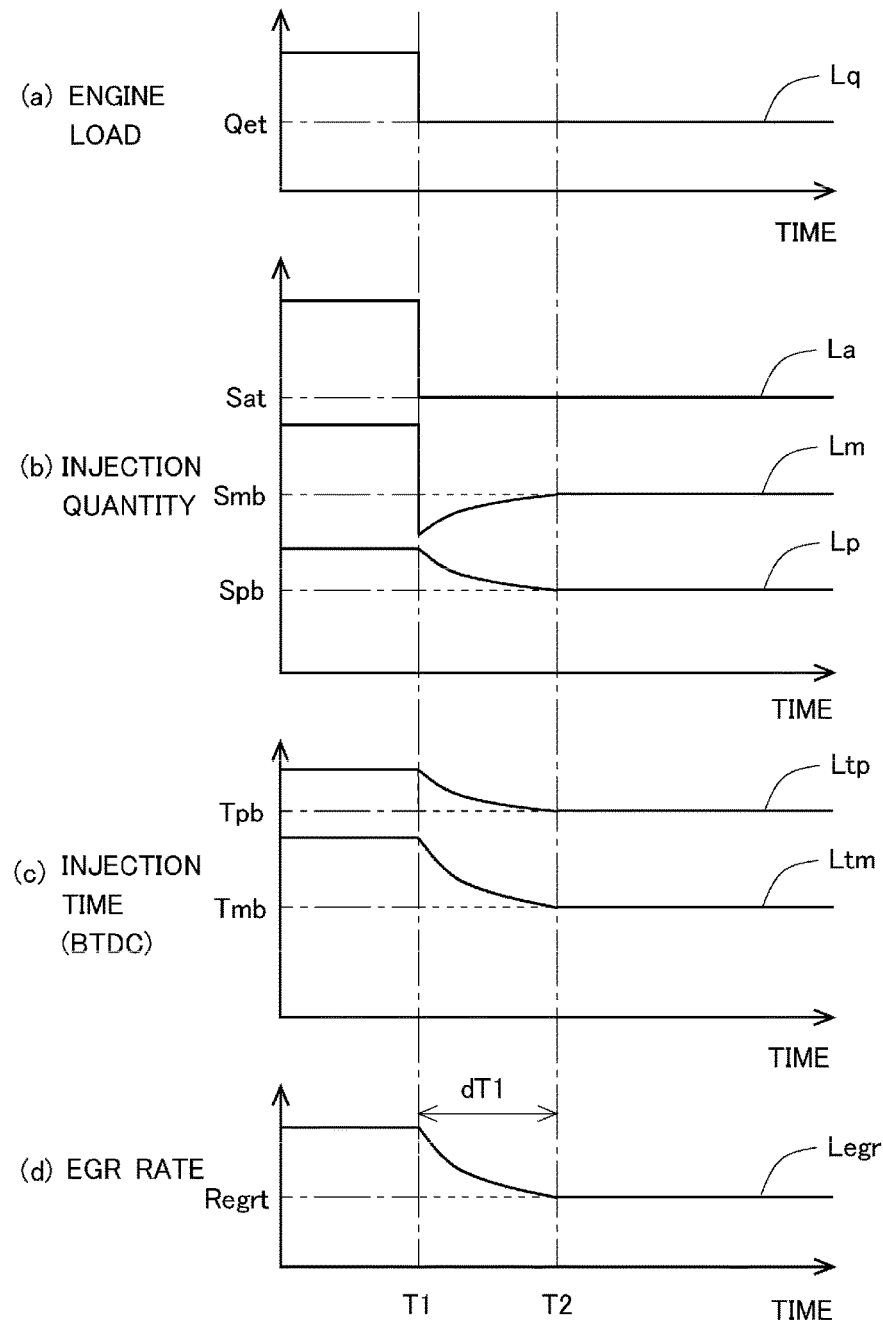

[Fig. 11]
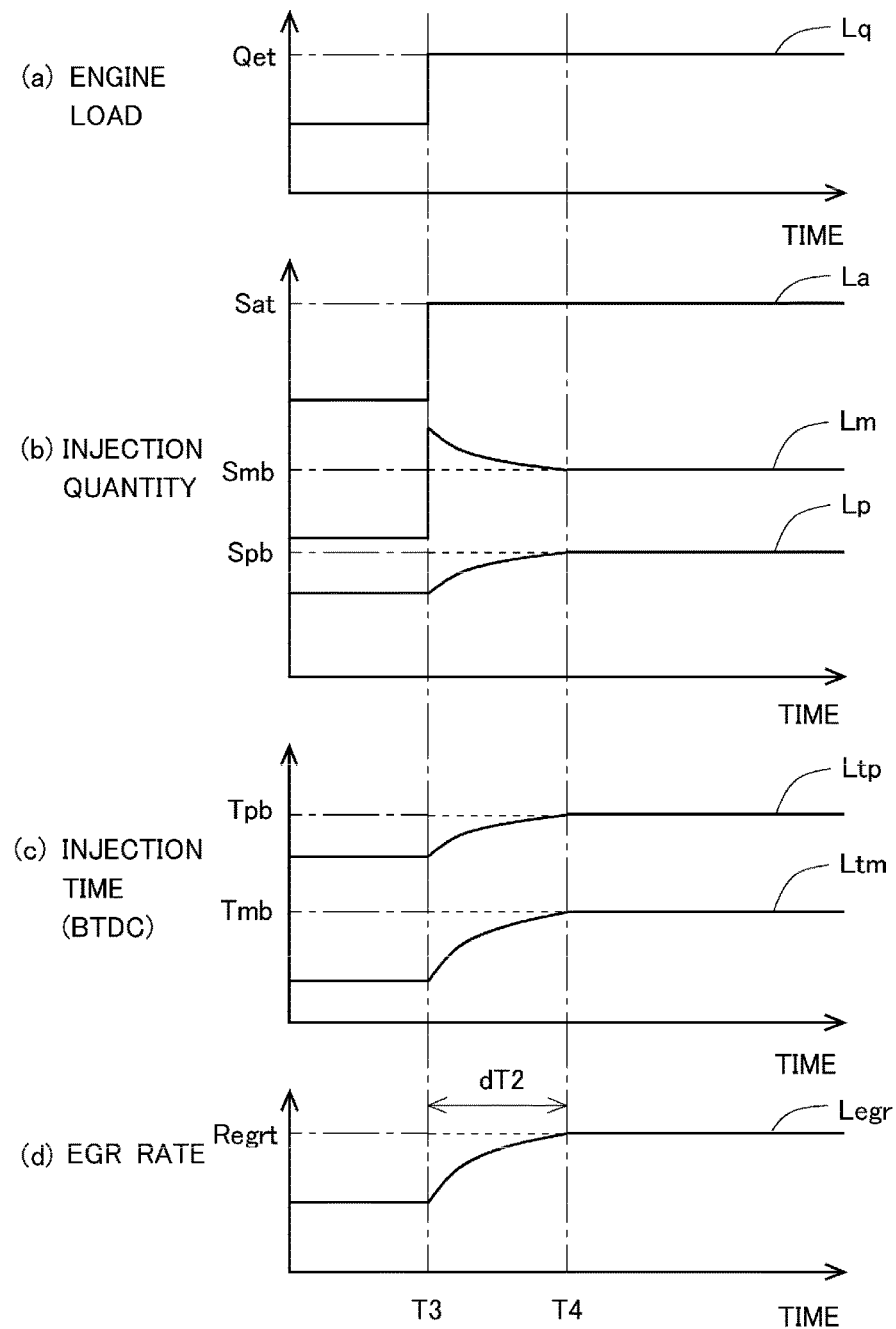

[Fig. 12]
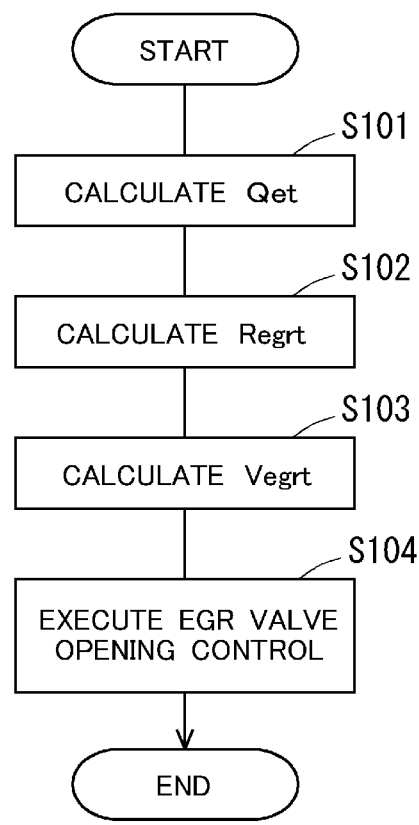

[Fig. 13]
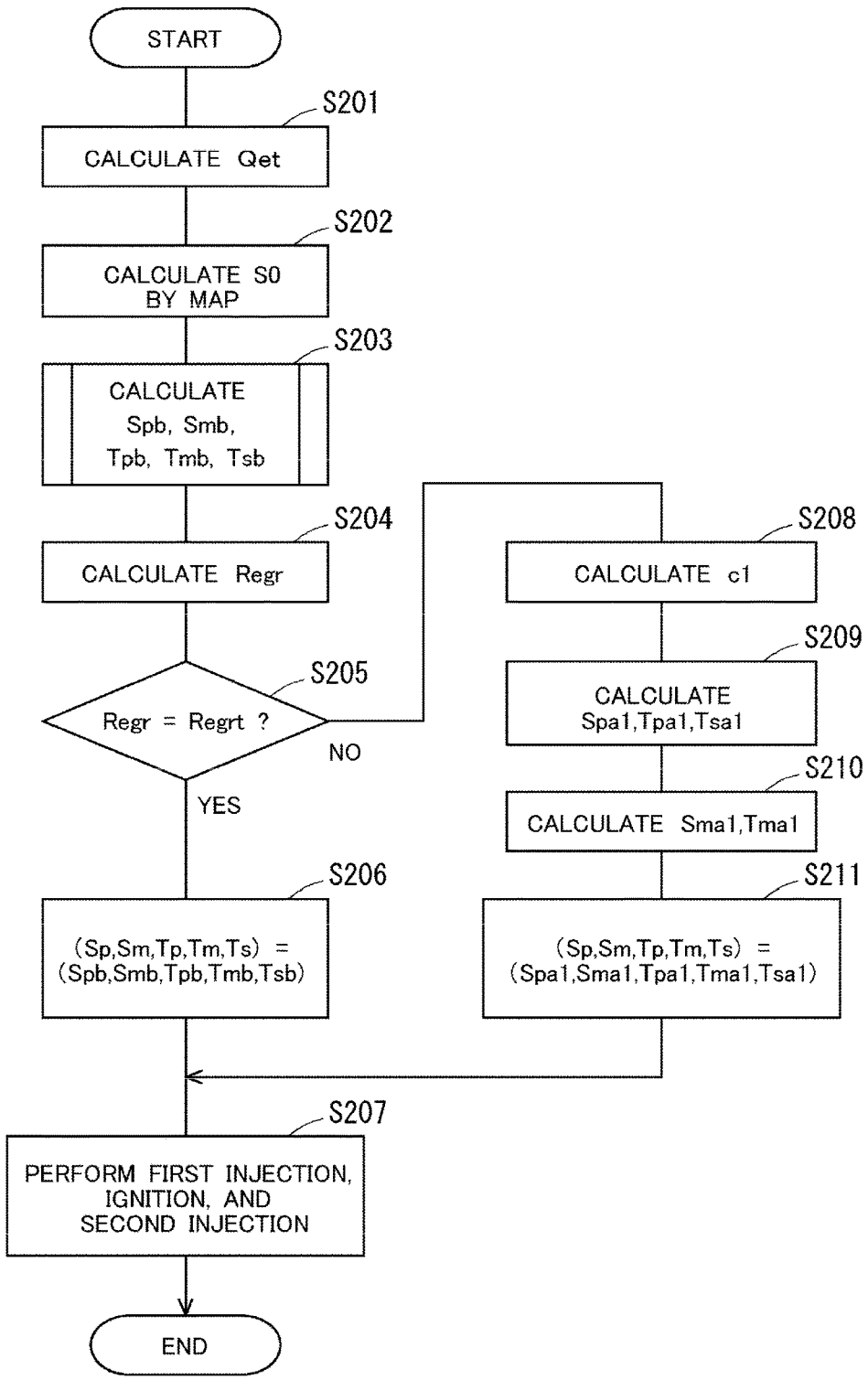

[Fig. 14]
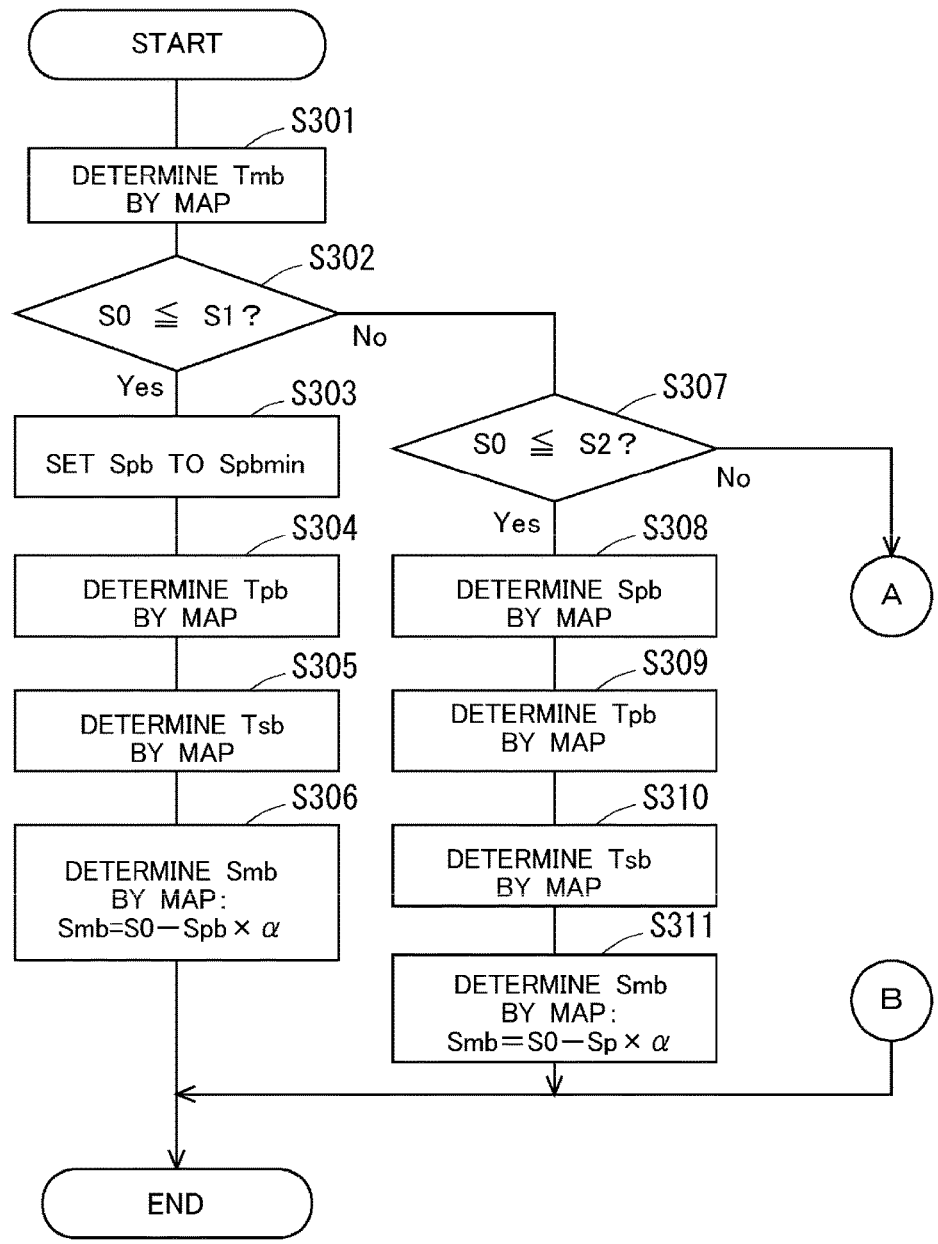

[Fig. 15]
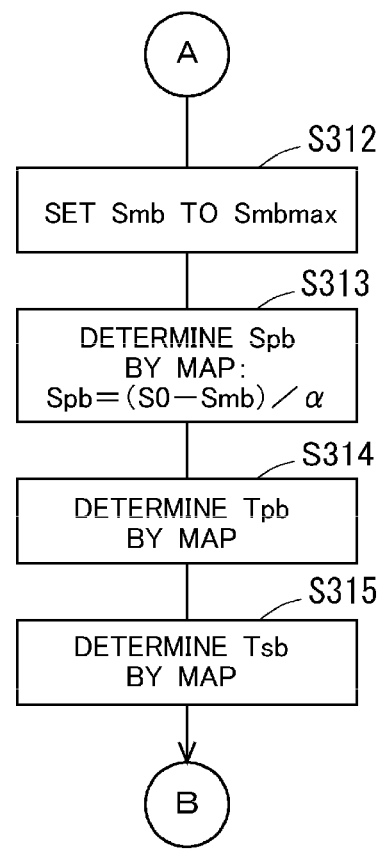

[Fig. 16]
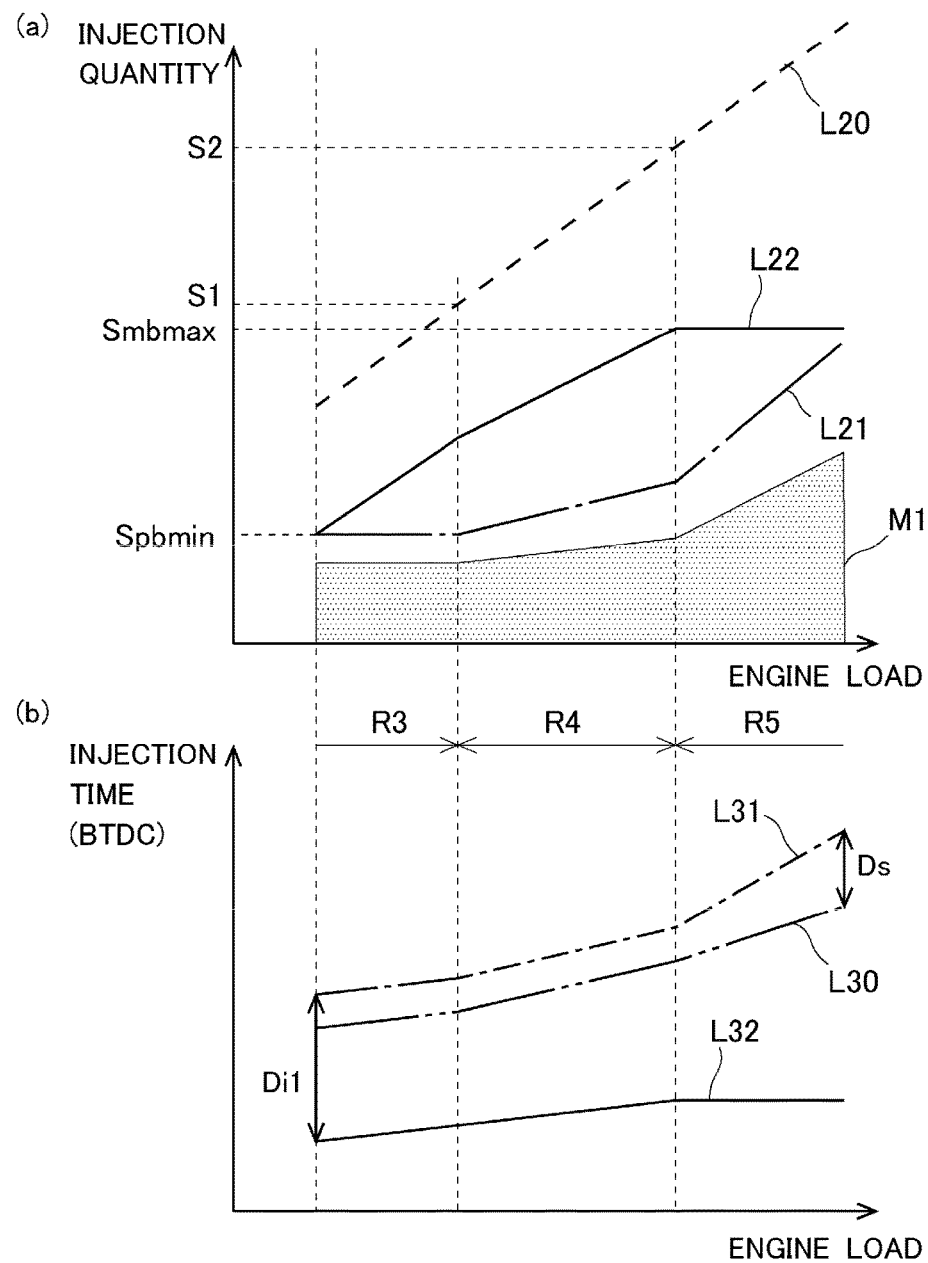

[Fig. 17]
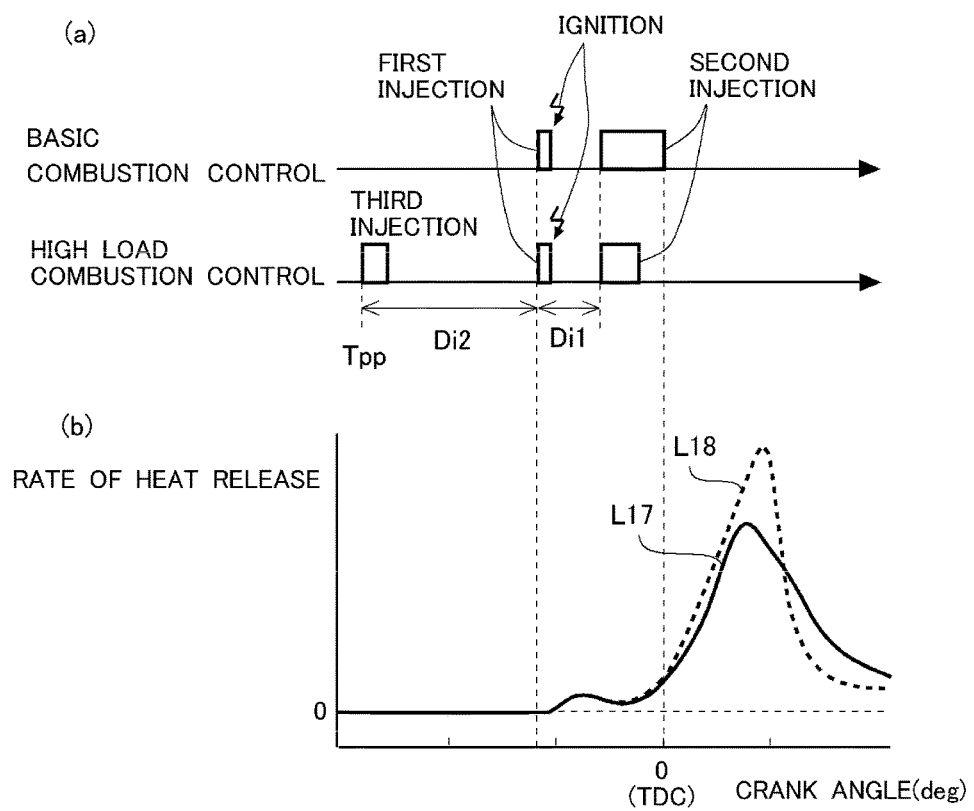

[Fig. 18]
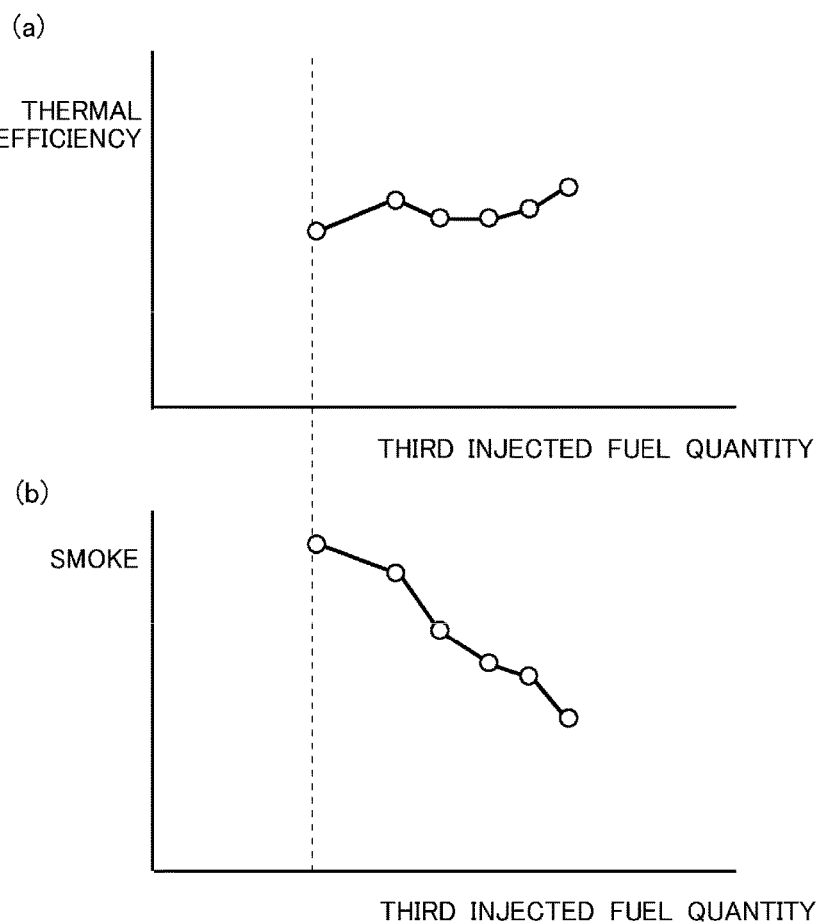

[Fig. 19]
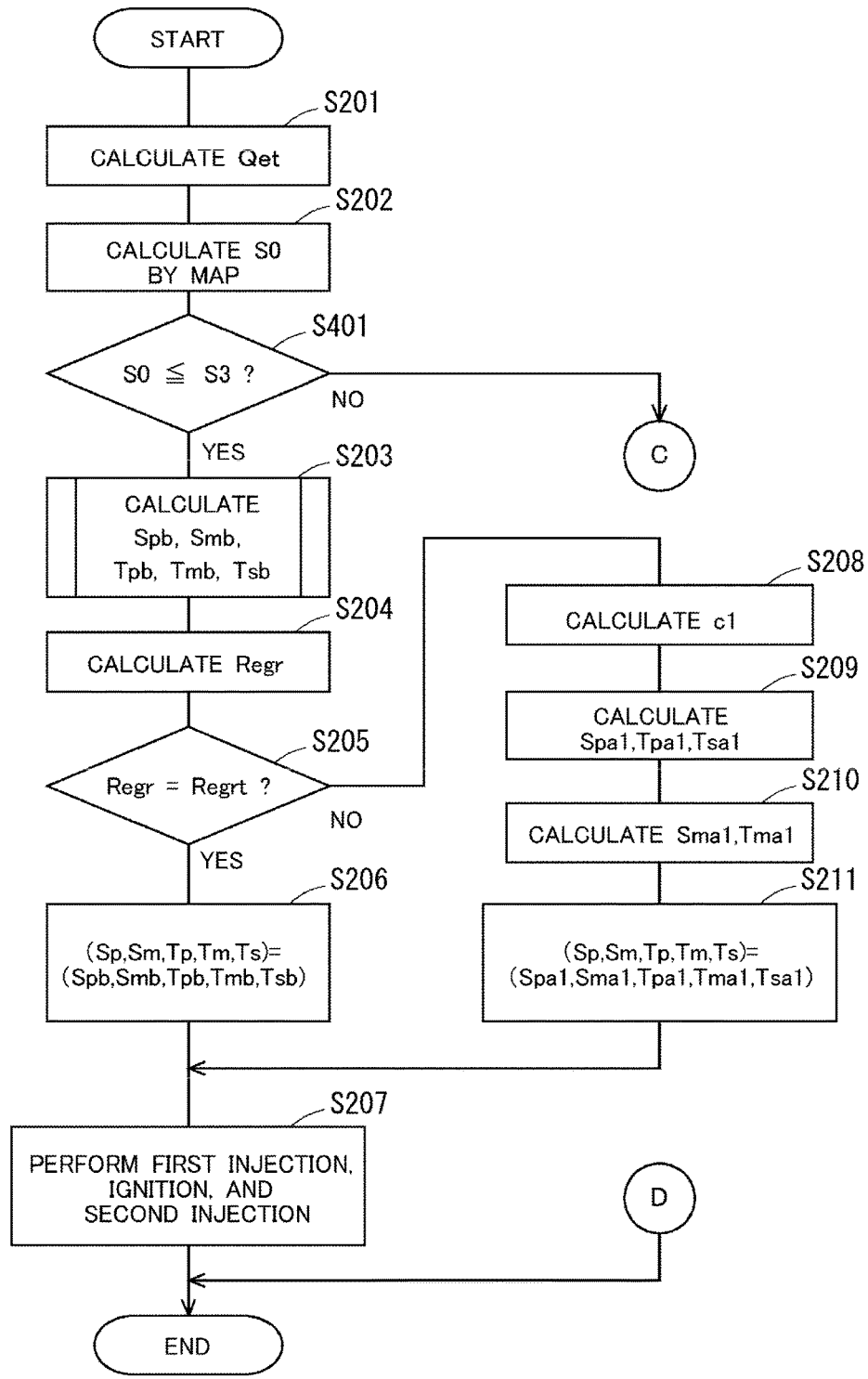

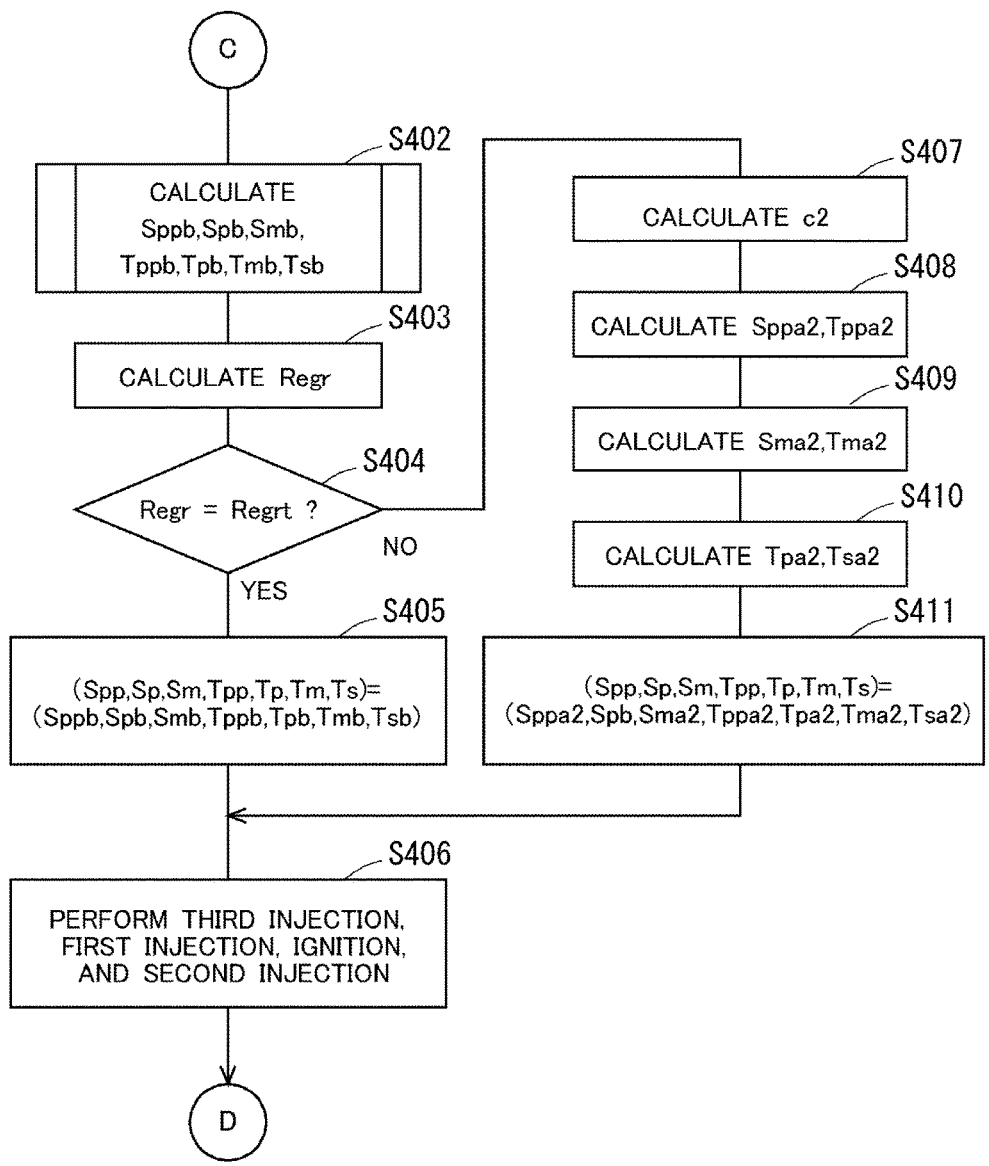
[Fig. 20]

[Fig. 21]
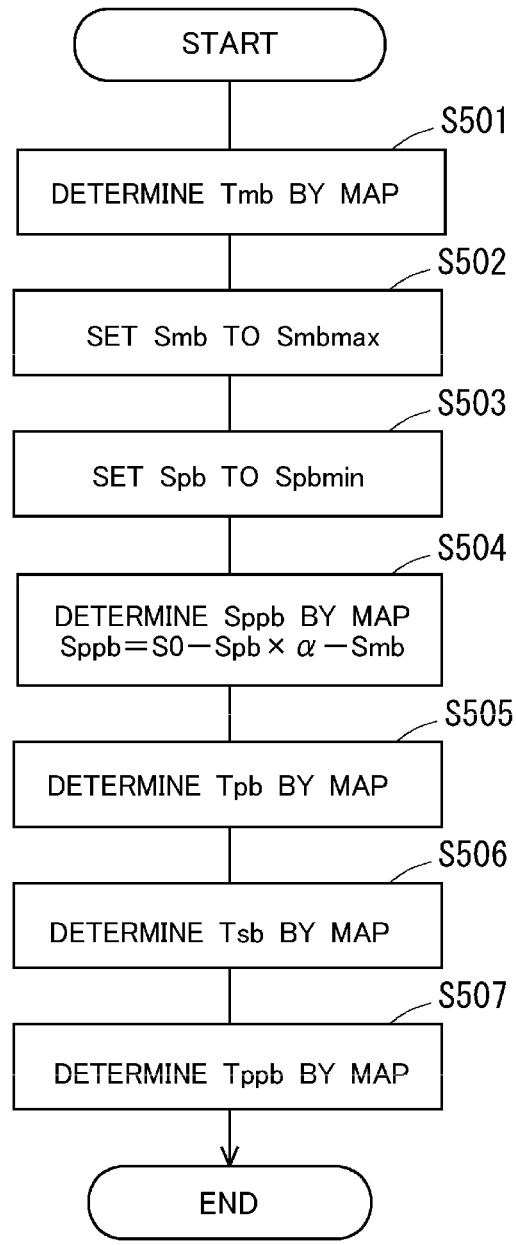

[Fig. 22]
(a)
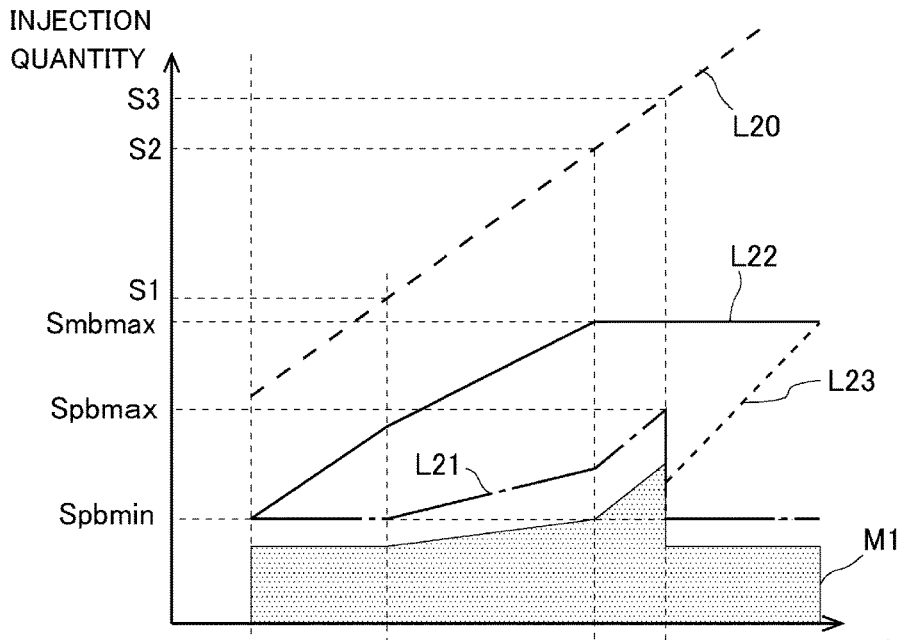
(b)
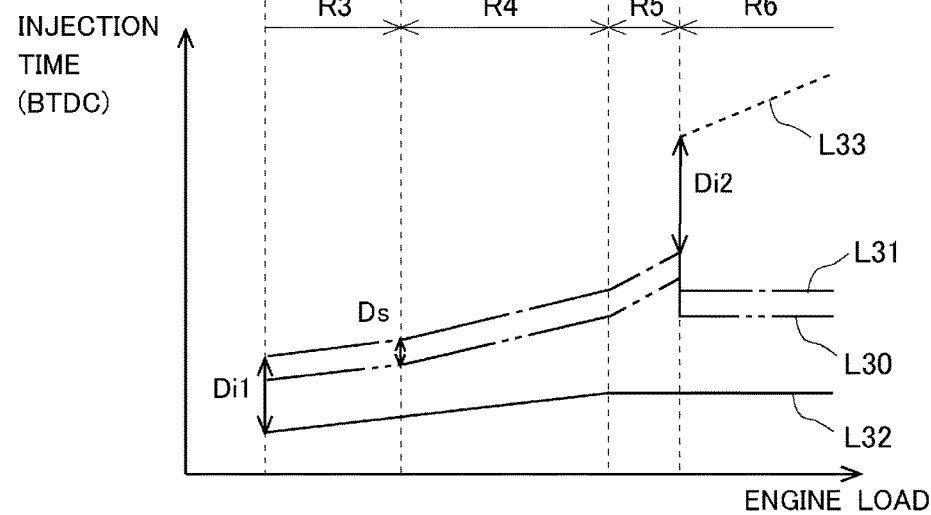

[Fig. 23]
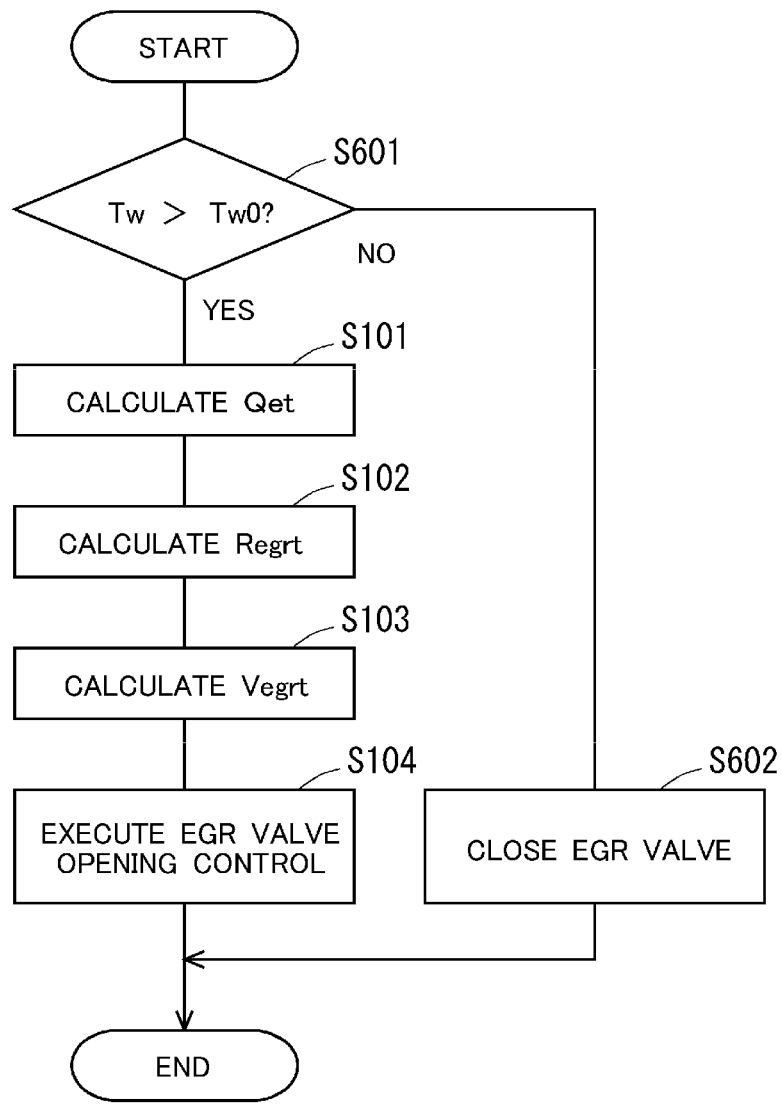

[Fig. 24]
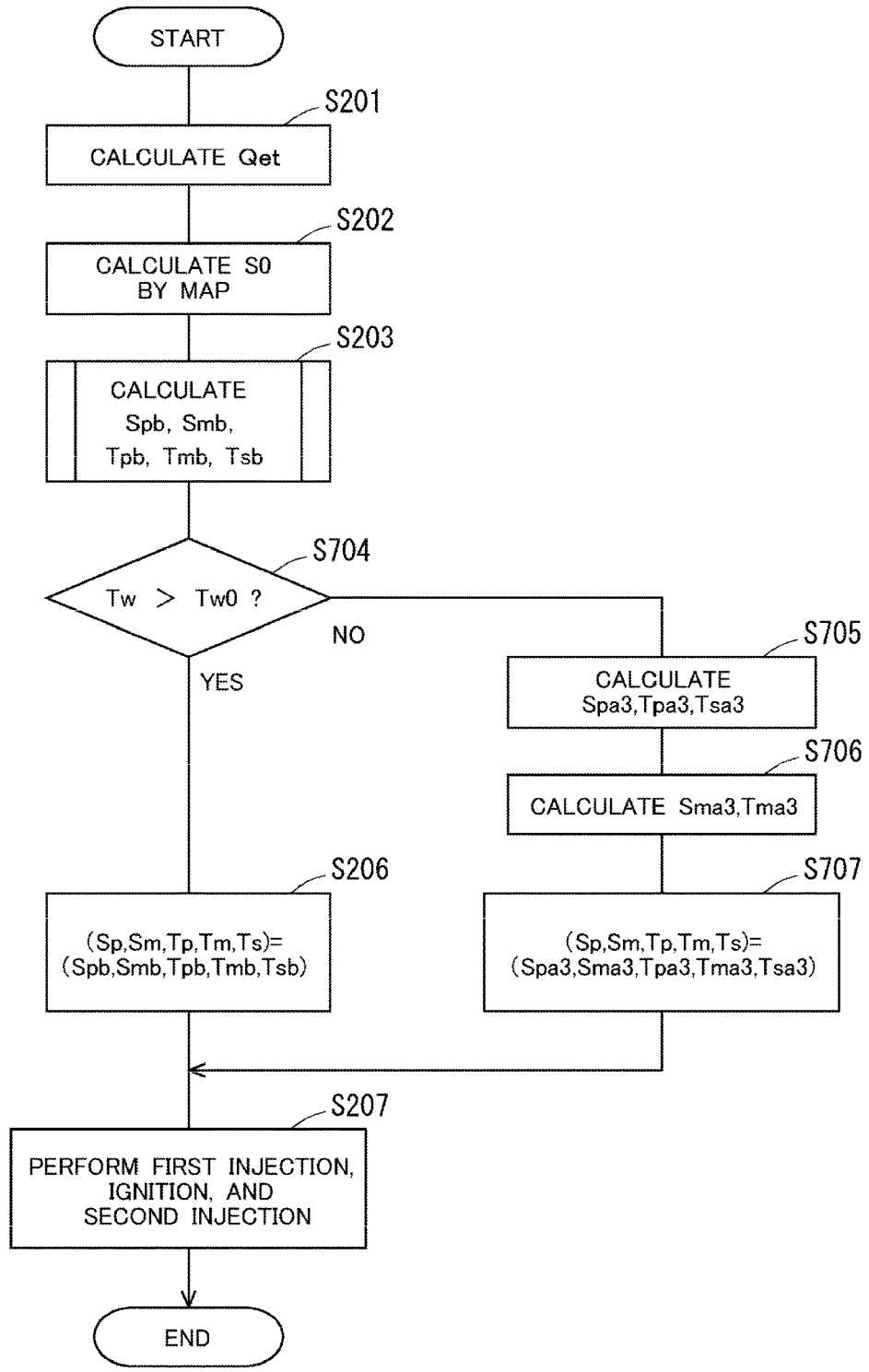

US 10,358,971 B2

CONTROL APPARATUS FOR INTERNAL COMBUSTION ENGINE

CROSS REFERENCE TO RELATED APPLICATIONS

This application is a National Stage of International Application No. PCT/JP2015/004431, filed on Aug. 31, 2015, which claims priority from Japanese Patent Application No. 2014-190459, filed on Sep. 18, 2014, the contents of all of which are incorporated herein by reference in their entirety.

TECHNICAL FIELD

The present invention relates to a control apparatus for an internal combustion engine.

BACKGROUND ART

What is called diesel combustion, in which fuel is directly injected into compressed air in the combustion chamber, self-ignites, and is burned by diffusion combustion, has a higher thermal efficiency as compared to combustion by spark ignition. In recent years, in order to enjoy this advantage of diesel combustion also in gasoline engines, technology for causing gasoline to self-ignite and burn by diffusion combustion has been developed.

PTL 1 discloses a technology enabling diesel combustion using as fuel natural gas or the like having a relatively high self-ignition temperature. According to PTL 1 disclosing this technology, fuel injection is performed in a predetermined spark-ignition region in the combustion chamber in an early or middle stage of the compression stroke to form air-fuel mixture that can be spark-ignited. Then, the air-fuel mixture formed in the spark-ignition region is ignited at a time immediately before the top dead center of the compression stroke to bring about combustion by spark ignition. Thus, a high-temperature, high-pressure condition enabling self-ignition of natural gas is established in the combustion chamber. Thereafter, fuel is injected directly into the combustion chamber in a high-temperature, high-pressure condition, so that the injected fuel is burned by diesel combustion.

It is well known to provide what is called an EGR apparatus in the internal combustion engine that performs diesel combustion. The EGR apparatus supplies a portion of exhaust gas flowing in the exhaust passage into the intake passage as EGR gas in order to reduce the amount of NOx generated. In the internal combustion engine equipped with such an EGR apparatus, when the EGR rate (the proportion of the quantity of the EGR gas in the intake air) is changed in response to a change in the operation state of the internal combustion engine, there is a delay in the change in the EGR rate from the change in the fuel injection quantity. If the EGR rate deviates from a range suitable for the operation state of the internal combustion engine due to this response delay in the EGR rate, there is a possibility that the torque of the internal combustion engine and/or the combustion noise cannot meet the requirements. PTL 2 discloses a technology that solves this problem in internal combustion engines in which EGR gas is supplied into the intake passage. In this technology, fuel injection parameters such as the injection time of main fuel injection performed at a time near the top dead center of the compression stroke, the injection quantity in sub-fuel injection performed prior to the main fuel injection, and/or the interval between the sub-fuel injection and the main fuel injection are corrected using a predetermined correction gain, during transient operation.

PTL 3 discloses a technology applied to an internal combustion engine having a plurality of cylinders. In this technology, during transient operation, a combustion parameter for each of the cylinders is controlled based on the distance from the EGR valve to the cylinder along the flow path of the EGR gas.

CITATION LIST

Patent Literature

PTL 1: Japanese Patent Application Laid-Open No. 2003-254105
PTL 2: Japanese Patent Application Laid-Open No. 2010-090847
PTL 3: Japanese Patent Application Laid-Open No. 2009-228641

SUMMARY OF INVENTION

Technical Problem

An object of the present invention is to reduce the amount of smoke generated and to improve the stability of diesel combustion in cases where an EGR apparatus is used in an internal combustion engine that performs diesel combustion using fuel having a relatively high self-ignition temperature, such as gasoline.

Solution to Problem

In the apparatus according to the present invention, first injection is performed during the compression stroke by a fuel injection valve capable of injecting fuel into the combustion chamber of the internal combustion engine, and the fuel injected by the first injection (which will be sometimes referred to as the "first injected fuel") is ignited by spark ignition. Thereafter, second injection that mainly determines the power of the internal combustion engine is started at a time before the top dead center of the compression stroke. As a consequence, combustion of the fuel injected by the second injection (which will be sometimes referred to as the "second injected fuel") is started by flame generated by spark ignition of the first injected fuel, and self-ignition and diffusion combustion of fuel occur.

The apparatus according to the present invention changes the ratio of the first injected fuel quantity to the total fuel injection quantity and the ratio of the second injected fuel quantity to the total fuel injection quantity for the same total fuel injection quantity in one combustion cycle, based on the EGR rate in the intake air.

More specifically, a control apparatus for an internal combustion engine according to the present invention comprises:
a fuel injection valve capable of injecting fuel into a combustion chamber of an internal combustion engine;
an EGR apparatus that supplies a portion of exhaust gas flowing in an exhaust passage of the internal combustion engine into an intake passage of the internal combustion engine as EGR gas through an EGR passage;
an ignition device whose position relative to said fuel injection valve is set in such a way that fuel spray injected through said fuel injection valve passes through an ignition-capable region and the ignition device can ignite the fuel spray directly; and a combustion control unit that performs first injection through said fuel injection valve at a first injection time during the compression stroke, ignites pre-spray formed by the first injection by said ignition device, and starts to perform second injection through said fuel injection valve at a second injection time after the ignition of said pre-spray by said ignition device and before the top dead center of the compression stroke with a predetermined first injection interval between said first injection time and said second injection time, said first injection interval being set in such a way that combustion of the injected by said second injection fuel is started by flame generated by ignition of said pre-spray, thereby causing self-ignition of fuel to occur and causing at least a portion of fuel injected by said second injection to be burned by diffusion combustion, wherein said combustion control unit performs first fuel injection control to make the ratio of the fuel injection quantity in said first injection to the total fuel injection quantity higher when the EGR rate in the intake air of the internal combustion engine is high than when the EGR rate is low for the same total fuel injection quantity in one combustion cycle.

In the apparatus according to the present invention, the position of the ignition device relative to the fuel injection valve is set in such a way that the ignition device can directly ignite passing fuel spray, which is fuel spray injected through the fuel injection valve and passing through the ignition-capable region. In a known typical mode of igniting fuel spray, air-fuel mixture is brought to the ignition-capable region of the ignition device by means of gas flow formed in the combustion chamber when the intake valve is opened or utilizing the shape of a cavity or the like located on top of the piston, so that the fuel spray is ignited by the ignition device. In such a generally employed mode of ignition, in order to enable satisfactory ignition of fuel spray, the injection time at which injection through the injection valve is to be performed is limited by the opening time of the intake valve, the position of the piston in the cylinder, and other factors. In contrast to this, in the control apparatus for an internal combustion engine according to the present invention, since the relative position of the fuel injection valve and the ignition device is set relative to each other as described above, control of the fuel injection time and the ignition time has very high flexibility, enabling control of fuel injections by the combustion control unit, which will be described later. Preferably, the ignition device employed with the present invention is adapted to be capable of directly igniting the passing fuel spray injected through the fuel injection valve at desired time regardless of the opening time of the intake valve or the piston position of the internal combustion engine.

In the combustion control according to the present invention, the first injection is firstly performed at the first injection time during the compression stroke, and the pre-spray formed by the first injected fuel is ignited by the ignition device. Then, after the second injection is started at the second injection time before the top dead center of the compression stroke, self-ignition and diffusion combustion of fuel occur. Although the second injection is started at a time before the top dead center of the compression stroke, it may continue past the top dead center of the compression stroke.

The interval between the first injection time and the second injection time is a predetermined first injection interval. The first injection interval is set in such a way that combustion of the second injected fuel is started by flame generated by ignition of the pre-spray. In other words, the first injection time is not set as an arbitrary time during the compression stroke but determined in relation to the second injection time in such a way that ignition of the first injected fuel can generate flame serving as an ignition source for combustion of the second injected fuel. After combustion of the second fuel starts, the temperature and pressure in the combustion chamber rise, so that self-ignition of fuel occurs, and at least a portion of the second injected fuel is burned by diffusion combustion. Only a part of the first injected fuel is burned by propagation of flame generated by ignition by the ignition device, and a large part of the first injected fuel remains unburned. The unburned residue of the first injected fuel is burned by self-ignition or diffusion combustion after the start of the second injection. In consequence, in the above-described combustion control, the first injected fuel and the second injected fuel both contribute to the power of the internal combustion engine. Therefore, diesel combustion having high thermal efficiency can be brought about.

In the apparatus according to the present invention, a portion of the exhaust gas is supplied as EGR gas to the internal combustion engine by the EGR apparatus. If the flow rate of the intake air is the same, the higher the EGR rate in the intake air is, the smaller the quantity of oxygen in the combustion chamber is. Therefore, when the EGR rate is high, there is a possibility that it may be difficult to provide a sufficient quantity of oxygen needed to burn the second injected fuel satisfactorily in a region in which fuel spray is formed when the second injection is performed. Deficiency of oxygen available for combustion of the second injected fuel leads to an increase in the amount of smoke generated. Moreover, if the flow rate of the intake air is the same, the higher the EGR rate in the intake air is, the larger the quantity of inert gas in the combustion chamber is. Therefore, when the EGR rate is high, there is a possibility that ignitability in ignition of the pre-spray of the first injected fuel by the ignition device may be deteriorated. Deterioration in the ignitability in ignition of the pre-spray leads to instability in diesel combustion.

On the other hand, when the EGR rate in the intake air becomes low, the quantity of inert gas in the combustion chamber becomes small, and therefore combustion in the combustion chamber is promoted. Consequently, the quantity of fuel burned by propagation of flame generated by ignition of the pre-spray of the first injected fuel by the ignition device increases. In other words, the quantity of oxygen consumed in combustion of the first injected fuel before the second injection is performed increases. For this reason, when the EGR rate becomes low, even though the quantity of oxygen supplied into the combustion chamber increases, there is a possibility that an excessive increase in the quantity of oxygen consumed in combustion of the first injected fuel may make it difficult to provide a sufficient quantity of oxygen needed to burn the second injected fuel satisfactorily when the second injection is performed. This also leads to an increase in the amount of smoke generated.

In the apparatus according to the present invention, the ratio of the first injected fuel quantity to the total fuel injection quantity (which will be sometimes referred to as the "first injection ratio", hereinafter) is made higher when the EGR rate in the intake air of the internal combustion engine is high than when the EGR rate is low, for the same total fuel injection quantity in one combustion cycle. In other words, the ratio of the second injected fuel quantity to the total fuel injection quantity (which will be sometimes referred to as the "second injection ratio", hereinafter) is made lower when EGR rate in the intake air of the internal combustion engine is high than when the EGR rate is low, for the same total fuel injection quantity in one combustion cycle. Thus, appropriate balance between the first injected fuel quantity and the second injected fuel quantity can be maintained for the EGR rate. Specifically, the following advantageous effects can be enjoyed.

As the second injection ratio is made lower when the EGR rate is high than when the EGR rate is low, the smaller the quantity of oxygen in the combustion chamber is, the smaller the quantity of fuel existing in the region in which fuel spray is formed at the time when the second injection is performed can be made. Therefore, deficiency in the quantity of oxygen available for combustion of the second injected fuel can be prevented. Consequently, the amount of smoke generated can be reduced. Furthermore, as the first injection ratio is made higher when the EGR rate is high than when the EGR rate is low, the larger the quantity of inert gas in the combustion chamber is, the larger the quantity of fuel ignited by the ignition device can be made. Therefore, deterioration in the ignitability in ignition of the pre-spray by the ignition device can be prevented. Consequently, the stability of diesel combustion can be improved.

The higher the EGR rate is, the larger the quantity of inert gas in the combustion chamber is, and therefore the less likely the flame generated by ignition of the pre-spray by the ignition device is to propagate extensively. Therefore, the higher the EGR rate is, the higher the unburned residue rate of the first injected fuel (i.e. the proportion of the first injected fuel that is not burned by propagation of flame generated by ignition of the pre-spray by the ignition device but remains unburned) is. Therefore, if the first injection ratio is made higher when the EGR rate is high than when the EGR rate is low, while the quantity of fuel ignited by the ignition device increases as described above, the quantity of the first injected fuel that remains unburned increases more than the quantity of the first injected fuel that is burned by propagation of flame generated by the ignition. The unburned residue of the first injected fuel is diffused more extensively than the region in the combustion chamber in which spray of the second injected fuel is formed at the second injection time. Consequently, even when the EGR rate is high, a sufficient quantity of oxygen needed to burn the unburned residue of the first injected fuel by self-ignition or diffusion combustion can be provided. Therefore, if the first injection ratio is increased when the EGR rate is high, the amount of smoke generated is unlikely to increase. The unburned residue of the first injected fuel contributes to the promotion of self-ignition of fuel after the start of the second injection. Therefore, as the quantity of the unburned residue of the first injected fuel is increased by increasing the first injection ratio for higher EGR rates, self-ignition of fuel after the start of the second injection is promoted. This also contributes to the improvement in the stability of diesel combustion.

As the first injection ratio is made lower when the EGR rate is low than when the EGR rate is high, the smaller the quantity of inert gas in the combustion chamber is, the smaller the quantity of the first injected fuel existing in the combustion chamber can be made. Consequently, the quantity of fuel burned by propagation of flame caused by ignition by the ignition device under the circumstances where the quantity of inert gas in the combustion chamber is small can be made small. In other words, the quantity of oxygen consumed in combustion of the first injected fuel before the second injection is performed can be made small. Therefore, deficiency in the quantity of oxygen available for combustion of the second injected fuel can be prevented when the second injection is performed. In consequence, the amount of smoke generated can be reduced.

The control apparatus for an internal combustion engine according to the present invention may further comprise a first EGR rate control unit that controls the EGR rate in the intake air based on the engine load of the internal combustion engine and a first determination unit that determines a base first injected fuel quantity and a base second injected fuel quantity, based on the engine load of the internal combustion engine. The base first injected fuel quantity is a base value of the first injected fuel quantity, and the base second injected fuel quantity is a base value of the second injected fuel quantity. When the EGR rate in the intake air is changed by the first EGR rate control unit during transient operation for changing the engine load of the internal combustion engine to a target engine load, there is a response delay in changing the EGR rate. Therefore, during the response delay period in changing the EGR rate during transient operation in which the EGR rate is decreased, the actual EGR rate is higher than a target EGR rate corresponding to the target engine load. On the other hand, during the response delay period in changing the EGR rate during transient operation in which the EGR rate is increased, the actual EGR rate is lower than the target EGR rate corresponding to the target engine load corresponding to the engine load.

In view of the above circumstances, in the apparatus according to the present invention, when the EGR rate in the intake air is decreased by the first EGR rate control unit during transient operation by which the engine load of the internal combustion engine is changed to the target engine load, the combustion control unit may perform the said first fuel injection control by making the first injected fuel quantity larger than the base first injected fuel quantity corresponding to the target engine load and making the second injected fuel quantity smaller than the base second injected fuel quantity corresponding to the target engine load, during at least a part of the period during which the actual EGR rate in the intake air is higher than the target EGR rate corresponding to the target engine load, with this control, the first injection ratio is made higher and the second injection ratio is made lower when the actual EGR rate in the intake air is higher than the target EGR rate corresponding to the target engine load during transient operation of the internal combustion engine than when the actual EGR rate in the intake air is equal to the target EGR rate. Therefore, the amount of smoke generated can be reduced, and the stability of diesel combustion can be improved during transient operation.

In the apparatus according to the present invention, when the EGR rate in the intake air is increased by the first EGR rate control unit during transient operation by which the engine load of the internal combustion engine is changed to the target engine load, the combustion control unit may perform said first fuel injection control by making the first injected fuel quantity smaller than the base first injected fuel quantity corresponding to the target engine load and making the second injected fuel quantity larger than the base second injected fuel quantity corresponding to the target engine load, during at least a part of the period during which the actual EGR rate in the intake air is lower than the target EGR rate corresponding to said target engine load. With this control, the first injection ratio is made lower and the second injection ratio is made higher when the actual EGR rate in the intake air is lower than the target EGR rate corresponding to the target engine load during transient operation of the internal combustion engine than when the actual EGR rate in the intake air is equal to the target EGR rate. Therefore, the amount of smoke generated during the transient operation can be reduced.

When the temperature of the internal combustion engine and the exhaust gas is to be raised, the temperature rising speed can be increased by making the EGR rate in the intake air lower. Therefore, in the control apparatus for an internal combustion engine according to the present invention may further comprise a second EGR rate control unit that makes the EGR rate in the intake air at the same engine load lower when the engine temperature of the internal combustion engine is equal to or lower than a predetermined temperature than when the engine temperature is higher than the predetermined temperature. Moreover, when the engine temperature of the internal combustion engine is equal to or lower than the predetermined temperature and the EGR rate in the intake air is made lower by the second EGR rate control unit than when the engine temperature of the internal combustion engine is higher than the predetermined temperature, the combustion control unit may perform said first fuel injection control by making the second injection ratio higher than when the engine temperature of the internal combustion engine is higher than the predetermined temperature. With this control, the amount of smoke generated can be reduced even when the EGR rate in the intake air is decreased when the engine temperature of the internal combustion engine is equal to or lower than the predetermined temperature.

In the apparatus according to the present invention, when performing said first fuel injection control, the combustion control unit may make the first injection ratio higher and make the first injection time earlier when the EGR rate in the intake air of the internal combustion engine is high than when the EGR rate is low. With this control, the unburned residue rate of the first injected fuel in the case where the first injection ratio is increased can be increased further. In consequence, the quantity of the unburned residue of the first injected fuel can be increased further under the circumstances where the EGR rate in the intake air is high. Moreover, the increase in the quantity of the unburned residue of the first injected fuel promotes self-ignition of fuel after the start of the second injection. Therefore, making the first injection time earlier (or advancing the first injection time) when increasing the first injection ratio can further improve the stability of diesel combustion.

In the apparatus according to the present invention, when performing said first fuel injection control, the combustion control unit may make the second injection ratio higher and make the second injection time later when the EGR rate in the intake air of the internal combustion engine is low than when the EGR rate is high. As described above, when the EGR rate in the intake air decreases, the quantity of inert gas in the combustion chamber decreases. Then, increasing the second injected fuel quantity while fixing the second injection time may possibly lead to the occurrence of knocking. Making the second injection time later (or retarding the second injection time) when increasing the second injection ratio can prevent knocking caused by the increase in the second injected fuel quantity from occurring.

In the apparatus according to the present invention, when the engine load of the internal combustion engine increases, it is necessary to increase the quantity of fuel injected into the combustion chamber. However, if the quantity of fuel injected in the first injection or the second injection is increased too much, the amount of smoke generated might increase. In the control apparatus for an internal combustion engine according to the present invention, in a predetermined operation range in which the engine load of the internal combustion engine is higher than a predetermined load, the combustion control unit may perform third injection through the fuel injection valve in addition to the first injection and the second injection at a third injection time prior to the first injection time during the compression stroke with a predetermined second injection interval between the first injection and the third injection. The second injection interval is set in such a way that the fuel injected by said third injection is burned by self-ignition or diffusion combustion after the start of the second injection.

The third injection is performed at the third injection time prior to the first injection time during the compression stroke. The interval between the first injection time and the third injection time is the predetermined second injection interval. The second injection interval is set in such a way that fuel injected by the third injection (which will be sometimes referred to as the "third injected fuel", hereinafter) is burned by self-ignition or diffusion combustion after the start of the second injection. In the period before the first injection time during the compression stroke, the pressure in the combustion chamber is relatively low. Consequently, fuel injected into the combustion chamber is apt to be diffused more extensively. If flame is generated by ignition of the pre-spray of the first injected fuel by the ignition device, the third injected fuel, which has been diffused to locations in the combustion chamber away from the flame, is not apt to be burned in combustion started by the flame. Therefore, if the interval between the first injection time and the third injection time is set appropriately, it is possible to burn a large part of the third injected fuel not by propagation of flame caused by ignition of the pre-spray of the first injected fuel but by self-ignition or diffusion combustion after the start of the second injection. If the third injected fuel is burned by self-ignition or diffusion combustion after the start of the second injection, not only the first injected fuel and the second injected fuel but also the third injected fuel contributes to the power of the internal combustion engine. Therefore, in the case where the third injection is performed in addition to the first injection and the second injection also, diesel combustion with high thermal efficiency can be brought about.

Since the third injection time is prior to the first injection time, the third injected fuel is diffused more extensively in the combustion chamber at the second injection time than the unburned residue of the first injected fuel. Therefore, although the third injected fuel is present in the combustion chamber at the second injection time, the third injected fuel is less likely to overlap with the second injected fuel than the unburned residue of the first injected fuel. Therefore, the third injected fuel is less likely to be a cause of smoke than the first injected fuel and the second injected fuel.

In the predetermined operation range in which the engine load is higher than the predetermined load, in the case where the third injection is performed, at least one of the first injected fuel quantity and the second injected fuel quantity can be made smaller than in the case where a quantity of fuel required by the engine load of the internal combustion engine is injected only by the first injection and the second injection without performing the third injection also in the predetermined operation range. Therefore, diesel combustion can be brought about with reduced smoke.

In the apparatus according to the present invention, in an operation range in which the engine load of the internal combustion engine is equal to or lower than the predetermined load, the combustion control unit may perform said first fuel injection control, and in the predetermined operation range, the combustion control unit may perform second fuel injection control. In the second fuel injection control, the first injection ratio is kept constant for the same total fuel injection quantity in one combustion cycle regardless of the EGR rate in the intake air, and the ratio of the third injected fuel quantity to the total fuel injection quantity (which will be sometimes referred to as the "third injection ratio" hereinafter) is made higher when the EGR rate in the intake air is high than when the EGR rate is low for the same total fuel injection quantity in one combustion cycle. In other words, in the second fuel injection control, if the total fuel injection quantity in one combustion cycle is the same, the first injection ratio is kept constant regardless of the EGR rate in the intake air, and the second injection ratio is made lower when the EGR rate is high than when the EGR rate is low.

As described above, in the first fuel injection control, the amount of smoke generated due to deficiency of oxygen available for combustion of the second injected fuel can be prevented by making the second injection ratio lower when the EGR rate is high than when the EGR rate is low. This is also the case in the predetermined operation range. In the predetermined operation range also, if the second injection ratio is made lower when the EGR rate in the intake air of the internal combustion engine is high than when the EGR rate is low, the smaller the quantity of oxygen in the combustion chamber is, the smaller the quantity of fuel existing in the region in which fuel spray is formed when the second injection is performed can be made. Therefore, deficiency of oxygen available for combustion of the second injected fuel can be prevented. Consequently, the amount of smoke generated can be reduced.

As described above, a large part of the third injected fuel is not burned by propagation of flame generated by ignition of the pre-spray of the first injected fuel. Nevertheless, a portion of the third injected fuel present around the ignition device at the time when ignition of the pre-spray of the first injected fuel is performed is ignited by the ignition device. By making the third injection ratio higher when the EGR rate is high than when the EGR rate is low, the larger the quantity of inert gas in the combustion chamber is, the more the quantity of the third injected fuel present around the ignition device can be increased. In consequence, the quantity of fuel ignited by the ignition device is increased, like in the case where the first injection ratio is increased in the first fuel injection control. Therefore, deterioration of the ignitability in ignition of pre-spray by the ignition device can be prevented. Consequently, the stability of diesel combustion can be improved.

As described above, the higher the EGR rate is, the less likely the flame generated by ignition of the pre-spray by the ignition device is to propagate extensively. Therefore, when the third injection ratio is made higher when the EGR rate is high than when the EGR rate is low, while the quantity of fuel ignited by the ignition device increases as described above, the quantity of the third injected fuel that is not burned by propagation of flame generated by ignition but remains in the combustion chamber at the second injection time increases by a larger amount. In other words, a large part of the increase of the third injected fuel is subjected to combustion after the start of the second injection. At the second injection time, the third injected fuel has diffused more extensively than the region in the combustion chamber in which spray of the second injected fuel is formed, as with the unburned residue of the first injected fuel. Therefore, even when the EGR rate is high, a sufficient quantity of oxygen needed to burn the third injected fuel by self-ignition or diffusion combustion is available. Therefore, even if the third injection ratio is increased when the EGR rate is high, the amount of smoke generated is unlikely to increase. As with the unburned residue of the first injected fuel, the third injected fuel contributes to the promotion of self-ignition of fuel after the start of the second injection. Therefore, when the quantity of the third injected fuel burned in combustion occurring after the start of the second injection is increased by making the third injection ratio higher for higher EGR rates, self-ignition of fuel after the start of the second injection is promoted. This also contributes to the improvement of the stability of diesel combustion.

When the EGR rate in the intake air becomes low, the quantity of inert gas in the combustion chamber decreases, facilitating combustion in the combustion chamber. Consequently, the quantity of the third injected fuel burned by propagation of flame generated by ignition of the pre-spray formed by the first injected fuel by the ignition device increases. Thus, the quantity of oxygen consumed in combustion of the third injected fuel before the second injection is performed increases. Therefore, when the EGR rate becomes low, even though the quantity of oxygen supplied into the combustion chamber increases, there is a possibility that the quantity of oxygen consumed in combustion of the third injected fuel may increase too much, making it difficult to provide a sufficient quantity of oxygen needed to burn the second injected fuel satisfactorily. In this case also, the amount of smoke generated increases. Therefore, the third injection ratio is made lower when the EGR rate is low than when the EGR rate is high. Consequently, the smaller the quantity of inert gas in the combustion chamber is, the smaller the quantity of the third injected fuel in the combustion chamber can be made. Thus, the quantity of fuel burned by propagation of flame caused by ignition by the ignition device under the circumstances where the quantity of inert gas in the combustion chamber is small can be made small. Therefore, the quantity of oxygen consumed in combustion of the third injected fuel before the second injection is performed can be made small. Therefore, deficiency of oxygen available for combustion of the second injected fuel at the time when the second injection is performed can be prevented. In consequence, the amount of smoke generated can be reduced.

The control apparatus for an internal combustion engine according to the present invention may further comprise a first EGR rate control unit that controls the EGR rate in the intake air based on the engine load of the internal combustion engine and a second determination unit that determines a base first injected fuel quantity, a base second injected fuel quantity, and a base third injected fuel quantity, based on the engine load of the internal combustion engine. The base first injected fuel quantity is a base value of the first injected fuel quantity, the base second injected fuel quantity is a base value of the second injected fuel quantity, and the base third injected fuel quantity is a base value of the third injected fuel quantity. Furthermore, in the control apparatus according to the present invention, when the EGR rate in the intake air is decreased by the first EGR rate control unit during transient operation by which the engine load of the internal combustion engine is changed to a target engine load in the predetermined operation range, the combustion control unit may perform said second fuel injection control by making the first injected fuel quantity equal to the base first injected fuel quantity corresponding to the target engine load, making the third injected fuel quantity larger than the base third injected fuel quantity corresponding to the target engine load, and making the second injected fuel quantity smaller than the base second injected fuel quantity corresponding the target engine load, during at least a part of the period during which the actual EGR rate in the intake air is higher than the target EGR rate corresponding to the target engine load. With this control, when the actual EGR rate in the intake air is higher than the target EGR rate corresponding to the target engine load during transient operation of the internal combustion engine in the predetermined operation range, the third injection ratio is made higher and the second injection ratio is made lower than when the actual EGR rate in the intake air is equal to the target EGR rate. Therefore, the amount of smoke generated during transient operation can be reduced, and the stability of diesel combustion can be improved.

In the control apparatus according to the present invention, when the EGR rate in the intake air is increased by the first EGR rate control unit during transient operation by which the engine load of the internal combustion engine is changed to the target engine load in the predetermined operation range, the combustion control unit may perform said second fuel injection control by making the first injected fuel quantity equal to the base first injected fuel quantity corresponding to the target engine load, making the third injected fuel quantity smaller than the base third injected fuel quantity corresponding to the target engine load, and making the second injected fuel quantity larger than the base second injected fuel quantity corresponding the target engine load, during at least a part of the period during which the actual EGR rate in the intake air is lower than the target EGR rate corresponding to the target engine load. With this control, when the actual EGR rate in the intake air is lower than the target EGR rate corresponding to the target engine load during transient operation of the internal combustion engine in the predetermined operation range, the third injection ratio is made lower and the second injection ratio is made higher than when the actual EGR rate in the intake air is equal to the target EGR rate. Therefore, the amount of smoke generated during transient operation can be reduced.

In the case where the control apparatus for an internal combustion engine according to the present invention has said second EGR rate control unit, in said predetermined operation range, when the engine temperature of the internal combustion engine is equal to or lower than the predetermined temperature and the EGR rate in the intake air is made lower by the second EGR rate control unit than when the engine temperature of the internal combustion engine is higher than the predetermined temperature, the combustion control unit may perform said second fuel injection control by making the second injection ratio higher than when the engine temperature of the internal combustion engine is higher than the predetermined temperature. With this control, in the case where the EGR rate in the intake air is made lower when the engine temperature of the internal combustion engine is equal to or lower than the predetermined temperature in said predetermined operation range, the amount of smoke generated can be reduced.

In the control apparatus according to the present invention, when performing said second fuel injection control, the combustion control unit may make the third injection ratio higher and the third injection time earlier when the EGR rate in the intake air of the internal combustion engine is high than when the EGR rate is low. With this control, when the third injection ratio is increased, the third injected fuel is less likely to be burned by propagation of flame generated by ignition of the pre-spray of the first injected fuel. Therefore, the quantity of the third injected fuel that is burned in combustion occurring after the start of the second injected fuel can further be increased in the circumstances where the EGR rate in the intake air is high. As described above, increases in the quantity of the third injected fuel burned in combustion occurring after the start of the second injection promote self-ignition of fuel after the start of the second injection. Therefore, advancing the third injection time when increasing the third injection ratio can further improve the stability of diesel combustion.

In the control apparatus according to the present invention, when performing said second fuel injection control, the combustion control unit may make the second injection ratio higher and second injection time later when the EGR rate in the intake air of the internal combustion engine is low than when the EGR rate is high. With this control, knocking caused by the increase in the second injected fuel quantity can be prevented from occurring in said predetermined operation range.

Advantageous Effects of Invention

According to the present invention, the amount of smoke can be reduced in an internal combustion engine that performs diesel combustion using fuel having a relatively high self-ignition temperature such as gasoline in cases where an EGR apparatus is used, and the stability of diesel combustion can be improved.

BRIEF DESCRIPTION OF DRAWINGS

FIG. 1 is a diagram showing the general configuration of the air-intake and exhaust systems of an internal combustion engine to which an example of the present invention is applied.

FIG. 2 is a diagram showing a mode of ignition by an ignition device with which the internal combustion engine shown in FIG. 1 is equipped.

FIGS. 3(*a*) and 3(*b*) are diagrams illustrating basic combustion control performed in the example of the present invention.

FIG. 4 is a graph showing the change in the rate of heat release in the combustion chamber in a case where the basic combustion control according to the example of the present invention is performed.

FIG. 5 is a graph showing relationship between the first injected fuel quantity and the combustion efficiency of the first injected fuel in a case where the first injection is performed in the basic combustion control according to the example of the present invention.

FIG. 6 shows the change of the rate of heat release in the combustion chamber for different modes between which the ratio of the first injected fuel quantity and the second injected fuel quantity is different in the basic combustion control according to the example of the present invention.

FIG. 7 is a graph showing relationship between the first injection interval Di1 and the thermal efficiency of the internal combustion engine in the basic combustion control according to the example of the present invention.

FIGS. 8(*a*)-8(*c*) show the change in the amount of smoke generated and the change in the thermal efficiency in a case where the second injection time Tm is fixed at a specific time before the top dead center of the compression stroke, and the first injection time Tp is varied, in the basic combustion control according to the example of the present invention.

FIGS. 9(*a*)-9(*c*) show the relationship between the first and second injection ratios, the EGR rate in the intake air, and the amount of smoke generated in the combustion control according to the example of the present invention.

FIGS. 10(a)-10(d) are time charts showing the changes in the engine load, the total fuel injection quantity, the first injected fuel quantity, the second injected fuel quantity, the first injection time, the second injection time, and the EGR rate in the intake air during transient operation by which the EGR rate is decreased in response to a decrease in the engine load of the internal combustion engine according to the example of the present invention.

FIGS. 11(a)-11(d) are time charts showing the changes in the engine load, the total fuel injection quantity, the first injected fuel quantity, the second injected fuel quantity, the first injection time, the second injection time, and the EGR rate in the intake air during transient operation by which the EGR rate is increased in response to a decrease in the engine load of the internal combustion engine according to the example of the present invention.

FIG. 12 is a flow chart showing a control flow of EGR control according to example 1 of the present invention.

FIG. 13 is a flow chart showing a control flow of combustion control according to example 1 of the present invention.

FIG. 14 is a flow chart showing a part of a flow of calculating parameters of the combustion control according to example 1 of the present invention.

FIG. 15 is a flow chart showing another part of the flow of calculating parameters of the combustion control according to example 1 of the present invention.

FIGS. 16(a) and 16(b) show maps used to calculate the parameters of the combustion control according to example 1 of the present invention.

FIGS. 17(a) and 17(b) show a variation in the change in the rate of heat release in the combustion chamber between the case where the basic combustion control is performed and in the case where the high load combustion control is performed in the example of the present invention.

FIGS. 18(a) and 18(b) show the change in the thermal efficiency of the internal combustion engine 1 and the change in the amount of smoke generated in relation to the change in the third injected fuel quantity Spp in the high load combustion control according to the example of the present invention.

FIG. 19 is a flow chart showing a part of a control flow of combustion control according to example 2 of the present invention.

FIG. 20 is a flow chart showing another part of the control flow of the combustion control according to example 2 of the present invention.

FIG. 21 is a flow chart showing a flow of calculating the parameters of the combustion control according to example 2 of the present invention.

FIGS. 22(a) and 22(b) show maps used to calculate the parameters of the combustion control according to example 2 of the present invention.

FIG. 23 is a flow chart showing a control flow of EGR control according to example 2 of the present invention.

FIG. 24 is a flow chart showing a control flow of combustion control according to example 3 of the present invention.

DESCRIPTION OF EMBODIMENTS

In the following, specific embodiments of the present invention will be described with reference to the drawings. The dimensions, materials, shapes, relative arrangements, and other features of the components that will be described in connection with the embodiments are not intended to limit the technical scope of the present invention only to them, unless particularly stated.

Example 1

FIG. 1 is a diagram showing the general configuration of the air-intake and exhaust systems of an internal combustion engine to which the present invention is applied. The internal combustion engine 1 shown in FIG. 1 is a four-stroke-cycle, spark-ignition internal combustion engine (gasoline engine) having a plurality of cylinders. FIG. 1 shows only one of the plurality of cylinders.

In each cylinder 2 of the internal combustion engine 1, a piston 3 is provided in a slidable manner. The piston 3 is linked with an output shaft (crankshaft), which is not shown in the drawings, by a connecting rod 4. The interior of the cylinder 2 is in communication with intake ports 7 and exhaust ports 8. An end of the intake port 7 opening into the cylinder 2 is opened/closed by an intake valve 9. An end of the exhaust port 8 opening into the cylinder 2 is opened/closed by an exhaust valve 10. The intake valve 9 and the exhaust valve 10 are driven to be opened/closed respectively by an intake cam and an exhaust cam not shown in the drawings.

Furthermore, each cylinder 2 is provided with a fuel injection valve 6 for injecting fuel into the cylinder. The fuel injection valve 6 is arranged at the center on top of the combustion chamber formed in the cylinder 2. Moreover, an ignition plug 5 that can ignite fuel injected through the fuel injection valve 6 is provided in the cylinder head of the internal combustion engine 1. Specifically, the fuel injection valve 6 has an injection port 6a with which fuel can be injected nearly radially in 16 (sixteen) directions as shown in FIG. 2. The position of the ignition plug 5 relative to the fuel injection valve 6 is arranged in such a way that at least one of the fuel sprays injected from the injection port 6a passes through a region 5a in which the ignition plug 5 is capable of igniting and that the fuel spray thus passing through this region 5a can be directly ignited by a spark generated between the electrodes in the region 5a. The ignition plug 5 is located between the two intake valves 9 so that it does not interfere with the operations of the intake valves 9 and the exhaust valves 10. The location of the ignition device in the apparatus according to the present invention is not limited to a position between the two intake valves.

The ignition plug 5 and the fuel injection valve 6 configured as above can carry out spray guide combustion. In other words, the ignition plug 5, which is arranged in such a way as to be capable of directly igniting fuel injected through the fuel injection valve 6, and the fuel injection valve 6 are adapted to be capable of igniting injected fuel passing through the region 5a at any desired time regardless of the opening timing of the intake valves 9 of the internal combustion engine 1 or the position of the piston 3. Air guide combustion and wall guide combustion are also known as conventional combustion methods in which fuel injected through the fuel injection valve is ignited directly by the ignition plug. In the air guide combustion, fuel injected through the fuel injection valve is carried to the neighborhood of the ignition plug by means of air flowing into the combustion chamber with opening of the intake valve and ignited by the ignition plug. In the wall guide combustion, injected fuel is carried to the neighborhood of the ignition plug utilizing the shape of a cavity provided on top of the piston and ignited by the ignition plug. In the cases of the air guide combustion and the wall guide combustion, it is difficult to perform fuel injection and ignition unless a predetermined time for opening the intake valve is reached and a predetermined piston position is established. The spray guide combustion according to this example allows very flexible fuel injection and ignition timing control as compared to the air guide combustion and the wall guide combustion. In this example, as shown in FIG. 2, the fuel injection valve 6 and the ignition plug 5 are arranged in such a way that one of fuel sprays injected from the injection port 6a falls on the electrodes of the ignition plug 5. However, the ignition-capable region of the ignition plug 5 is not limited to the region 5a between the electrodes but includes a region around the electrode also. Therefore, it is not necessarily required that a fuel spray injected from the injection port 6a fall on the electrodes of the ignition plug 5. In other words, it is not necessarily required that the ignition plug 5a be located in line with the direction of fuel injection from the injection port 6a (namely, on the center axis of the fuel spray). Even in the case where the fuel spray injected from the injection port 6a is offset from the electrodes of the ignition plug 5, spray guide combustion started by a spark generated between the electrodes of the ignition plug 5 can be brought about, so long as the fuel spray passes the ignition-capable region. Thus, in this example, what is required is that the position of the ignition plug 5 relative to the fuel injection valve 6 be arranged in such a way that spray guide combustion can be brought about. Therefore, the ignition plug 5 may be offset from the direction of fuel injection (namely, the center axis of the fuel spray) from the injection port 6a.

Returning back to FIG. 1, the intake port 7 is in communication with an intake passage 70. The intake passage 70 is provided with a throttle valve 71. An air flow meter 72 is provided in the intake passage 70 upstream of the throttle valve 71. On the other hand, the exhaust port 8 is in communication with an exhaust passage 80. An exhaust gas purification catalyst 81 for purifying the exhaust gas discharged from the internal combustion engine 1 is provided in the exhaust passage 80. As will be described later, the exhaust gas discharged from the internal combustion engine 1 has an air-fuel ratio leaner than the stoichiometry, and a selective catalytic reduction NOx catalyst capable of removing NOx in the exhaust gas having such a lean air-fuel ratio and a filter capable of trapping particulate matter (PM) in the exhaust gas may be employed as the exhaust gas purification catalyst 81.

The air-intake and exhaust systems of the internal combustion engine 1 are provided with an EGR apparatus 30, which supplies a portion of the exhaust gas flowing in the exhaust passage 80 into the intake passage 70 as EGR gas. The EGR apparatus 30 includes an EGR passage 31 and an EGR valve 32. One end of the EGR passage 31 is connected to the exhaust passage 80 at a location upstream of the exhaust gas purification catalyst 81, and the other end of the EGR passage 31 is connected to the intake passage 70 at a location downstream of the throttle valve 71. (For example, one end of the EGR passage 31 may be connected to the exhaust manifold, and the other end of the EGR passage 31 may be connected to the intake manifold.) The EGR valve 32 is provided in the EGR passage 31. The EGR valve 32 controls the flow rate of the EGR gas (EGR gas quantity) supplied into the intake passage 70 by varying the cross sectional area of the EGR gas channel of the EGR passage 31. The EGR rate in the intake air flowing into the internal combustion engine 1 is controlled by controlling the EGR gas quantity. The intake passage 70 is provided with a pressure sensor 73 arranged at a location downstream of the location at which the other end of the EGR passage 31 is connected to the intake passage 70. The pressure sensor 73 may be arranged at any location at which it can measure the intake air pressure after the supply of the EGR gas.

An electronic control unit (ECU) 20 is annexed to the internal combustion engine 1. The ECU 20 is a unit that controls the operation state of the internal combustion engine 1 and the exhaust gas purification apparatus etc. The ECU 20 is electrically connected with the air flow meter 72, the pressure sensor 73, a crank position sensor 21, an accelerator position sensor 22, and a water temperature sensor 23. Measurement values of these sensors are input to the ECU 20. Thus, the ECU 20 can recognize the operation state of the internal combustion engine 1, such as the intake air quantity measured by the air flow meter 72, the engine speed calculated based on the measurement value of the crank position sensor 21, and the engine load calculated based on the measurement value of the accelerator position sensor 22. The ECU 20 can also recognize the pressure of the intake air measured by the pressure sensor 73. Moreover, the ECU 20 can recognize the cooling air temperature of the internal combustion engine 1 or the engine temperature of the internal combustion engine 1 based on the measurement value of the water temperature sensor 23. The ECU 20 is also electrically connected with the fuel injection valve 6, the ignition plug 5, the throttle valve 71, and the EGR valve 32 etc. These components are controlled by the ECU 20.

<Basic Combustion Control>

Basic combustion control performed in the internal combustion engine 1 having the above-described configuration will now be described with reference to FIG. 3. FIG. 3(a) schematically shows procedure of fuel injection and ignition in combustion control performed in the internal combustion engine 1 in time sequence from left to right of the diagram (see upper row of FIG. 3(a)) and phenomena relating to combustion which are considered to occur in succession in the combustion chamber as results of the fuel injection and ignition (see the lower row of FIG. 3(a)). FIG. 3(b) shows relationship between first injection and second injection, which are included in the fuel injections shown in FIG. 3(a), and ignition in time line. The mode shown in FIG. 3 is given only as a schematic illustration of the basic combustion control performed in this example, and the present invention should not be considered to be limited to this mode.

In the basic combustion control of this example, first injection and second injection are performed by the fuel injection valve 6 in one combustion cycle. The first injection is fuel injection performed during the compression stroke. The second injection is fuel injection started at a time after the first injection and before the top dead center (TDC) of the compression stroke. Although the second injection is started at a time before the top dead center, it may continue past the top dead center. As shown in FIG. 3(b), the time of start of the first injection (which will be simply referred to as the "first injection time" hereinafter) is denoted by Tp, and the time of start of the second injection (which will be simply referred to as the "second injection time" hereinafter) is denoted by Tm. The interval between the first injection time and the second injection time (Tm−Tp) is defined as a first injection interval Di1. Combustion with the first injection is performed as the above-described spray guide combustion. That is to say, pre-spray of the fuel injected by the first injection (which will be hereinafter referred to as "first injected fuel") is ignited using the ignition plug 5. The time of this ignition is denoted by Ts as shown in FIG. 3(b), and the interval from the start of the first injection to the time of ignition (Ts−Tp) is defined as the ignition interval Ds.

In the following, the procedure of the basic combustion control according to the present invention will be described.

(1) First Injection

In the basic combustion control, in one combustion cycle, the first injection is firstly performed at the first injection time Tp during the compression stroke. The first injection time Tp is determined in relation to the second injection time Tm, which will be described later. As the first injection is performed, the pre-spray of the first injected fuel injected through the fuel injection valve 6 passes through the ignition-capable region 5a of the ignition plug 5 in the combustion chamber, as shown in FIG. 2. Immediately after the start of the first injection, the pre-spray of the first injected fuel is not diffused extensively in the combustion chamber but travels in the combustion chamber by the penetrating force of injection while involving the air around at the leading end of the spay jet. Consequently, the pre-spray of the first injected fuel creates stratified air-fuel mixture in the combustion chamber.

(2) Ignition of First Injected Fuel

The pre-spray of the first injected fuel thus stratified is ignited by the ignition plug 5 at the ignition time Ts after the predetermined ignition interval Ds from the first injection time Tp. As described above, since the first injected fuel is stratified, the local air-fuel ratio around the ignition plug 5 is at a level allowing combustion by this ignition even though the first injected fuel quantity (i.e. the quantity of the first injected fuel) is small. By this ignition, spray guide combustion of the first injected fuel is brought about. In other words, the ignition interval Ds is set in such a way that the spray guide combustion can be brought about. In addition to a temperature rise caused by the effect of compression by the piston 3, a temperature rise is caused in the combustion chamber by the occurrence of the spray guide combustion. However, the fuel burned by the spray guide combustion is only a part of the first injected fuel, and a large part of the first injected fuel is not burned in the combustion caused by the ignition by the ignition plug 5 but remains in the combustion chamber as "unburned residual fuel" after the ignition. This is because the air-fuel ratio of the stratified air-fuel mixture formed by the first injected fuel is so high in regions relatively distant from the inter-electrode region of the ignition plug 5 that flame cannot propagate in such regions. However, the unburned residual fuel is exposed to a high-temperature atmosphere resulting from the combustion of a portion of the first injected fuel in the combustion chamber. Therefore, it is expected that at least a portion of the unburned residual fuel is reformed in its properties to have improved combustibility, by virtue of low temperature oxidation under a condition that does not cause it to be burned. It should be noted, however, that in the context of the present invention, the unburned residue of the first injected fuel refers to a portion of the first injected fuel that remains in the combustion chamber in an unburned state without having been burned in the combustion caused by the ignition by the ignition plug 5, and it is not essential for the unburned residual fuel to be in a condition showing specific properties.

(3) Second Injection

The second injection through the fuel injection valve 6 is started at the second injection time Tm after the first injection interval Di1 from the first injection time Tp and before the top dead center of the compression stroke (in other words, at time Tm after the lapse of lime equal to Di−Ds from the time of ignition Ts by the ignition plug 5).

In this internal combustion engine 1, the second injected fuel self-ignites and is burned by diffusion combustion to contribute to the engine power as will be described later. Therefore, the second injection time Tm is set to such a time that nearly maximizes the engine power attained by combustion of a quantity of second injected fuel determined by the engine load and other factors. (This injection time will be hereinafter referred to as "proper injection time"). Combustion of the second injected fuel is started by flame generated by the ignition of the pre-spray of the first injected fuel as the ignition source. In other words, the first injection interval Di1 is set in such a way that the second injection time Tm is set to the proper injection time and that combustion of the second injected fuel is started by flame generated by the ignition of the pre-spray. If the second injection time Tm and the first injection interval Di1 are set in this way, the first injection time Tp is necessarily determined. After the combustion of the second injected fuel starts, the temperature in the combustion chamber rises further. Consequently, the unburned residue of the first injected fuel and the second injected fuel self-ignite in the raised temperature field and are burned by diffusion combustion. In connection with this, in cases where the combustibility of the unburned residue of the first injected fuel has been enhanced, the self-ignition of fuel after the start of the second injection is expected to be further promoted.

As described above, in the basic combustion control according to this example, the above-described series of combustion is caused to occur by the first injection, ignition, and second injection. In this specification, the correlation between the first injection and second injection that enables the combustion of the second injected fuel to be started by flame generated by the ignition of the pre-spray of the first injected fuel and then enables the unburned residue of the first injected fuel and the second injected fuel to self-ignite and be burned by diffusion combustion will be referred to as the "first-second injection correlation". In other words, the basic combustion control according to this embodiment is adapted to perform the first injection and the second injection that is in the first-second injection correlation with the ignition of the first injected fuel.

FIG. 4 shows the changes of rate of heat release in the combustion chamber in a case where the basic combustion control according to this example is performed. FIG. 4 shows the changes of the rate of heat release corresponding to four different control modes L1 to L4 in a case where the engine speed of the internal combustion engine 1 is 2000 rpm. In these control modes L1 to L4, while the first injection time Tp, the first injected fuel quantity (i.e. the duration of the first injection), the second injection time Tm, and the ignition time Ts are the same among the control modes, the second injected fuel quantity (i.e. the duration of the second injection) is varied among the control modes. Specifically, the second injected fuel quantity is varied like L1>L2>L3>L4. Therefore, FIG. 4 shows variation of the change of the rate of heat release resulting from variation in the second injected fuel quantity under the presupposition that the first-second injection correlation is established.

In FIG. 4, the rate of heat release shows a first peak in a portion Z1 encircled by a broken line. This first peak indicates heat generated by the combustion of the first injected fuel started by ignition (that is, heat generated by the spray guide combustion). At the time at which the rate of heat release shows the first peak, the second injection has not been performed yet, and flame generated by ignition of the first injected fuel and the unburned residual fuel, which is the portion of the first injected fuel that has not been burned by the ignition, are present in the combustion chamber. Now, the unburned residue of the first injected fuel will be discussed with reference to FIG. 5. FIG. 5 shows correlation of the first injected fuel quantity and the combustion efficiency of the first injected fuel (which will be hereinafter referred to as the "first combustion efficiency") for three combustion conditions L5 to L7, in the case where the first injection is performed according to the basic combustion control. Specifically, the first injection time Tp and the ignition time Ts, which are the combustion conditions, are advanced in the order of L5, L6, and L7, while the ignition interval Ds or the interval between time Tp and time Ts is fixed. FIG. 5 shows the above-described correlation in the case where only the first injection and ignition are performed but the second injection is not performed (namely, in the case where only the spray guide combustion is performed).

The first combustion efficiency and the unburned residue rate of the first injected fuel are in a relationship represented by the following equation 1. Specifically, the higher the combustion efficiency is, the lower the unburned residue rate is.

(unburned residue rate of first injected fuel)=1−(combustion efficiency of first injected fuel)　　(Equation 1)

Referring to FIG. 5, if the first injection time Tp and the ignition time Ts are advanced (namely, the first injection interval Di1 is increased) while the first injected fuel quantity is fixed, the combustion efficiency of the first injected fuel tends to decrease, and the unburned residue rate tends to increase consequently. Conversely, even if the first injected fuel quantity is changed, it is possible to keep the combustion efficiency of the first injected fuel and the unburned residue rate constant by adjusting the degree of advancement of the first injection time Tp and the ignition time Ts. As described above, the basic combustion control according to this example can control the unburned residue rate of the first injected fuel, which is one of the factors of the first-second injection correlation, by controlling the first injected fuel quantity, the first injection time Tp, and the ignition time Ts (i.e. the first injection interval Di1).

Referring back to FIG. 4, the second injection is started at time Tm after the time at which the rate of heat release shows the first peak and before the top dead center of the compression stroke. Then, as described before, the second injected fuel is ignited by flame generated by the ignition of the pre-spray of the first injected fuel to start to burn, and thereafter self-ignites together with the unburned residue of the first injected fuel to burn by diffusion combustion. Consequently, a second peak, which is the highest peak, of the rate of heat release occurs at a time after the top dead center of the compression stroke. In the case shown in FIG. 4, as the second injected fuel quantity increases (namely as the duration of the second injection increases), the value of the second peak of the rate of heat release increases, and the time at which the second peak occurs becomes later. This means that as the second injected fuel quantity increases, the duration of the combustion of the second injected fuel increases. It is conjectured from this that the second injected fuel and the unburned residue of the first injected fuel are subjected to diffusion combustion or combustion that can be regarded to be substantially equivalent to diffusion combustion.

Self-ignition of fuel occurring in the basic combustion control according to this example will be described with reference to FIG. 6. FIG. 6 shows the change of the rate of heat release in the combustion chamber for two modes L8 and L9 between which the ratio of the first injected fuel quantity and the second injected fuel quantity is different, while the total injection quantity (i.e. the sum of the first injected fuel quantity and the second injected fuel quantity) in one combustion cycle is kept constant. In the case shown in FIG. 6, the engine speed of the internal combustion engine 1 is 2000 rpm. The proportion of the first injected fuel quantity is larger in mode L9 than in mode L8. In other words, the first injected fuel quantity is larger and consequently the unburned residue of the first injected fuel is also larger in mode L9 than in mode L8. As will be seen in FIG. 6, the value of the second peak of the rate of heat release occurring after the top dead center of the compression stroke is higher in mode L9 than in mode L8. Moreover, the falling rate from the second peak of the rate of heat release (or the inclination of the curve in the graph after the second peak) is higher in mode L9 than in mode L8. It is conjectured that the above facts suggest that after the start of the second injection, combustion of the unburned residue of the first injected fuel and the second injected fuel caused by self-ignition is more promoted (namely the proportion of fuel burned by self-ignition is larger, and the proportion of fuel burned by diffusion combustion is smaller) in mode L9 than in mode L8. It is considered from this that the unburned residue of the first injected fuel contributes to the promotion of self-ignition after the second injection. The inventors of the present invention verified that in the basic combustion control of this example, the self-ignition of fuel after the second injection is promoted also in the case where the unburned residue of the first injected fuel is increased by controlling the first injection time Tp and the ignition time Ts as well as the first injected fuel quantity. To sum up, in the basic combustion control according to this example, it is possible to promote self-ignition in burning the unburned residue of the first injected fuel and the second injected fuel after the start of the second injection, by adjusting parameters relating to the first injection and the ignition to increase the unburned residue rate.

As described above, in the basic combustion control according to this example, self-ignition and diffusion combustion of fuel is caused to occur by performing the second injection after the spray guide combustion caused by the first injection and the ignition by the ignition plug 5. Therefore, the combustion caused by the basic combustion control is similar to what is called diesel combustion or can be regarded to be substantially equivalent to diesel combustion. Consequently, the air-fuel ratio of the air-fuel mixture in the combustion chamber is allowed to be very high or lean (in the range between approximately 20 and 70). To bring about combustion at such lean air-fuel ratio, in the combustion control according to this example, the throttle valve 71 is opened to a degree larger than in the case of conventional combustion control (homogeneous stoichiometry control) for gasoline engines. Consequently, the pump loss in the internal combustion engine 1 can be made smaller. Moreover, since the combustion that contributes to the engine power is brought about by self-ignition and diffusion combustion, the cooling loss in the internal combustion engine 1 can also be made smaller than in the case of the homogenous stoichiometry control. In consequence, the basic combustion control according to this example can attain high thermal efficiency that cannot be attained by conventional combustion control for gasoline engines.

<Description of First-Second Injection Correlation>

In the following, the first injected fuel quantity, the second injected fuel quantity, and the first injection interval, which are relevant technical factors for establishing the aforementioned first-second injection correlation, will be specifically described.

The second injection time is set to the proper injection time that nearly maximizes the engine power of the internal combustion engine 1. Therefore, the engine power required by an increase in the engine load can be attained up to some extent by increasing the second injected fuel quantity. However, since the second injection is performed at a time near the top dead center of the compression stroke at which the pressure in the combustion chamber is very high, the penetration of the fuel spray injected by the fuel injection valve 6 is low. In other words, the fuel spray injected by the second injection is unlikely to diffuse extensively. For this reason, if the second injected fuel quantity is increased too much, the quantity of oxygen existing around the spray of the second injected fuel or the quantity of oxygen available for combustion of the second injected fuel becomes insufficient relative to the quantity of fuel, possibly leading to an increase in the amount of smoke generated. Furthermore, in the basic combustion control according to this example, it is necessary that self-ignition of fuel occur after the second injection. If the second injected fuel quantity is excessively large, there is a possibility that the temperature in the combustion chamber may be lowered by the evaporation latent heat of the second injected fuel to make the combustion unstable.

On the other hand, the first injection is performed at the first injection time Tp during the compression stroke. Therefore, combustion of the first injected fuel ignited by the ignition plug 5 may be considered to be counteractive to the engine power of the internal combustion engine 1. However, what is required in the combustion of the pre-spray of the first injected fuel caused by ignition is only to produce flame serving as an ignition source for combustion of the second injected fuel. Therefore, the fuel burned in the combustion caused by the ignition is only a portion of the first injected fuel. Consequently, the effect of the spray guide combustion of the first injected fuel counteractive to the engine power is small. The unburned residue of the first injected fuel that has not been burned in the combustion caused by the ignition by the ignition plug 5 is burned in self-ignition and diffusion combustion together with the second injected fuel after the second injection to contribute to the engine power. Therefore, the engine power required by an increase in the engine load can be attained up to some extent also by increasing the first injected fuel quantity and increasing its unburned residue rate.

As described before, the first injection interval Di1, which is the interval between the first injection time and the second injection time in the basic combustion control according to this example, is set in such a way that combustion of the second injected fuel is started by flame generated by ignition of the pre-spray of the first injected fuel. Moreover, the first injection interval Di is determined taking into consideration the thermal efficiency of the overall combustion, the quantity of the unburned residue of the first injected fuel, and the amount of smoke generated.

FIG. 7 shows relationship between the first injection interval Di and the thermal efficiency of the internal combustion engine 1. FIG. 7 shows this relationship in a case where the first injection interval Di1 is varied with the first injected fuel quantity, the second injected fuel quantity, and the ignition interval Ds being fixed.

In this example, the first injection and the second injection subsequent to it are performed by means of one fuel injection valve 6. Because of its mechanical structure, a fuel injection valve generally has a minimum injection interval that can be set in performing multiple times of injection consecutively. In FIG. 7, the range of the first injection interval that is infeasible because of the mechanical limitation of the fuel injection valve 6 (i.e. the range of Di1 below Di1*a*) is indicated as a mechanical limitation range R1. On the other hand, as the first injection interval Di1 is increased, the second injection is performed at a time closer to the end of the combustion process started by ignition of the first injected fuel. In the period near the end of the combustion process, since the combustion of the first injected fuel is about to end, it is difficult for combustion of the second injected fuel to be started by flame generated by combustion of the first injected fuel. For this reason, if the first injection interval Di1 is too large, there is a possibility that it may be impossible to burn the second injected fuel, leading to misfire. In FIG. 7, the range of the first injection interval Di1 in which misfire is highly likely to occur (i.e. the range of Di1 above Di1*b*) is indicated as a misfire occurrence range R2. The lower bound (Di1*b* in FIG. 7) of the misfire occurrence range R2 changes depending on the first injected fuel quantity. If the first injected fuel quantity is increased, the duration of the combustion of the first injected fuel started by ignition will continue for a longer period of time. Then, the second injected fuel can be burned with a longer first injection interval Di1.

As per the above, considering the thermal efficiency, it is preferred that the first injection interval Di1 be set to Di Ix, which falls in the range Rd defined by the lower bound Di1*a* and the upper bound Di1*b* and at which the thermal efficiency of the internal combustion engine 1 has its peak value in FIG. 7.

As described before, in the basic combustion control according to this example, combustion of the second injected fuel is started by flame generated by combustion of the first injected fuel, and the second injected fuel self-ignites and is burned by diffusion combustion together with the unburned residue of the first injected fuel. In the early stage of combustion of the second injected fuel, flame generated by combustion of the first injected fuel and the unburned residue of the first injected fuel are distributed unevenly in the combustion chamber, and mixing of the second injected fuel and air in the combustion chamber tends not to be promoted. Therefore, if the unburned residue of the first injected fuel and the second injected fuel overlap in the combustion chamber when the second injection is performed, the quantity of oxygen present around the overlapping region or the quantity of oxygen available for combustion of the fuel in the overlapping region can be insufficient relative to the quantity of fuel, and smoke is likely to be generated. The generation of smoke suggests that combustion is not proceeding in a good condition. Thus, the larger the amount of smoke generated is, the lower the thermal efficiency tends to be. To reduce the generation of smoke, it is necessary to reduce the overlapping of the unburned residue of the first injected fuel and the second injected fuel. However, as described above, the second injection time is set to the proper injection time before the top dead center of the compression stroke in order to improve the thermal efficiency of the internal combustion engine 1. Therefore, in order to reduce the overlapping of the unburned residue of the first injected fuel and the second injected fuel, which tends to lead to the generation of smoke, it is preferred to adjust the first injection interval Di1 while setting the second injection time to the proper injection time, namely it is preferred to adjust the first injection time.

FIG. 8 shows relation between the amount of smoke generated and the first injection time Tp (see graph (b) in FIG. 8) and relation between the thermal efficiency and the first injection time Tp (see graph (c) in FIG. 8) for three modes (see diagram (a) in FIG. 8), among which the proportion of the first injected fuel quantity and the second injected fuel quantity is varied with the total quantity of the first injected fuel and the second injected fuel being fixed, where the second injection time Tm is fixed at a predetermined time before the top dead center of the compression stroke and the first injection time Tp is varied. The ignition interval Ds (i.e. the length of time from the first injection time Tp to the ignition time Ts) is the same among all the modes. The relationships between the first injected fuel quantity and the second injected fuel quantity in respective modes 1 to 3 are as follows:

Mode 1: first injected fuel quantity=X1, second injected fuel quantity=Y1,

Mode 2: first injected fuel quantity=X2, second injected fuel quantity=Y8, and

Mode 3: first injected fuel quantity=X3, second injected fuel quantity=Y3, where X1>X2>X3, and Y1<Y2<Y3.

In graph (b) in FIG. 8, the change of amount of smoke in mode 1 is represented by L11, the change of amount of smoke in mode 2 is represented by L12, and the change of amount of smoke in mode 3 is represented by L13. In graph (c) in FIG. 8, the change of the thermal efficiency in mode 1 is represented by L14, the change of the thermal efficiency in mode 2 is represented by L15, and the change of the thermal efficiency in mode 3 is represented by L16. In graph (b), (c) of FIG. 8, measurement points of the smoke and the thermal efficiency in mode 1 are represented by circles, measurement points of the smoke and the thermal efficiency in mode 2 are represented by triangles, and measurement points of the smoke and the thermal efficiency in mode 3 are represented by rhombuses. The measurement points of the smoke and the thermal efficiency with the first injection time Tp that makes the thermal efficiency highest in the respective modes are represented by solid black circles, triangles, and rhombuses.

Here, we consider shift from mode 3 to mode 2 and then to mode 1 while focusing on the aforementioned solid black measurement points. As we can see, by increasing the first injected fuel quantity and advancing the first injection time Tp, it is possible to keep the thermal efficiency of the internal combustion engine 1 at around the highest level while reducing or keeping the amount of smoke generated (see graph (b) in FIG. 8). If the sum total of the first injected fuel quantity and the second injected fuel quantity is the same, increasing the first injected fuel quantity necessarily leads to a decrease in the second injected fuel quantity. By advancing the first injection time Tp when the first injected fuel quantity is increased, it is possible to increase the unburned residue of the first injected fuel (namely it is possible to increase the unburned residue rate). It is considered that this is because if the first injection time is advanced, the first injection is performed when the pressure in the combustion chamber is lower and consequently, the penetration of the pre-spray of the first injected fuel is relatively higher to facilitate diffusion of the first injected fuel in the combustion chamber. Thus, since the first injected fuel is diffused more extensively in the combustion chamber, the quantity of unburned residual fuel to which flame generated by ignition has not propagated increases. Consequently, a larger quantity of unburned residual fuel is subjected to self-ignition and diffusion combustion together with the second injected fuel after the start of the second injection. In consequence, a decrease in the output power due to a decrease in the second injected fuel quantity can be compensated for by an increase in the power provided by combustion of the unburned residue of the first injected fuel. Moreover, the extensive diffusion of the first injected fuel in the combustion chamber can reduce the overlapping of the unburned residue of the first injected fuel and the second injected fuel after the second injection. Therefore, the generation of smoke due to the overlapping of the unburned residue of the first injected fuel and the second injected fuel can also be reduced. Thus, by increasing the first injected fuel quantity and advancing the first injection time Tp, it is possible to reduce the amount of smoke generated while keeping the thermal efficiency of the internal combustion engine 1 at a satisfactory level.

It will be understood from graph (c) in FIG. 8 that if it is assumed that the first injection is performed according to modes 1 to 3 while fixing the first injection time Tp to, for example, the time Ta at which the highest thermal efficiency is attained in mode 3, as the first injected fuel quantity is increased, the amount of smoke generated increases and the thermal efficiency of the internal combustion engine 1 decreases. It will be understood from this fact also that the above-described way of controlling the first injection in which the injection time Tp is advanced with increases in the first injected fuel quantity is effective in terms of reduction of smoke and improvement in the thermal efficiency.

<Fuel Injection Control Taking Account of EGR Rate>

In this example, the EGR apparatus 30 supplies EGR gas to the internal combustion engine 1. Supplying the EGR gas can reduce the amount of NOx formed. However, high EGR rates in the intake air may lead to increases in the amount of smoke generated. Interrelation among the ratio of the first injected fuel quantity to the total fuel injection quantity in one combustion cycle (the first injection ratio) and the ratio of the second injected fuel quantity to the total fuel injection quantity (the second injection ratio), the EGR rate in the intake air, and the amount of smoke generated will be described with reference to FIG. 9. In graph (a) in FIG. 9, line La represents the total fuel injection quantity in one combustion cycle, lines Lp1, Lp2 represent the first injected fuel quantity, and lines Lm1, Lm2 represent the second injected fuel quantity. In graph (b) in FIG. 9, line Ls1 represents the change in the amount of smoke generated in relation to the EGR rate in a case where the first injection ratio and the second injection ratio are kept constant for all the EGR rates as represented by lines Lp1 and Lm1 in graph (a) in FIG. 9. In graph (b) in FIG. 9, line Ls2 represents the change in the amount of smoke generated in relation to the EGR rate in a case where the first injection ratio and the second injection ratio are varied in relation to the EGR rate as represented by lines Lp2 and Lm2 in graph (a) in FIG. 9. Graph (c) in FIG. 9 shows the change in the quantity of oxygen in the combustion chamber in the cylinder 2 in relation to the EGR rate.

As will be seen from the comparison of line Ls1 and line Ls2 in graph (b) in FIG. 9, if the total fuel injection quantity in one combustion cycle is the same, the amount of smoke generated can be made smaller in the case where the first injection ratio is made higher for higher EGR rates in the intake air than in the case where the first injection ratio is kept constant regardless of the EGR rate. The reason for this will be described in the following.

As described above, since the penetration of the spray of the second injected fuel is low, the spray of the second injected fuel is unlikely to diffuse extensively in the combustion chamber. Combustion of the second injected fuel consumes oxygen existing in the neighborhood of the spray of the second injected fuel. As shown in graph (c) in FIG. 9, if the flow rate of the intake air is the same, the higher the EGR rate in the intake air is, the smaller the quantity of oxygen in the combustion chamber is. Consequently, the higher the EGR rate in the intake air is, the smaller the quantity of oxygen existing in the neighborhood of the spray of the second injected fuel when the second injection is performed is. Therefore, when the EGR rate is high, it is difficult to provide a sufficient quantity of oxygen needed to burn the second injected fuel satisfactorily. This consequently leads to an increase in the amount of smoke generated. On the other hand, the lower the EGR rate in the intake air is, the smaller the quantity of inert gas in the combustion chamber is, if the flow rate of the intake air is the same. Therefore, the lower the EGR rate in the intake air is, the more the combustion in the combustion chamber is promoted. In consequence, the first combustion efficiency in the spray guide combustion of the first injected fuel becomes higher (in other words, the unburned residue rate becomes lower). This means that the quantity of oxygen consumed in combustion of the first injected fuel before the second injection becomes larger. Therefore, when the EGR rate becomes lower, even though the quantity of oxygen supplied into the combustion chamber increases, the quantity of oxygen consumed in combustion of the first injected fuel increases excessively to make it difficult to provide a sufficient quantity of oxygen needed to burn the second injected fuel satisfactorily when the second injection is performed. This also leads to an increase in the amount of smoke generated.

Therefore, the higher the EGR rate in the intake air is, the higher the first injection ratio is made as represented by lines Lp2 and Lm2 in graph (a) in FIG. 9. In other words, the higher the EGR rate in the intake air is, the lower the second injection ratio is made. In consequence, the smaller the quantity of oxygen in the combustion chamber is, the smaller the quantity of fuel existing in the region in which fuel spray is formed at the time when the second injection is performed can be made. Therefore, deficiency in the quantity of oxygen available for combustion of the second injected fuel can be prevented. In consequence, the amount of smoke generated can be reduced.

If the first injection ratio is increased, the first injected fuel quantity increases, and the quantity of fuel ignited by the ignition plug 5 increases accordingly. However, the higher the EGR rate is, the larger the quantity of inert gas in the combustion chamber is, and the less likely the flame generated by ignition of the pre-spray by the ignition plug 5 is to propagate extensively. In consequence, the higher the EGR rate is, the higher the unburned residue rate of the first injected fuel is. Therefore, if the first injection ratio is increased for higher EGR rates, while the quantity of fuel ignited by the ignition plug 5 increases due to the increase in the first injected fuel quantity, the increase in the quantity of the first injected fuel that remains unburned is larger than the increase in the quantity of the first injected fuel that is burned by propagation of flame generated by the ignition. The unburned residue of the first injected fuel is diffused more extensively than the region in the combustion chamber in which the spray of the second injected fuel is formed at the second injection time. Therefore, even when the EGR rate is high, a sufficient quantity of oxygen needed to burn the unburned residue of the first injected fuel by self-ignition or diffusion combustion is available. Therefore, even if the first injection ratio is increased when the EGR rate is high, the amount of smoke generated is unlikely to increase.

The lower the EGR rate is, the more the first injection ratio is decreased. Then, the smaller the quantity of inert gas in the combustion chamber is, the smaller the quantity of the first injected fuel existing in the combustion chamber can be made. Therefore, the quantity of fuel burned by propagation of flame caused by ignition by the ignition plug 5 under the circumstances where the quantity of inert gas in the combustion chamber is small can be made small. In other words, the quantity of oxygen consumed in combustion of the first injected fuel before the second injection is performed can be made small. Therefore, deficiency in the quantity of oxygen available for combustion of the second injected fuel can be prevented when the second injection is performed. In consequence, the amount of smoke generated can be reduced.

When the EGR rate in the intake air increases, the quantity of inert gas in the combustion chamber increases, and therefore ignitability of the pre-spray of the first injected fuel by the ignition plug 5 is deteriorated. Then, flame that starts the combustion of the second injected fuel might not be formed, and diesel combustion becomes instable. In the case where the first injection ratio is made higher for higher EGR rates, the larger the quantity of inert gas in the combustion chamber is, the larger the quantity of fuel ignited by the ignition plug 5 can be made. Therefore, the quantity of the first injected fuel that remains unburned increases, and the quantity of fuel that contributes to the formation of flame by ignition of pre-spray by the ignition plug 5 also increases. Therefore, even when the quantity of inert gas in the combustion chamber is increased due to high EGR rate, deterioration of the ignitability in ignition of pre-spray by the ignition plug 5 can be prevented by increasing the first injection ratio. As described above, the unburned residue of the first injected fuel contributes to the promotion of self-ignition of fuel after the start of the second injection. Therefore, when the quantity of the unburned residue of the first injected fuel is increased by making the first injection ratio higher for higher EGR rates, self-ignition of fuel after the start of the second injection is promoted. For the above reason, making the first injection ratio higher for higher EGR rates can improve the stability of diesel combustion advantageously.

<Transient Operation Control>

During transient operation of the internal combustion engine 1, the EGR rate in the intake air is changed, in some cases, in response to changes in the engine load. In such cases, the EGR rate in the intake air is adjusted to a target EGR ratio adapted to a target engine load by adjusting the degree of opening of the EGR valve 32. Specifically, when the EGR rate is to be decreased by decreasing the quantity of EGR gas, the degree of opening of the EGR valve 32 is decreased. When the EGR rate is to be increased by increasing the quantity of EGR gas, the degree of opening of the EGR valve 32 is increased. However, it takes some time for the actual EGR rate in the intake air becomes equal to the target EGR rate after the degree of opening of the EGR valve 32 is changed to the value corresponding to the target EGR rate. In other words, during transient operation of the internal combustion engine 1, there is a response delay in the change of the EGR rate relative to the change of the fuel injection quantity.

Consequently, during transient operation by which the engine load of the internal combustion engine 1 is changed to a target engine load, the actual EGR rate in the intake air is higher or lower than the target EGR rate during the response delay period from the time at which the total fuel injection quantity in one combustion cycle becomes equal to a target total fuel injection quantity corresponding to the target engine load to the time at which the actual EGR rate in the intake air becomes equal to the target EGR rate. In the period during which the actual EGR rate is higher or lower than the target EGR rate, if the first injection ratio and the second injection ratio are determined based on the engine load in the same way as during steady-state operation, the first injected fuel quantity and the second injected fuel quantity might not be appropriate for the actual EGR rate, possibly leading to an increase in the amount of smoke generated and/or instability in diesel combustion. In view of this, in this example, in order to reduce the amount of smoke generated and to enable stable diesel combustion, when the internal combustion engine 1 is in transient operation, the first injection ratio and the second injection ratio are set to values different from those during steady-state operation.

FIGS. 10 and 11 show time charts of the changes in engine load, the total fuel injection quantity in one combustion cycle, the first injection quantity, the second injection quantity, the first injection time, the second injection time, and the EGR rate in the intake air, during transient operation of the internal combustion engine 1. FIG. 10 shows changes in the respective values in a case where the EGR rate is decreased with a decrease in the engine load of the internal combustion engine 1. FIG. 11 shows changes in the respective values in a case where the EGR rate is increased with an increase in the engine load of the internal combustion engine 1. In graph (a) in FIGS. 10 and 11, line Lq represents the change in the engine load of the internal combustion engine 1 with time. In graph (b) FIGS. 10 and 11, line La represents the change in the total fuel injection quantity in one combustion cycle with time, line Lp represents the change in the first injection quantity with time, and line Lm represents the change in the second injection quantity with time. In graph (c) in FIGS. 10 and 11, line Ltp represents the change in the first injection time with time, and line Ltm represents the change in the second injection time with time. In graph (d) in FIGS. 10 and 11, line Legr represents the change in the EGR rate in the intake air with time.

In FIG. 10, the engine load of the internal combustion engine 1 decreases to a target engine load Qet at time T1. Accordingly, at time T1, the total fuel injection quantity in one combustion cycle is decreased to a target total fuel injection quantity Sat corresponding to the target engine load Qet. Moreover, at time T1, the degree of opening of the EGR valve 32 is decreased so as to decrease the EGR rate to a target EGR rate Regrt corresponding to the target engine load Qet. However, there is a response delay in the change in the EGR rate, as described above. Therefore, the actual EGR rate decreases to reach the target EGR rate Regrt at time T2 in FIG. 10. Therefore, as shown in graph (d) in FIG. 10, the actual EGR rate is higher than the target EGR rate Regrt during the response delay period dT1 in changing the EGR rate from time T1 to time T2.

Base values of the first injected fuel quantity and the second injected fuel quantity that are determined based on the engine load of the internal combustion engine 1 will be referred to as "the base first injected fuel quantity" and "the base second injected fuel quantity" respectively. The values of the base first injected fuel quantity and the base second injected fuel quantity are determined on the assumption that the operation state of the internal combustion engine 1 is steady-state operation, namely, on the assumption that the actual EGR rate in the intake air is at a value adapted to the engine load. In graph (b) in FIG. 10, the base first injected fuel quantity corresponding to the target engine load Qet is indicated by Spb, and the base second injected fuel quantity corresponding to the target engine load Qet is indicated by Smb.

As described above, during the response delay period dT1 in changing the EGR rate or the period from time T1 to time T2, the actual EGR rate in the intake air is higher than the target EGR rate Regrt. During the response delay period dT1, if the first injected fuel quantity is controlled to be equal to the base first injected fuel quantity Spb and the second injected fuel quantity is controlled to be equal to the base second injected fuel quantity Smb, the first injected fuel quantity is too small for the actual EGR rate, and the second injected fuel quantity is too large for the actual EGR rate. Then, it is difficult to keep a sufficient quantity of oxygen needed to burn the second injected fuel available in the region in which the spray of the second injected fuel is formed. In consequence, the amount of smoke generated will increase. Moreover, the ignitability of the pre-spray of the first injected fuel by the ignition plug 5 is deteriorated, and therefore diesel combustion becomes unstable.

In view of the above circumstances, in this example, during the response delay period dT1 in changing the EGR rate, the first injected fuel quantity and the second injected fuel quantity corresponding to the engine load are corrected as shown in graph (b) in FIG. 10. Specifically, during the response delay period dT1 in changing the EGR rate, the first injected fuel quantity is made larger than the base first injected fuel quantity Spb, and the second injected fuel quantity is made smaller than the base second injected fuel quantity Smb. In other words, during the response delay period dT1 in changing the EGR rate, the first injection ratio is made higher and the second injection ratio is made lower than their respective values during the time when the engine load of the internal combustion engine 1 is equal to the target engine load Qet and the actual EGR rate in the intake air is equal to the target EGR rate Regrt. With this control, deficiency in the quantity of oxygen available for combustion of the second injected fuel can be prevented from occurring during the response delay period dT1 in changing the EGR rate. In consequence, the generation of smoke can be reduced. Furthermore, ignitability of the pre-spray of the first injected fuel by the ignition plug 5 during the response delay period dT1 in changing the EGR rate can be improved. Moreover, the amount of unburned residue of the first injected fuel, which contributes to the promotion of self-ignition, can be increased. Consequently, the stability of diesel combustion can be improved.

In the basic combustion control according to this example, the first injection time and the second injection time are determined based on the engine load of the internal combustion engine 1 in such a way that the second injection time is set to the aforementioned proper injection time and that the interval between the first injection time and the second injection time is set equal to the aforementioned first injection interval. Base values of the first injection time and the second injection time determined based on the engine load of the internal combustion engine 1 will be referred to as "the base first injection time" and "the base second injection time". The values of the base first injection time and the base second injection time are determined on the assumption that the operation state of the internal combustion engine 1 is steady-state operation, namely on the assumption that the actual EGR rate is equal to the target EGR rate corresponding to the engine load. In graph (c) in FIG. 10, the base first injection time corresponding to the target engine load Qet is indicated by Tpb, and the base second injection time corresponding to the target engine load Qet is indicated by Tmb.

In this example, as shown in graph (c) in FIG. 10, in the response delay period dT1 in changing the EGR rate, during which the first injected fuel quantity and the second injected fuel quantity are corrected, the first injection time and the second injection time are also corrected. Specifically, in the response delay period dT1 in changing the EGR rate during which the first injected fuel quantity is increased from the base first injected fuel quantity, the first injection time is advanced from (or made earlier than) the base first injection time Tpb. In this case, the amount of advancement of the first injection time from the base first injection time Tpb is set in accordance with the amount of increase in the first injected fuel quantity from the base first injected fuel quantity Spb. In the case where the first injection time is advanced, the time of ignition by the ignition plug 5 (ignition time) is also advanced so as to keep an optimum ignition interval. As described above, during the response delay period dT1 in changing the EGR rate, the actual EGR rate in the intake air is higher than the target EGR rate Regrt, and therefore the unburned residue rate of the first injected fuel is high. If the first injection time is advanced in accordance with the increase in the first injected fuel quantity, the unburned residue rate of the first injected fuel can be increased further. Specifically, the unburned residue rate of the first injected fuel, which contributes to the promotion of self-ignition after the start of the second injection, can be increased more than that in the case where the first injection time is set to the base first injection time Tpb. In Consequence, the stability of diesel combustion can be improved further.

In the response delay period dT1 in changing the EGR rate, the second injection time is also advanced from (or made earlier than) the base second injection time Tmb in accordance with the advancement of the first injection time. Thus, an appropriate first injection interval Di1 can be maintained. The higher the EGR rate is, the more slowly the combustion occurring after the second injection progresses. Therefore, in the period during which the actual EGR rate is higher than the target EGR rate, the second injection time is advanced from the base second injection time Tmb. Thus, the second injection time is kept at the proper injection time.

In the case shown in FIG. 11, the engine load of the internal combustion engine 1 increases to a target engine load Qet at time T3. Accordingly, at time T3, the total fuel injection quantity in one combustion cycle is increased to a target total fuel injection quantity Sat corresponding to the target engine load Qet. Moreover, at time T3, the degree of opening of the EGR valve 32 is increased so as to increase the EGR rate to a target EGR rate Regrt corresponding to the target engine load Qet. However, there is a response delay in the change in the EGR rate, as described above. Therefore, the actual EGR rate increases to reach the target EGR rate Regrt at time T4 in FIG. 11. Therefore, as shown in graph (d) in FIG. 11, the actual EGR rate in the intake air is lower than the target EGR rate Regrt during the response delay period dT2 in changing the EGR rate from time T3 to time T4.

In graph (b) in FIG. 11, the base first injected fuel quantity corresponding to the target engine load Qet is indicated by Spb, and the base second injected fuel quantity corresponding to the target engine load Qet is indicated by Smb. As described above, during the response delay period dT2 in changing the EGR rate from time T3 to time T4, the actual EGR rate in the intake air is lower than the target EGR rate Regrt. During the response delay period dT2 in changing the EGR rate, if the first injected fuel quantity is controlled to be equal to the base first injected fuel quantity Spb and the second injected fuel quantity is controlled to be equal to the base second injected fuel quantity Smb, the first injected fuel quantity is too large for the actual EGR rate. Then, although the quantity of oxygen supplied to the combustion chamber increases because the actual EGR rate is lower than the target EGR rate Regrt, the quantity of oxygen consumed in combustion of the first injected fuel increases too much. Therefore, it is difficult to provide a sufficient quantity of oxygen needed to burn the second injected fuel satisfactorily when the second injection is performed. In consequence, the amount of smoke generated will increase.

In view of the above circumstances, in this example, during the response delay period dT2 in changing the EGR rate, the first injected fuel quantity and the second injected fuel quantity corresponding to the engine load are corrected as shown in graph (b) in FIG. 11. Specifically, during the response delay period dT2 in changing the EGR rate, the first injected fuel quantity is made smaller than the base first injected fuel quantity Spb, and the second injected fuel quantity is made larger than the base second injected fuel quantity Smb. In other words, during the response delay period dT2 in changing the EGR rate, the first injection ratio is made lower and the second injection ratio is made higher than their respective values during the time when the engine load of the internal combustion engine 1 is equal to the target engine load Qet and the actual EGR rate in the intake air is equal to the target EGR rate Regrt. With this control, the quantity of oxygen consumed in combustion of the first injected fuel before the second injection can be made smaller, during the response delay period dT2 in changing the EGR rate. Therefore, deficiency in the quantity of oxygen available for combustion of the second injected fuel can be prevented from occurring when the second injection is performed. In consequence, the generation of smoke can be reduced.

In this example, as shown in graph (c) in FIG. 11, in the response delay period dT2 in changing the EGR rate, during which the first injected fuel quantity and the second injected fuel quantity are corrected, the first injection time and the second injection time are also corrected. Specifically, in the response delay period dT2 in changing the EGR rate, the second injection time is retarded from (or made later than) the base second injection time Tmb. In this case, the amount of retardation of the second injection time from the base second injection time Tmb is set in accordance with the amount of increase in the second injected fuel quantity from the base second injected fuel quantity Smb. As described above, during the response delay period dT2 in changing the EGR rate, the quantity of inert gas in the combustion chamber is relatively small, because the actual EGR rate in the intake air is lower than the target RGR rate Regrt. If the second injected fuel quantity is increased under this circumstance, the possibility of occurrence of knocking becomes high. Retarding the second injection time from the base second injection time Tmb in accordance with the increase in the second injected fuel quantity can reduce the possibility of occurrence of knocking.

During the response delay period dT2 in changing the EGR rate, the first injection time is also retarded from (or made later than) the base first injection time Tpb in accordance with the retardation of the second injection time. Thus, an appropriate first injection interval Di1 can be maintained.

<EGR Control Flow>

In the following, a control flow of the EGR control according to this example will be described with reference to FIG. 12. FIG. 12 is a flow chart of the control flow of the EGR control according to this example. This control flow is stored in the ECU 20 in advance and carried out repeatedly at predetermined intervals by executing a control program stored in the ECU 20 while the internal combustion engine 1 is operating.

In this flow, firstly in step S101, a target engine load Qet of the internal combustion engine 1 is calculated based on the measurement value of the accelerator position sensor 22. Then, in step S102, a target EGR rate Regrt is calculated based on the target engine load Qet calculated in step S101. In this example, the interrelation between the engine load of the internal combustion engine 1 and the EGR rate in the intake air is determined in advance by, for example, an experiment and stored in the ECU 20 as a map or a function. In step S102, the target EGR rate Regrt is calculated using this map or function. Then, in step S103, a target opening degree Vegrt of the EGR valve 32 corresponding to the target EGR rate Regrt calculated in step S102 is calculated. Then, in step S104, the degree of opening of the EGR valve 32 is controlled to the target opening degree Vergt calculated in step S103.

When the process is performed according to the above-described flow in the case where the operation state of the internal combustion engine 1 is steady-state operation, the degree of opening of the EGR valve 32 is kept intact in step S104 so as to keep the EGR rate in the intake air at the EGR rate corresponding to the current engine load. On the other hand, in the case where the operation state of the internal combustion engine 1 is transient operation and the target EGR rate Regrt changes with a change in the target engine load Qet, the degree of opening of the EGR valve 32 is changed in step S104. As described above, it takes some time for the actual EGR rate in the intake air to reach the target EGR rate Regrt updated with the change in the target engine load Qet after the degree of opening of the EGR valve 32 is changed.

<Combustion Control Flow>

A control flow of the combustion control according to this example will be described with reference to FIGS. 13 to 15. FIG. 13 is a flow chart of the control flow of the combustion control according to this example. FIGS. 14 and 15 are flow charts of calculation of the base values of parameters used in the combustion control according to this example, which include the base first injected fuel quantity Spb, the base second injected fuel quantity Smb, the base first injection time Tpb, the base second injection time Tmb, and the base ignition time Tsb. These flows are stored in the ECU 20 in advance and carried out repeatedly at predetermined intervals by executing a control program stored in the ECU 20 while the internal combustion engine 1 is operating. These control flows are executed concurrently with the control flow of the EGR control shown in FIG. 12.

FIG. 16 shows exemplary maps used to calculate the load-adapted injection quantity (i.e. fuel injection quantity adapted to the engine load of the internal combustion engine 1) S0, the base first injected fuel quantity Spb, the base second injected fuel quantity Smb, the base first injection time Tpb, the base second injection time Tmb, and the base ignition time Tsb in the combustion control according to this example. In the upper graph (a) in FIG. 16, line L20 represents relationship between the engine load of the internal combustion engine 1 and the load-adapted injection quantity S0, line L21 represents relationship between the engine load and the base first injected fuel quantity Spb, and L22 represents relationship between the engine load and the base second injected fuel quantity Smb. In graph (a) in FIG. 16, M1 represents the amount of unburned residue of the first injected fuel that remains without being burned by the propagation of flame generated by ignition by the ignition plug 5. In graph (a) in FIG. 16, S1 is a load-adapted fuel injection quantity corresponding to the engine load on the border between an operation range R3 (which will be hereinafter referred to as "the low load range R3") and another operation range R4 (which will be hereinafter referred to as "the middle load range R4"). This fuel injection quantity S1 will be hereinafter referred to as "the first predetermined quantity S1". In graph (a) in FIG. 16, S2 (>S1) is a load-adapted fuel injection quantity corresponding to the engine load on the border between the middle range R4 and another operation range R5 (which will be hereinafter referred to as "the high load range R5"). This fuel injection quantity S2 will be hereinafter referred to as "the second predetermined quantity S2".

In the lower graph (b) in FIG. 16, line L31 represents relationship between the engine load of the internal combustion engine 1 and the base first injection time Tpb, line L30 represents relationship between the engine load and the base ignition time Tsb, and line L32 represents relationship between the engine load and the base second injection time Tmb. The distance between line L31 and line L32 represents the first injection interval Di1, and the distance between line L31 and L30 represents the ignition interval Ds. The vertical axis of graph (b) in FIG. 16 represents the crank angle relative to the top dead center of the compression stroke (BTDC), where larger values represent earlier times during the compression stroke.

In the control flow of the combustion control shown in FIG. 13, firstly in step S201, a target engine load Qet of the internal combustion engine 1 is calculated based on the measurement value of the accelerator position sensor 22. Then, in step S202, a load-adapted injection quantity S0 is calculated based on the target engine load Qet calculated in step S201. Specifically, the load-adapted injection quantity S0 corresponding to the target engine load Qet is calculated using the map represented by line L20 in graph (a) in FIG. 16. In this example, the relationship between the target engine load and the load-adapted injection quantity S0 is recorded in the control map in which the load-adapted injection quantity S0 increases as the target engine load increases, as represented by line L20. Then, in step S203, the base first injected fuel quantity Spb corresponding to the target engine load Qet, the base second injected fuel quantity Smb corresponding to the target engine load Qet, the base first injection time Tpb corresponding to the target engine load Qet, the base second injection time Tmb corresponding to the target engine load Qet, and the base ignition time Tsb corresponding to the target engine load Qet are calculated according to the flows shown in FIGS. 14 and 15.

In the flow shown in FIG. 14, firstly in step S301, the base second injection time Tmb corresponding to the target engine load Qet is determined using the control map represented by line L32. As described above, in order to improve the thermal efficiency of the internal combustion engine 1, the base second injection time Tmb is set to the proper injection time before the top dead center of the compression stroke. The proper injection time in the internal combustion engine 1 has been measured by an experiment conducted previously for every value of the engine load, and the control map represented by line L32 has been prepared based on the result of the 1 measurement. The base second injection time Tmb is gradually advanced as the engine load increases up to a certain engine load. However, in the high load range R5 (namely, in the range in which the load-adapted injection quantity S0 is equal to or larger than S2), the degree of advancement is kept at an upper limit value. This is because the proper injection time of the second injection time is determined in accordance with the second injected fuel quantity Sm, and the base second injected fuel quantity Smb is fixed to a maximum base second injected fuel quantity Smbmax in the high load range R5, as will be described later.

Then, in step S302, it is determined whether or not the load-adapted injection quantity S0 calculated in step S202 in the flow shown in FIG. 13 is equal to or smaller than the first predetermined quantity S1, in other words, it is determined whether or not the target engine load Qet of the internal combustion engine 1 is in the low load range R3. The low load range R3 is defined as an operation range in which the fuel injection quantity is so small that even if only the second injected fuel quantity is increased in response to increases in the engine load, the possibility of increase in the amount of smoke and the possibility of unstable combustion due to the evaporation latent heat of the second injected fuel are low. If the determination made in step S302 is affirmative, the processing of step S303 is executed next. If the determination made in step S302 is negative, the processing of step S307 is executed next.

If the determination made in step S302 is affirmative, in other words, if the load-adapted injection quantity S0 is equal to or smaller than the first predetermined quantity S1 (namely, if the engine load of the internal combustion engine 1 is in the low load range R3), in step S303, the base first injected fuel quantity Spb is set to a minimum base first injected fuel quantity Spbmin based on the control map represented by line L21 in graph (a) in FIG. 16. The minimum base first injected fuel quantity Spbmin is the lower value of the base first injected fuel quantity that enables generation of flame serving as an ignition source for starting combustion of the second injected fuel, when the second injection is performed. If the first injected fuel quantity Sp is large, combustion caused by ignition by the ignition plug 5 (i.e. spray guide combustion) is facilitated, and therefore there is a possibility that the unburned residue rate of the first injected fuel may become small. Setting the base first injected fuel quantity Spb to the minimum base first injected fuel quantity Spbmin can make the unburned residue rate as high as possible. Therefore, in the low load range R3, the base first injected fuel quantity Spb is set to the minimum base first injected fuel quantity Spbmin. This makes it possible to attain high thermal efficiency while ensuring stable combustion. As described above, in the low load range R3, only the second injected fuel quantity Sm is increased in response to increases in the engine load, and the base first injected fuel quantity Spb is fixed at the minimum base first injected fuel quantity Spbmin, in the low load range R3, as represented by line L21 in graph (a) in FIG. 16.

Then, in step S304, the base first injection time Tpb is determined using the control map represented by line L31 in graph (b) in FIG. 16. In this processing step, the base first injection time Tpb is determined in relation to the base second injection time Tmb determined in step S301 in such a way as to set an appropriate first injection interval Di with which a satisfactory thermal efficiency is attained when the first injected fuel quantity is the minimum base first injected fuel quantity Spbmin. As described above, in the low load range R3, the base first injected fuel quantity Spb is fixed at the minimum base first injected fuel quantity Spbmin. Consequently, the first injection interval Di is also kept constant in the low load range R3. Therefore, in the low load range R3, when the base second injection time Tmb is changed in response to a change in the engine load, the base first injection time Tpb is also changed in accordance with the change of the base second injection time Tmb.

Then, in step S305, the base ignition time Tsb is determined using the control map represented by line L30 in graph (b) in FIG. 16. As shown in graph (b) in FIG. 16, the ignition interval Ds, which is the interval between the base first injection time Tpb and the base ignition time Tsb, is kept constant. Therefore, in the low load range R3, when the base first injection time Tpb is changed in accordance with the change of the base second injection time Tmb, the base ignition time Tsb is also changed in accordance with the change of the base first injection time Tpb.

Then, in step S306, the base second injected fuel quantity Smb is determined using the control map represented by line L22 in graph (a) in FIG. 16. In the low load range R3, the relationship between the load-adapted injection quantity S0 represented by line S20 and the base second injected fuel quantity Smb is expressed by the following equation 2:

$$Smb = S0 - Spb \times \alpha \qquad \text{(Equation 2)},$$

where α is the unburned residue rate of the first injected fuel.

As described before, in the basic combustion control according to this example, the unburned residue of the first injected fuel self-ignites and is burned by diffusion combustion together with the second injected fuel to contribute to the engine power. Therefore, in terms of contribution to the engine power, a portion of the first injected fuel or the unburned residue of the first injected fuel can be regarded to be equivalent to the second injected fuel. Therefore, an appropriate value of the base second injected fuel quantity Smb can be determined by determining a factor α representing the unburned residue rate of the first injected fuel in advance by an experiment and calculating the base second injected fuel quantity Smb according to the above equation 2, which takes into account this factor α. The unburned residue rate of the first injected fuel changes depending on the ignition interval Ds and the first injection interval Di1. Hence, the value of the factor α is determined based on them. In the low load range R3, since the ignition interval Ds and the first injection interval Di1 are both constant, the factor α in the above equation 2 is also a constant value. Moreover, in the low load range R3, the base first injected fuel quantity Spb is fixed at the minimum base first injected fuel quantity Spbmin for the above-described reason, and hence Spb=Spbmin in the above equation 2. In cases where the quantity of fuel burned by ignition by the ignition plug 5 (that is, the quantity of fuel burned by spray guide combustion) is very small relative to the first injected fuel quantity, the factor α may be set to be equal to 1 in the control process. In this case, the control is performed in such a way that the load-adapted injection quantity S0 is equal to the target total fuel injection quantity (or the total fuel injection quantity in one combustion cycle corresponding to the target engine load Qet).

The base values of the parameters relating to the first injection, second injection, and ignition in the low load range R3 are determined in the above-described way. When the operation state of the internal combustion engine 1 is steady-state operation (in other words, when the actual EGR rate in the intake air is equal to the target EGR rate corresponding to the target engine load Qet) in the low load range R3, if the combustion control is performed with the first injected fuel quantity, the second injected fuel quantity, the first injection time, the second injection time, and the ignition time being set to the respective base values determined as above, an amount of unburned residue of the first injected fuel represented by M1 in graph (a) in FIG. 16 remains after the ignition of the pre-spray of the first injected fuel. As described above, in the low load range R3, the base first injected fuel quantity Spb is fixed at the minimum base first injected fuel quantity Spbmin and the ignition interval Ds and the first injection interval Di1 are also fixed. Consequently, the quantity of the unburned residue of the first injected fuel is substantially constant.

If the determination made in step S302 is negative, namely if the load-adapted injection quantity S0 is larger than the first predetermined quantity S1, it is determined in step S307 whether or not the load-adapted injection quantity S0 determined in step S202 in the flow shown in FIG. 13 is equal to or smaller than the second predetermined quantity S2, in other words, it is determined whether or not the target engine load Qet of the internal combustion engine 1 is in the middle load range R4. The middle load range R4 is defined as an operation range in which if only the second injected fuel quantity is increased in response to increases in the engine load, the possibility of increase in the amount of smoke and the possibility of unstable combustion due to the evaporation latent heat of the second injected fuel are high. Therefore, in the middle load range R4, not only the second injected fuel quantity but also the first injected fuel quantity is increased in response to increases in the engine load. The second predetermined quantity S2 is set as a fuel injection quantity corresponding to the engine load above which the base second injected fuel quantity is set to its upper limit value (the maximum base second injected fuel quantity Smbmax) in view of the amount of smoke generated and the combustion stability, namely, the engine load for which the quantity of fuel that can be injected at the proper injection time reaches the upper limit value. If the determination made in step S307 is affirmative, the processing of step S308 is executed next. If the determination made in step S307 is negative, the processing of step S312 is executed.

If the determination made in step S307 is affirmative, in other words, if the load-adapted injection quantity S0 is larger than the first predetermined quantity S1 and equal to or smaller than the second predetermined quantity S2 (namely, if the engine load of the internal combustion engine 1 is in the middle load range R4), the base first injected fuel quantity Spb is determined using the control map represented by line L21 in graph (a) in FIG. 16, in step S308. In this processing step, the higher the engine load of the internal combustion engine 1 is, the larger the base first injected fuel quantity Spb is. Then, in step S309, the base first injection time Tpb is determined using the control map represented by line L31 in graph (b) in FIG. 16. If the first injection interval Di1, which is the interval between the base first injection time Tpb and the base second injection time Tmb, is fixed while the base first injected fuel quantity Spb is increased in response to an increase in the engine load of the internal combustion engine 1, when the first injection is performed with the first injected fuel quantity being set to the base first injected fuel quantity Spb, the larger the base first injected fuel quantity Spb is, the more likely the unburned residue of the first injected fuel and the second injected fuel overlap when the second injection is performed, and the more the amount of smoke generated increases. In view of this, the higher the engine load of the internal combustion engine 1 is, the more the base first injection time Tpb is advanced so as to increase the first injection interval Di1, in step S309. In other words, in the middle load range R4, the base first injection time Tpb is advanced to a degree larger than the degree of advancement of the base second injection time Tmb, and the higher the engine load is, the larger the degree of advancement of the base first injection time Tpb is. Controlling the base first injection time Tpb in this way can reduce the overlapping of the unburned residue of the first injected fuel and the second injected fuel even when the quantity of the unburned residue of the first injected fuel increases due to an increase in the base first injected fuel quantity Spb. In consequence, the amount of smoke generated due to the overlapping of the unburned residue of the first injected fuel and the second injected fuel can be reduced. Moreover, although the quantity of the unburned residue of the first injected fuel increases with increases in the engine load, the unburned residue is burned in combustion occurring after the start of the second injection to contribute to the engine power as described above, and therefore the thermal efficiency of the internal combustion engine 1 can be kept at high levels.

Then, in step S310, the base ignition time Tsb is determined using the control map represented by line L30 in graph (b) in FIG. 16. As shown in graph (b) in FIG. 16, in the middle load range R4 also, the ignition interval Ds, which is the interval between the base first injection time Tpb and the base ignition time Tsb, is kept constant. Therefore, when the base first injection time Tpb is advanced to a degree larger than the degree of advancement of the base second injection time Tmb, the base ignition time Tsb is also advanced to a degree substantially the same as the base first injection time Tpb.

Then, in step S311, the base second injected fuel quantity Smb is determined using the control map represented by line L22 in graph (a) in FIG. 16. In the middle load range R4 also, as with in the low load range R3, the relationship represented by line L22 between the load-adjusted injection quantity S0 and the base second injected fuel quantity Smb is expressed by the aforementioned equation 2. Therefore, the base second injected fuel quantity Smb can be determined taking into account characteristics of the basic combustion control according to this example, as with in the processing of step S306. As described before, in the middle load range R4, the base first injected fuel quantity Spb is increased in response to increases in the engine load. Therefore, the increase rate of the base second injected fuel quantity Smb (which is the rate of the increase in the base second injected fuel quantity Smb to the increase in the engine load) in the middle load range R4 is smaller than the increase rate of the base second injected fuel quantity Smb in the low load range R3, in which the base first injected fuel quantity Spb is fixed. Therefore, it is possible to reduce the increase in the smoke due to the increase in the second injected fuel quantity and the occurrence of misfire due to the increase in the evaporation latent heat of the second injected fuel.

The base values of parameters relating to the first injection, second injection, and ignition in the middle load range R4 are determined in the above-described way. When the operation state of the internal combustion engine 1 is steady-state operation (in other words, when the actual EGR rate in the intake air is equal to the target EGR rate corresponding to the target engine load Qet) in the middle load range R4, if the combustion control is performed with the first injected fuel quantity, the second injected fuel quantity, the first injection time, the second injection time, and the ignition time being set to the respective base values determined as above, an amount of unburned residue of the first injected fuel represented by M1 in graph (a) in FIG. 16 remains after the ignition of the pre-spray of the first injected fuel. As described above, in the middle load range R4, the base first injected fuel quantity Spb is increased in response to increases in the engine load, and the base first fuel injection time Tpb and the base ignition time Tsb are advanced with the ignition interval Ds being kept constant. Consequently, the quantity of the unburned residue of the first injected fuel increases with increases in the engine load.

If the determination made in step S307 is negative, in other words, if the load-adapted injection quantity S0 is larger than the second predetermined value S2, the engine load of the internal combustion engine 1 is in the high load range R5. As described above, the second predetermined quantity S2 is set as a fuel injection quantity corresponding to the engine load above which the base second injected fuel quantity Smb is set to its upper limit value in view of the amount of smoke generated and the combustion stability. Therefore, the high load range R5 is set as an operation range in which only the base first injected furl quantity Spb is increased in response to increases in the engine load.

If the determination made in step S307 is negative, in step S312, the base second injected fuel quantity Smb is set to the maximum base second injected fuel quantity Smbmax. The maximum base second injected fuel quantity Smbmax is the largest base second injected fuel quantity with which the amount of smoke generated can be kept within an allowable range and stable combustion can be ensured (namely, misfire due to the evaporation latent heat of the second injected fuel can be prevented from occurring). As shown by line L22 in graph (a) in FIG. 16, in the high load range R5, the base second injected fuel quantity Smb is fixed at the maximum base second injected fuel quantity Smbmax.

Then, in step S313, the base first injected fuel quantity Spb is determined using the control map represented by line L21 in graph (a) in FIG. 16. In the high load range R5, the relationship represented by line L21 between the load-adapted injection quantity S0 and the base first injected fuel quantity Spb is expressed by the following equation 3:

$$Spb=(S0-Smb)/\alpha \qquad \text{(Equation 3),}$$

where $\alpha$ is the unburned residue rate of the first injected fuel, as with in equation 2. According to the above equation 3, the base first injected fuel quantity Spb can be determined taking into account characteristics of the basic combustion control according to this example. In the high load range R5, the base second injected fuel quantity Smb is fixed at the maximum base second injected fuel quantity Smbmax for the above-described reason, and hence Smb=Smbmax in the above equation 3. Moreover, in the high load range R5, since the base second injected fuel quantity Smb is fixed at the maximum base second injected fuel quantity Smbmax, the increase rate of the base first injected fuel quantity Spb (i.e. the rate of the increase in the base first injected fuel quantity Spb to the increase in the engine load) is higher than the increase rate of the base first injected fuel quantity Spb in the middle load range R4, in which the base second injected fuel quantity Smb is also increased in response to increases in the engine load.

Then, in step S314, the base first injection time Tpb is determined using the control map represented by line L31 in graph (b) in FIG. 16. In the high load range R5, since the base second injected fuel quantity Smb is fixed at the maximum base second injected fuel quantity Smbmax, the base second injection time Tmb determined in step S302 is also fixed. On the other hand, as described above, the increase rate of the base first injected fuel quantity Spb in the high load range R5 is larger than the increase rate of the base first injected fuel quantity Spb in the middle load range R4. Therefore, in the high load range R5, it is necessary to make the first injection interval Di1 longer than the first injection interval Di1 in the middle load range R4 in order to reduce overlapping of the unburned residue of the first injected fuel and the second injected fuel when the second injection is performed, and it is also necessary to make the increase rate of the first injection interval Di (which is the rate of the increase in the first injection interval Di1 to the increase in the engine load) higher than the increase rate of the first injection interval Di1 in the middle load range R4. Therefore, in step S314, the base first injection time Tpb is advanced in such a way that the higher the engine load of the internal combustion engine 1 is, the longer the first injection interval Di1 is made. Then, the advancement rate of the base first injection time Tpb (which is the rate of the degree of advancement of the base first injection time Tpb to the increase in the engine load) is higher than the advancement rate of the base first injection time Tpb in the middle load range R4. By controlling the base first injection time Tpb in this way, only the first injected fuel quantity is increased in response to increases in the engine load, and the overlapping of the unburned residue of the first injected fuel and the second injected fuel can be reduced, even though the unburned residue of the first injected fuel increases. Consequently, the amount of smoke generated due to the overlapping of the unburned residue of the first injected fuel and the second injected fuel can be reduced. Moreover, even though the unburned residue of the first injected fuel increases as the engine load increases, the thermal efficiency of the internal combustion engine 1 can be kept at high levels because the unburned residue is burned in combustion occurring after the start of the second injection to contribute to the engine power.

Then, in step S315, the base ignition time Tsb is determined using the control map represented by line L30 in graph (b) in FIG. 16. In the high load range R5 also, the ignition interval Ds, which is the interval between the base first injection time Tpb and the base ignition time Tsb, is kept constant, as shown in graph (b) in FIG. 16. Therefore, when the base first injection time Tpb is advanced in response to an increase in the engine load, the base ignition time Tsb is also advanced to a degree substantially the same as the base first injection time Tsb, as with in the middle load range R4.

The base values of the parameters relating to the first injection, second injection, and ignition in the high load range R5 are determined in the above-described way. When the operation state of the internal combustion engine 1 is steady-state operation (in other words, when the actual EGR rate in the intake air is equal to the target EGR rate corresponding to the target engine load Qet) in the high load range R5, if the combustion control is performed with the first injected fuel quantity, the second injected fuel quantity, the first injection time, the second injection time, and the ignition time being set to the respective base values determined as above, an amount of unburned residue of the first injected fuel represented by M1 in graph (a) in FIG. 16 remains after the ignition of the pre-spray of the first injected fuel. As described above, in the high load range R5, as the engine load increases, the base first injected fuel quantity Spb is increased, and the base first injection time Tpb and the base ignition time Tsb are advanced with the ignition interval Ds being kept constant. In consequence, as described above, as the engine load increases, the unburned residue of the first injected fuel increases. Moreover, in the high load range R5, the increase rate of the base first injected fuel quantity Spb and the advancement rate of the base first injection time Tpb (or the increase rate of the first injection interval Di1) are higher than those in the middle load range R4. Consequently, the increase rate of the unburned residue of the first injected fuel relative to the increase in the engine load is higher than that in the middle load range R4. Therefore, it is possible to attain the engine power required by the increase in the engine load only by increasing the first injected fuel quantity.

Referring back to the flow shown in FIG. 13, after the base first injected fuel quantity Spb corresponding to the target engine load Qet, the base second injected fuel quantity Smb corresponding to the target engine load Qet, the base first injection time Tpb corresponding to the target engine load Qet, the base second injection time Tmb corresponding to the target engine load Qet, and the base ignition time Tsb corresponding to the target engine load Qet are calculated in step S203, the actual EGR rate Regr in the intake air supplied to the internal combustion engine 1 is calculated in step S204. The EGR rate Regr is calculated based on the intake air quantity measured by the air flow meter 72 and the intake air pressure measured by the pressure sensor 73. In this example, the pressure sensor 73 measures the pressure of the intake air after the supply of EGR gas through the EGR passage 31. Therefore, the value measured by the pressure sensor 73 correlates with the sum of the intake air quantity and the EGR gas quantity. Therefore, the actual EGR rate Regr in the intake air can be calculated from the intake air quantity measured by the air flow meter 72 and the intake air pressure measured by the pressure sensor 73. In this example, the relationship among the intake air quantity measured by the air flow meter 72, the intake air pressure measured by the pressure sensor 73, and the EGR rate is determined in advance by, for example, an experiment, and stored in the ECU 20 as a map or function. In step S204, the EGR rate Regr is calculated using this map or function.

Then, in step S205, it is determined whether or not the EGR rate Regr calculated in step S204 is substantially equal to the target EGR rate Regrt corresponding to the target engine load Qct. The target EGR rate Regrt can be calculated in the same manner as the processing of step S102 in the flow shown in FIG. 12. The value of the target EGR rate Regrt calculated in step S102 may be saved to the ECU 20 when the flow shown in FIG. 12 is executed, and the value of the target EGR rate Regrt saved in the ECU 20 may be retrieved when the processing of step S204 is executed.

When the operation state of the internal combustion engine 1 is steady-state operation, the actual EGR rate in the intake air is substantially equal to the target EGR rate Regrt. In this case, an affirmative determination is made in step S205. On the other hand, when the operation state of the internal combustion engine 1 is transient operation, the actual EGR rate Regr in the intake air is different from the target EGR rate Regrt during the response delay period in changing the EGR rate, such as the period from T1 to T2 in FIG. 10 and the period from T3 to T4 in FIG. 11. In this case, a negative determination is made in step S205. In step S205, it may be determined that the actual EGR rate Regr in the intake air is substantially equal to the target EGR rate Regrt, if the difference between the EGR rate Regr calculated in step S204 and the target EGR rate Regrt is in a predetermined range.

If the determination made in step S205 is affirmative, then in step S206, the parameters of the combustion control are set to the base values calculated in step S203. Specifically, the first injected fuel quantity Sp, the second injected fuel quantity Sm, the first injection time Tp, the second injection time Tm, and the ignition time Ts are set to the base first injected fuel quantity Spb, the base second injected fuel quantity Smb, the base first injection time Tpb, the base second injection time Tmb, and the base ignition time Tsb calculated in step S203, respectively. Then, in step S207, the first injection and the second injection by the fuel injection valve 6 and ignition by the ignition plug 5 are performed according to the first injected fuel quantity Sp, the second injected fuel quantity Sm, the first injection time Tp, the second injection time Tm, and the ignition time Ts set in step S206.

On the other hand, if the determination made in step S205 is negative, then in step S208, a factor c1 used to calculate a corrected first injected fuel quantity Spa1, a corrected first injection time Tpa1, and a corrected ignition time Tsa1 is calculated. The factor c1 is calculated by the following equation 4 based on the actual EGR rate Regr in the intake air calculated in step S204 and the target EGR rate Regrt:

$$c1 = Regr/Regrt \quad \text{(Equation 4).}$$

Then, in step S209, the corrected first injected fuel quantity Spa1, the corrected first injection time Tpa1, and the corrected ignition time Tsa1 are calculated by the following equations 5 to 7 using the factor c1 calculated in step S208:

$$Spa1 = Spb \times c1 \quad \text{(Equation 5),}$$

$$Tpa1 = Tpb \times c1 \quad \text{(Equation 6),}$$

and $$Tsa1 = Tsb \times c1 \quad \text{(Equation 7).}$$

Then, in step S210, a corrected second injected fuel quantity Sma1 and a corrected second injected fuel quantity Tma1 are calculated by the following equations 8 and 9:

$$Sma1 = Sat - Spa1 \quad \text{(Equation 8),}$$

where Sat is the target total fuel injection quantity (Sat=Spb+Smb), and $$Tma1 = Tmb \times (Smb/Sma1) \quad \text{(Equation 9).}$$

According to the above equations 5 to 9, when the actual EGR rate Regr in the intake air is higher than the target EGR rate Regrt, namely during the response delay period in changing the EGR rate during transient operation in which the EGR rate is decreased in response to a change in the engine load (e.g. during the response delay period dT1 in FIG. 10), the corrected first injected fuel quantity Spa1 is larger than the base first injected fuel quantity Spb, and the corrected second injected fuel quantity Sma1 is smaller than the base second injected fuel quantity Smb. Moreover, the corrected first injection time Tpa1, the corrected ignition time Tsa1, and the corrected second injection time Tma1 are larger than the respective base values. (In other words, the corrected first injection time Tpa1 is earlier than the base first injection time Tpb, the corrected ignition time Tsa1 is earlier than the base ignition time Tsb, and the corrected second injection time Tma1 is earlier than the base second injection time Tmb.) According to the above equations 5 to 9, when the actual EGR rate Regr in the intake air is lower than the target EGR rate Regrt, namely during the response delay period in changing the EGR rate during transient operation in which the EGR rate is increased in response to a change in the engine load (e.g. during the response delay period dT2 in FIG. 11), the corrected first injected fuel quantity Spa1 is smaller than the base first injected fuel quantity Spb, and the corrected second injected fuel quantity Sma1 is larger than the base second injected fuel quantity Smb. Moreover, the corrected first injection time Tpa1, the corrected ignition time Tsa1, and the corrected second injection time Tma1 are smaller than the respective base values. (in other words, the corrected first injection time Tpa1 is later than the base first injection time Tpb, the corrected ignition time Tsa1 is later than the base ignition time Tsb, and the corrected second injection time Tma1 is later than the base second injection time Tmb.)

Equations to be used to calculate corrected values of the parameters of the combustion control in this example are not limited to the above equations 4 to 9. In cases where other correction factor and equations are used, the above-described relationships between the base values of the parameters and the corrected values of them in the case where the actual EGR rate Regr in the intake air is higher than the target EGR rate Regrt and in the case where the actual EGR rate Regt is lower than the target EGR rate Regrt also apply.

Then, in step S211, the parameters of the combustion control are set to the corrected values calculated in steps S209 and S210. Specifically, the first injected fuel quantity Sp, the second injected fuel quantity Sin, the first injection time Tp, the second injection time Tm, and the ignition time Ts are set to the corrected first injected fuel quantity Spa1, the corrected second injected fuel quantity Sma1, the corrected first injection time Tpa1, the corrected second injection time Tma1, and the corrected ignition time Tsa1 respectively. Then, in step S207, the first injection and the second injection by the fuel injection valve 6 and ignition by the ignition plug 5 are performed according to the first injected fuel quantity Sp, the second injected fuel quantity Sm, the first injection time Tp, the second injection time Tm, and the ignition time Ts set in step S211.

According to the above-described control flow, when the target engine load Qet is in the low load range R3, the base first injected fuel quantity Spb is set to the minimum base first injected fuel quantity Spmin. If the actual EGR rate Regr in the intake air becomes lower than the target EGR rate Regrt when the target engine load Qet is in the low load range R3, the corrected first injected fuel quantity Spa1 becomes smaller than the base first injected fuel quantity Spb. Consequently, the first injected fuel quantity Sp becomes smaller than the minimum base first injected fuel quantity Spbmin. The smallest value of the first injected fuel quantity that enables generation of flame serving as an ignition source for starting combustion of the second injected fuel when the second injection is performed varies depending on the EGR rate in the intake air. As described previously, as the EGR rate decreases, the quantity of inert gas in the combustion chamber decreases to promote combustion. Therefore, decreases in the EGR rate lead to decreases in the smallest value of the first injected fuel quantity that enables generation of flame serving as an ignition source for starting combustion of the second injected fuel when the second injection is performed. Therefore, if actual the EGR rate Regr becomes lower than the target EGR rate Regrt when the target engine load Qet is in the low load range R3, even if the first injected fuel quantity Sp becomes smaller than the minimum base first injected fuel quantity Spmin, flame serving as an ignition source for starting combustion of the second injected fuel can be generated.

According to the above-described control flow, when the target engine load Qet is in the high load range R5, the base second injected fuel quantity Smb is set to the maximum base second injected fuel quantity Smbmax. If the actual EGR rate Regr in the intake air becomes lower than the target EGR rate Regrt when the target engine load Qet is in the high load range R5, the corrected second injected fuel quantity Sma1 becomes larger than the base second injected fuel quantity Smb. Consequently, the second injected fuel quantity Sm becomes larger than the maximum base second injected fuel quantity Smbmax. The largest value of the second injected fuel quantity with which the amount of smoke generated can be kept within an allowable range and stable combustion can be ensured varies depending on the EGR rate in the intake air. As described previously, as the EGR rate decreases, the quantity of inert gas in the combustion chamber decreases, and consequently the largest value of the second injected fuel quantity with which the amount of smoke generated can be kept within an allowable range and stable combustion can be ensured increases. Therefore, if the actual EGR rate Regr in the intake air becomes lower than the target EGR rate Regrt when the target engine load Qet is in the high load range R5, even if the second injected fuel quantity Sm becomes larger than the maximum base second injected fuel quantity Smbmax, the amount of smoke generated can be kept within an allowable range and stable combustion can be ensured.

In the above-described control flow, the actual EGR rate in the intake air is determined by calculation, and if the EGR rate determined by calculation is different from the target EGR rate, the parameters of the combustion control are corrected. Alternatively, when the degree of opening of the EGR valve 32 is changed by the EGR control shown in FIG. 12, the parameters of the combustion control may be corrected during a predetermined period that is supposed to be the response delay period in changing the EGR rate from the time at which the degree of opening of the EGR valve 32 is changed. In this case, the duration of the predetermined period is determined in advance by, for example, an experiment, and its value is stored in the ECU 20. It is not necessarily required that the parameters of the combustion control be corrected throughout the entirety of the response delay period in changing the EGR rate. In the case where the parameters of the combustion control are corrected in a part of the response delay period in changing the EGR rate, the generation of the smoke can be reduced and the stability of diesel combustion can be improved in the partial period.

In the above-described control, corrected values of the parameters of the combustion control are calculated according to equations 4 to 9. Alternatively, the values of the parameters of the combustion control corresponding to the actual EGR rate in the intake air may be determined by other methods. For example, a plurality of maps corresponding to different EGR rates respectively and representing relationship between the engine load of the internal combustion engine 1 and the parameters of the combustion control may be prepared and stored in the ECU 20. In this case, one of the maps is selected based on the actual EGR rate in the intake air and used to calculate the values of the parameters of the combustion control.

In this example, what is shown in FIG. 16 is only exemplary relationships between the engine load of the internal combustion engine 1 and the base values of the parameters of the combustion control, and the relationships between them are not limited to those shown in FIG. 16. For example, in the low load range R3, the base first injected fuel quantity Spb may be increased in response to increases in the engine load. Furthermore, in the high load range R5, the base second injected fuel quantity Smb may be increased in response to increases in the engine load within an allowable range, which is determined taking account of the amount of smoke generated and stability of combustion.

Example 2

In this example, operation ranges equivalent to the low load range R3, the middle load range R4, and the high load range R5 shown in FIG. 16 will be referred to as low load range R3, first middle load range R4, and second middle load range R5. In this example also, the basic combustion control and the transient operation control same as those in example 1 are performed in the low load range R3, the first middle load range R4, and the second middle load range R5. In this example, the operation range in which the engine load is higher than the second middle load range will be referred to as high load range, in which high load combustion control is performed. In the following, the high load combustion control according to this example will be described.

<High Load Combustion Control>

In the internal combustion engine 1, when the engine load increases, it is necessary to increase the quantity of fuel injected into the combustion chamber. However, as described above, if the second injected fuel quantity is increased too much, there is a possibility that the amount of smoke may increase and/or the temperature in the combustion chamber may be lowered by the evaporation latent heat of the second injected fuel to make the combustion unstable. As described above, when the first injected fuel quantity is increased, it is possible to reduce the amount of smoke generated by advancing the first injection time, namely by increasing the first injection interval Di1, accordingly. However, the first injection interval Di1 has an upper bound (Di1b in FIG. 7) as shown in FIG. 7, because it is necessary that flame generated by ignition of the first injected fuel serve as an ignition source for combustion of the second injected fuel. If the first injected fuel quantity is further increased with the first injection interval Di1 being kept at the aforementioned upper bound, the unburned residue of the first injected fuel and the second injected fuel are apt to overlap when the second injection is performed. Therefore, if the quantity of the first injected fuel is increased too much, there is a possibility that the amount of smoke generated may increase. In view of this, in the internal combustion engine 1 according to this example, in the high load range in which the quantity of fuel required to be injected into the combustion chamber in one combustion cycle is relatively large, the high load combustion control is performed. In the high load combustion control, third injection through the fuel injection valve 6 is performed in addition to the first fuel injection and the second fuel injection performed in the above-described basic combustion control.

The third injection is performed at a third injection time prior to the first injection time during the compression stroke with a second injection interval Di2 between the third injection time and the first injection time. The second injection interval Di2 is set in such a way that the fuel injected by the third injection (which will be hereinafter referred to as the third injected fuel) is burned by self-ignition or diffusion combustion after the start of the second injection.

FIG. 17 shows the change in the rate of heat release in the combustion chamber in the case where the basic combustion control is performed and in the case where the high load combustion control is performed. Diagram (a) in FIG. 17 shows when the fuel injections and ignition are performed in the respective combustion controls. In graph (b) in FIG. 17, curve L17 represents the change in the rate of heat release in the case where the basic combustion control is performed, and curve L18 represents the change in the rate of heat release in the case where the high load combustion control is performed. In the cases shown in FIG. 17, the total fuel injection quantity in one combustion cycle is the same among the two combustion controls. Thus, the second injected fuel quantity is smaller in the high load combustion control than in the basic combustion control. In the high load combustion control, a quantity of fuel equal to the difference in the second injected fuel quantity from that in the case of the basic combustion control is injected by the third injection. In the case shown in FIG. 17, the engine speed of the internal combustion engine 1 is 2000 rpm.

Since the third injection time Tpp is prior to the first injection time Tp during the compression stroke, the pressure in the combustion chamber at the third injection time Tpp is lower than that at the first injection time Tp. Therefore, the penetration of the spray of the third injected fuel is relatively high, and consequently the third injected fuel tends to diffuse more extensively in the combustion chamber than the first injected fuel. Therefore, if the second injection interval Di2 is set appropriately, it is possible to prevent most part of the third injected fuel from being burned by flame generated by ignition of the pre-spray of the first injected fuel and to enable it to be burned by self-ignition or diffusion combustion after the start of the second injection. In graph (b) in FIG. 17, the first peak of the rate of heat release represented by line L18 (which is a peak of the rate of heat release attributed to combustion caused by ignition of the pre-spray of the first injected fuel) is substantially the same as the first peak of the rate of heat release represented by line L17 in its time of occurrence and magnitude. It is conjectured from this that the third injected fuel is not burned upon ignition of the pre-spray of the first injected fuel.

It is considered that the third injected fuel, which is burned by self-ignition or diffusion combustion after the start of the second injection, acts in the same manner as the unburned residue of the first injected fuel in the combustion. In graph (b) in FIG. 17, the second peak of the rate of heat release represented by line L18 (which is the highest peak of the rate of heat release occurring after the top dead center of the compression stroke) is higher than the second peak of the rate of heat release represented by line L17. Moreover, the falling rate from the second peak of the rate of heat release (i.e. the inclination of the graph after the second peak) is higher in line L18 than line L17. It is conjectured from this also that the third injected fuel contributes to the promotion of self-ignition of fuel after the start of the second injection, as with the unburned residue of the first injected fuel.

Since the third injection time is prior to the first injection time, the third injected fuel has diffused more extensively in the combustion chamber than the unburned residue of the first injected fuel at the time when the second injection is performed. Therefore, although the third injected fuel is present in the combustion chamber at the time when the second injection is performed, the third injected fuel is less likely to overlap with the second injected fuel than the unburned residue of the first injected fuel. Therefore, the third injected fuel is less likely to be a cause of smoke than the first injected fuel and the second injected fuel.

In the case where the third injection is performed, at least one of the first injected fuel quantity and the second injected fuel quantity can be made smaller than in the case where a quantity of fuel required by the engine load of the internal combustion engine 1 is injected only by the first injection and the second injection. Therefore, performing the third injection can reduce the amount of smoke derived from the first injected fuel or the second injected fuel. FIG. 18 shows relationship between the thermal efficiency of the internal combustion engine 1 and the third injected fuel quantity (graph (a) in FIG. 18) and relationship between the amount of smoke generated and the third injected fuel quantity (graph (b) in FIG. 18) in the high load combustion control, in a case where the third injected fuel quantity is varied with the total fuel injection quantity by all the injections in one combustion cycle being fixed. In the case shown in FIG. 18, increases in the third injected fuel quantity are counterbalanced by decreases in the second injected fuel quantity, and the first injected fuel quantity is fixed. As shown in graph (a) in FIG. 18, even when the third injected fuel quantity is increased in the high load combustion control, the thermal efficiency of the internal combustion engine 1 is kept nearly constant. This also shows that the most part of the third injected fuel is burned in combustion occurring after the start of the second injection. As shown in graph (b) in FIG. 18, as the third injected fuel quantity is increased in the high load combustion control, the amount of smoke generated decreases. This also shows that the third injected fuel is unlikely to be a cause of smoke.

Therefore, in the internal combustion engine 1 according to this example, the high load combustion control as described above is performed in the high load operation state in which the total fuel injection quantity is relatively large, whereby diesel combustion can be caused to occur with reduced smoke as compared to that with the basic combustion control, also in the high load operation state.

<Fuel Injection Control Taking Account of EGR Rate>

In this example also, EGR gas is supplied to the internal combustion engine 1 by the EGR apparatus 30. In this example also, the EGR control is performed according to the control flow shown in FIG. 12, as in example 1. In the following, fuel injection control taking account of the EGR rate in the intake air in this example will be described.

As described above, it is considered that the third injected fuel acts in the same manner as the unburned residue of the first injected fuel in the combustion. Therefore, in the high load combustion control, the first injection ratio is kept constant regardless of the EGR rate in the intake air. Moreover, in order to reduce the amount of smoke generated and to improve the stability of diesel combustion, the ratio of the third injected fuel to the total fuel injection quantity in one combustion cycle (the third injection ratio) is controlled depending on the EGR rate in the intake air. Specifically, if the total fuel injection quantity in one cycle is the same, the first injection ratio is kept constant regardless of the EGR rate in the intake air, and the third injection ratio is made higher when the EGR rate in the intake air is high than when the EGR rate is low. In other words, if the total fuel injection quantity in one combustion cycle is the same, the first injection ratio is kept constant regardless of the EGR rate in the intake air, and the second injection ratio is made lower when the EGR rate in the intake air of the internal combustion engine is high than when the EGR rate is low.

As described above, the higher the EGR rate is, the lower the second injection ratio is made. This can reduce the amount of smoke generated due to deficiency of oxygen available for combustion of the second injected fuel. As described previously, the higher the EGR rate is, the larger the quantity of inert gas in the combustion chamber is, and therefore the less likely flame generated by ignition of the pre-spay by the ignition plug 5 is to propagate extensively. Therefore, if the third injection ratio is made higher for higher EGR rates, the quantity of the third injected fuel that is not burned by propagation of flame generated by ignition of the pre-spray by the ignition plug 5 but burned in combustion occurring after the start of the second injection increases. At the second injection time, as with the unburned residue of the first injected fuel, the third injected fuel is diffused more extensively than the region in which spray of the second injected fuel is formed in the combustion chamber. In consequence, even when the EGR rate is high, a sufficient quantity of oxygen needed to burn the third injected fuel by self-ignition or diffusion combustion is available. Therefore, even if the third injection ratio is increased when the EGR rate is high, the amount of smoke generated is not likely to increase.

When the EGR rate in the intake air becomes low, the quantity of inert gas in the combustion chamber decreases to facilitate combustion in the combustion chamber. Consequently, the quantity of the third injected fuel that is burned by propagation of flame generated by ignition of the pre-spray of the first injected fuel by the ignition plug 5 increases. In other words, the quantity of oxygen consumed in combustion of the third injected fuel before the second injection is performed increases. Therefore, when the EGR rate becomes low, even though the quantity of oxygen supplied to the combustion chamber increases, the quantity of oxygen consumed in combustion of the third injected fuel increases excessively, possibly making it difficult to provide a sufficient quantity of oxygen needed to burn the second injected fuel satisfactorily when the second injection is performed. In this case also, the amount of smoke generated increases. In this example, the lower the EGR rate is, the lower the third injection ratio is made. Consequently, the smaller the quantity of inert gas in the combustion chamber is, the smaller the quantity of the third injected fuel in the combustion chamber can be made. Thus, the quantity of fuel burned by propagation of flame generated by ignition by the ignition device under the circumstances where the quantity of inert gas in the combustion chamber is small can be made small. In other words, the quantity of oxygen consumed in combustion of the third injected fuel before the second injection is performed can be made small. In consequence, deficiency of oxygen used in combustion of the second injected fuel can be prevented at the time when the second injection is performed. Therefore, the amount of smoke generated can be reduced.

As described above, a large part of the third injected fuel is not burned by propagation of flame generated by ignition of the pre-spray of the first injected fuel. However, the third injected fuel present around the ignition plug 5 at the time when the pre-spray of the first injected fuel is ignited is ignited by the ignition plug 5. Therefore, if the third injection ratio is made higher for higher EGR rates, the larger the quantity of inert gas in the combustion chamber is, the larger the quantity of fuel ignited by the ignition plug 5 can be made. Thus, the quantity of the third injected fuel that is burned in combustion occurring after the start of the second injection increases, and the quantity of the fuel that contributes to generation of flame when ignition by the ignition plug 5 is performed also increases. Therefore, even when the quantity of inert gas in the combustion chamber increases due to an increase in the EGR rate, deterioration of ignitability in ignition of the pre-spray by the ignition plug 5 can be prevented by increasing the third injection ratio. As described above, the third injected fuel contributes to the promotion of self-ignition of fuel after the start of the second injection, as with the unburned residue of the first injected fuel. Therefore, making the third injection ratio higher for higher EGR rates to increase the quantity of the third injected fuel that is burned in combustion occurring after the start of the second injection contributes to the promotion of self-ignition of fuel after the start of the second injection. For the above-described reason, making the third injection ratio higher for higher EGR rates is advantageous also in improving the stability of diesel combustion.

<Transient Operation Control>

In this example also, during transient operation with a target engine load in the low load range R3, the first meddle load range R4, and the second middle load range R5, the transient operation control same as that in example 1 is performed. Specifically, during the response delay period in changing the EGR rate in which the actual EGR rate in the intake air is higher than the target EGR rate, the first injected fuel quantity is made larger than the base first injected fuel quantity, and the second injected fuel quantity is made smaller than the base second injected fuel quantity. During the response delay period in which the actual EGR rate in the intake air is lower than the target EGR rate, the first injected fuel quantity is made smaller than the base first injected fuel quantity, and the second injected fuel quantity is made larger than the base second injected fuel quantity.

During the response delay period in changing the EGR rate during transient operation in which the target engine load is in the high load range R6, the above-described control of the third injection ratio taking account of the EGR rate is applied. In other words, during the response delay period in changing the EGR rate, the second injected fuel quantity and the third injected fuel quantity corresponding to the engine load are corrected. Specifically, during the period in which the actual EGR rate in the intake air is higher than the target EGR rate, the first injected fuel quantity is set to the base first injected fuel quantity, the third injected fuel quantity is made larger than the base third injected fuel quantity, and the second injected fuel quantity is made smaller than the base second injected fuel quantity. On the other hand, during the period in which the actual EGR rate in the intake air is lower than the target EGR rate, the first injected fuel quantity is set to the base first injected fuel quantity, the third injected fuel quantity is made smaller than the base third injected fuel quantity, and the second injected fuel quantity is made larger than the base second injected fuel quantity. The third injected fuel quantity is a base value of the third injected fuel quantity, which is determined based on the engine load of the internal combustion engine 1. The value of the base third injected fuel quantity is determined on the assumption that the operation state of the internal combustion engine 1 is steady-state operation, namely, on the assumption that the actual EGR rate in the intake air is at a value adapted to the engine load.

In the above-described control, during the period in which the actual EGR rate in the intake air is higher than the target EGR rate, the third injection ratio is made higher, and the second injection ratio is made lower than in the case where the engine load of the internal combustion engine 1 is equal to the target engine load and the actual EGR rate in the intake air is equal to the target EGR rate. Thus, deficiency of oxygen available for combustion of the second injected fuel can be prevented during the period in which the actual EGR rate in the intake air is higher than the target EGR rate. Consequently, the amount of smoke generated can be reduced. Moreover, ignitability in ignition of the pre-spray of the first injected fuel by the ignition plug 5 can be improved. Furthermore, during the response delay period in changing the EGR rate, the quantity of the third injected fuel that contributes to self-ignition after the start of the second injection can be increased. Therefore, the stability of diesel combustion can be improved. In the above-described control, during the period in which the actual EGR rate in the intake air is lower than the target EGR rate, the third injection ratio is made lower, and the second injection ratio is made higher than in the case where the engine load of the internal combustion engine 1 is equal to the target engine load and the actual EGR rate in the intake air is equal to the target EGR rate. Thus, during the period in which the actual EGR rate in the intake air is lower than the target EGR rate, the quantity of oxygen consumed in combustion of the third injected fuel before the second injection is performed can be decreased. Therefore, deficiency of oxygen available for combustion of the second injected fuel at the time when the second injection is performed can be prevented. Consequently, the amount of smoke generated can be reduced.

In the combustion control in this example, the third injection time is determined based on the engine load of the internal combustion engine 1 in such a way as to make the interval between the first injection time and the third injection time equal to the aforementioned second injection interval. A base value of the third injection time determined based on the engine load of the internal combustion engine 1 will be referred to as "the base third injection time". The value of the base third injection time is determined on the assumption that the operation state of the internal combustion engine 1 is steady-state operation, namely on the assumption that the actual EGR rate in the intake air is equal to the target EGR rate corresponding to the engine load.

In this example, during the response delay period in changing the EGR rate, in which the second injected fuel quantity and the third injected fuel quantity are corrected, the second injection time and the third injection time are also corrected. Specifically, when the third injected fuel quantity is made larger than the base third injected fuel during the period in which the actual EGR rate in the intake air is higher than the target EGR rate, the third injection time is advanced from (or made earlier than) the base third injection time. In this case, the amount of advancement of the third injection time from the base third injection time is set in accordance with the amount of increase in the third injected fuel quantity from the base third injected fuel quantity. As described above, during the period in which the actual EGR rate in the intake air is higher than the target EGR rate, flame generated by ignition by the ignition plug 5 is unlikely to extend extensively, and therefore increasing the third injection ratio leads to an increase in the quantity of the third injected fuel that contributes to self-ignition after the start of the second injection. If the third injection time is advanced in accordance with the increase in the third injected fuel quantity, the third injected fuel is diffused over an extended region in the combustion chamber, and the quantity of the third injected fuel that is not burned by propagation of flame generated by ignition by the ignition plug 5 increases further. In other words, the quantity of the third injected fuel that contributes to the promotion of self-ignition after the start of the second injection can be made larger than that in the case where the third injection time is set to the base third injection time.

During the period in which the actual EGR rate in the intake air is higher than the target EGR rate, the first injection time and the second injection time are also advanced from (or made earlier than) the base first injection time and the base second injection time respectively in accordance with the advancement of the third injection time. Thus, an appropriate first injection interval and an appropriate second injection interval can be maintained. As described above, during the period in which the actual EGR rate is higher than the target EGR rate, the second injection time can be kept at the proper injection time by advancing the second injection time from the base second injection time.

When the second injected fuel quantity is made larger than the base second injected fuel quantity during the period in which the actual EGR rate in the intake air is lower than the target EGR rate, the second injection time is retarded from (or made later than) the base second injection time. In this case, the amount of retardation of the second injection time from the base second injection time is set in accordance with the amount of increase in the second injected fuel quantity from the base second injected fuel quantity. In the high load range R6 also, if the second injected fuel quantity is increased under the circumstances where the actual EGR rate in the intake air is lower than the target EGR rate, the possibility of occurrence of knocking becomes high. Retarding the second injection time from the base second injection time in accordance with the increase in the second injected fuel quantity can prevent knocking caused by the increase in the second injected fuel quantity from occurring.

During the period in which the actual EGR rate in the intake air is lower than the target EGR rate, the first injection time and the third injection time are also retarded from (or made later than) the base first injection time and the base third injection time respectively in accordance with the retardation of the second injection time. Thus, an appropriate first injection interval and an appropriate second injection interval can be maintained.

<Combustion Control Flow>

In the following, a control flow of the combustion control according to this example will be described with reference to FIGS. 19 to 21. FIGS. 19 and 20 are flow charts of the control flow of the combustion control according to this example. Steps S201 through S211 in this flow are the same as those in the flow shown in FIG. 13. The processing in these steps will not be described unless necessary. FIG. 21 is a flow chart of calculation of the base values of parameters used in the combustion control according to this example, which include the base first injected fuel quantity Spb, the base second injected fuel quantity Smb, the base third injected fuel quantity Sppb, the base first injection time Tpb, the base second injection time Tmb, the base third injection time Tppb, and the base ignition time Tsb. As will be described later, this flow is the flow of calculating the base values of the parameters in the high load range R6. In this example also, the base values of the parameters in the low load range R3, the first middle load range R4, and the second middle load range R5 are calculated according to the flows shown in FIGS. 14 and 15. The flows shown in FIGS. 19 to 21 are stored in the ECU 20 in advance and carried out repeatedly at predetermined intervals by executing a control program stored in the ECU 20 while the internal combustion engine 1 is operating. These control flows are executed concurrently with the control flow of the EGR control shown in FIG. 12.

FIG. 22 shows exemplary maps used to calculate the load-adapted injection quantity S0, the base first injected fuel quantity Spb, the base second injected fuel quantity Smb, the base third injected fuel quantity Sppb, the base first injection time Tpb, the base second injection time Tmb, the base third injection time Tppb, and the base ignition time Tsb in the combustion control according to this example. In the upper graph (a) in FIG. 22, line L20 represents relationship between the engine load of the internal combustion engine 1 and the load-adapted injection quantity S0, line L21 represents relationship between the engine load and the base first injected fuel quantity Spb, and line L22 represents relationship between the engine load and the base second injected fuel quantity Smb. In graph (a) in FIG. 22, line L23 represents relationship between the engine load of the internal combustion engine 1 and the base third injected fuel quantity Sppb. In graph (a) in FIG. 22. M1 represents the amount of unburned residue of the first injected fuel that remains without being burned by the propagation of flame generated by ignition by the ignition plug 5. In graph (a) in FIG. 22, the first predetermined quantity S1 is a fuel injection quantity corresponding to the engine load on the border between the low load range R3 and the first middle load range R4, and the second predetermined quantity S2 is a fuel injection quantity corresponding to the engine load on the border between the first middle range R4 and the second middle load range R5. Furthermore, in graph (a) in FIG. 22, S3 (>S2) is a fuel injection quantity corresponding to the engine load on the border between the second middle load range R5 and the high load range R6. This fuel injection quantity S3 will be hereinafter referred to as the third predetermined quantity S3.

In the lower graph (b) in FIG. 22, as in graph (b) in FIG. 16, line L31 represents relationship between the engine load of the internal combustion engine 1 and the first injection time Tp, line L30 represents relationship between the engine load and the ignition time Ts, and line L32 represents relationship between the engine load and the second injection time Tm. Furthermore, in graph (b) in FIG. 22, line L33 represents relationship between the engine load and the third injection time Tpp. The distance between line L31 and line L32 represents the first injection interval Di1, the distance between line L31 and line L30 represents the ignition interval Ds, and the distance between line L33 and line L31 represents the second injection interval Di2. As with the vertical axis in graph (b) in FIG. 16, the vertical axis of graph (b) in FIG. 22 represents the crank angle (BTDC) from the top dead center of the compression stroke, where larger values represent earlier times during the compression stroke. In step S203 of the control flow shown in FIG. 19, the base first injected fuel quantity Spb, the base second injected fuel quantity Smb, the base first injection time Tpb, the base second injection time Tmb, and the base ignition time Tsb are calculated according to the flows shown in FIGS. 13 and 14. The maps shown in FIG. 22 are used in the steps of calculating the parameter in this process. In the maps shown in FIG. 22, the relationships between the engine load of the internal combustion engine 1 and the control parameters in the low load range R3, the first middle load range R4, and the second middle range R5 are the same as those in the maps shown in FIG. 16.

In the control flow of the combustion control shown in FIG. 19, after the load-adapted injection quantity S0 is calculated in step S202, the processing of step S401 is executed. In step S401, it is determined whether the load adapted injection quantity S0 is equal to or smaller than the third predetermined quantity S3. If the determination made in step S401 is affirmative, namely if the load-adapted injection quantity S0 is equal to or smaller than the third predetermined quantity S3, the target engine load Qet of the internal combustion engine 1 is in the low load range R3, the first middle load range R4, or the second middle load range R5. In this case, the processing of step S203 is executed next. On the other hand, if the determination made in step S401 is negative, namely if the load-adapted injection quantity S0 is larger than the third predetermined quantity S3, the engine load of the internal combustion engine 1 is in the high load range R6. The third predetermined quantity S3 is set as a fuel injection quantity adapted to the engine load at which not only the base second injected fuel quantity Smb but also the base first injected fuel quantity Spb reaches its upper limit value in view of the amount of smoke generated when a quantity of fuel adequate for the load-adapted injection quantity S0 is injected only by the first injection and the second injection without performing the third injection. In other words, the third predetermined quantity S3 is equal to the sum of the upper limit value of the base first injected fuel quantity and the upper limit value of the base second injected fuel quantity. Therefore, the high load range R6 is defined as an operation range in which the third injection is performed in addition to the first injection and the second injection, and the base third injected fuel quantity Sppb is increased in response to increases in the engine load.

If the determination made in step S401 is negative, the base first injected fuel quantity Spb corresponding the target engine load Qet, the base second injected fuel quantity Smb corresponding the target engine load Qet, the base third injected fuel quantity Sppb corresponding the target engine load Qet, the base first injection time Tpb corresponding the target engine load Qet, the base second injection time Tmb corresponding the target engine load Qet, the base third injection time Tppb corresponding the target engine load Qet, and the base ignition time Tsb corresponding the target engine load Qet are calculated in step S402 according to the flow shown in FIG. 21.

In the flow shown in FIG. 21, first in step S501, the base second injection time Tm corresponding the target engine load Qet is determined using the map represented by line L32 in graph (b) in FIG. 22. As will be described later, in the high load range R6, the base second injected fuel quantity Smb is fixed at the maximum base second injected fuel quantity Smbmax, as in the second middle load range R5. Therefore, in the high load range R6, the amount of advancement of the base second injection time Tmb is fixed at its upper limit value, in the same manner as in the second middle load range R5.

Then, in step S502, the base second injected fuel quantity Smb is set to the maximum base second injected fuel quantity Smbmax according to the map represented by line L22 in graph (a) in FIG. 22, in the same manner as in the case where the engine load is in the second middle load range R5. Thus, in the high load rage R6, the base second injected fuel quantity Smb is fixed at the maximum base second injected fuel quantity Smbmax as represented by line L22 in graph (a) in FIG. 22, in the same manner as in the second middle load range R5.

Then, in step S503, the base first injected fuel quantity Spb is set to the minimum base first injected fuel quantity Spbmin according to the map represented by line L21 in graph (a) in FIG. 22. Thus, in the high load range R6, the base first injected fuel quantity Spb is fixed at the minimum base first injected fuel quantity Spbmin as represented by line L21 in graph (a) in FIG. 22, in the same manner as in the low load range R3.

Then, in step S504, the base third injected fuel quantity Sppb is determined using the map represented by line L23 in graph (a) in FIG. 22. In the high load range R6, the relationship represented by line L23 between the load-adapted injection quantity S0 and the base third injected fuel quantity Sppb is expressed by the following equation 10:

$$Sppb = S0 - Spb \times \alpha - Smb \quad \text{(Equation 10)},$$

where α is the unburned residue rate of the first injected fuel, as in equation 2. As described above, in the high load combustion control according to this example, the most part of the third injected fuel is burned by self-ignition or diffusion combustion together with the second injected fuel to contribute to the engine load in normal cases (namely when the actual EGR rate in the intake air is equal to the EGR rate adapted to the engine load, as is the case in normal operation). Therefore, in terms of contribution to the engine power, the third injected fuel can be regarded to be equivalent to the second injected fuel. Therefore, a value of the base third injected fuel quantity Sppb adequate for attaining the fuel injection quantity adapted to the engine load can be determined by calculation according to the above equation 10. In the high load range R6, the base second injected fuel quantity Smb is fixed to the maximum base second injected fuel quantity Smbmax, and hence Smb=Smbmax in the above equation 10. Furthermore, in the high load range R6, the base first injected fuel quantity Spb is fixed at the minimum base first injected fuel quantity Spbmin, and hence Spb=Spbmin in the above equation 10. As will be described later, in the high load range R6, the base first injection time Tpb, the base second injection time Tmb, and the base ignition time Tsb are all constant, and the ignition interval Ds and the first injection interval Di1 are both constant accordingly. In consequence, the factor α in the above equation 10 is a constant value. Therefore, in the high load range R6, as the engine load increases, the base third injected fuel quantity Sppb is increased in accordance with the increase in the engine load.

In cases where it is necessary to inject a relatively large quantity of fuel as the third injected fuel or where it is difficult to provide a sufficiently long second injection interval, the proportion of the fuel that is burned by flame generated by ignition after the first injection in the third injected fuel may become large. If this proportion becomes significantly large, it is necessary in determining the base third injected fuel quantity Sppb to take into account the quantity of fuel burned by flame generated by ignition after the first injection. In such cases, the base third injected fuel quantity Sppb may be calculated according to the following equation 10':

$$Sppb = (S0 - Spb \times \alpha - Smb) \times (1/\beta) \quad \text{(Equation 10')},$$

where β is the proportion of the fuel subject to self-ignition or diffusion combustion after the start of the second injection in the third injected fuel.

The factor β in the above equation 10' can be determined in advance based on, for example, an experiment. An appropriate value of the base third injected fuel quantity Sppb can be determined by calculation according to the above equation 10', which takes into account the above-mentioned factor β.

Then, in step S505, the base first injection time Tpb is determined using the map represented by line 31 in graph (b) in FIG. 22. In the high load range R6, since the base second injected fuel quantity Smb is fixed at the maximum base second injected fuel quantity Smbmax, the base second injection time Tmb determined in step S501 is also kept constant. Moreover, in the high load range R6, the base first injected fuel quantity Spb is also fixed at the minimum base first injected fuel quantity Spbmin. Consequently, in the high load range R6, the base first injection time Tpb, which is determined in relation to the base second injection time Tmb in such a way as to set an appropriate first injection interval Di1 with which a satisfactory thermal efficiency is attained when the base first injected fuel quantity Spb is the minimum base first injected fuel quantity Spbmin, is also constant.

Then, in step S506, the base ignition time Tsb is determined using the control map represented by line L30 in graph (b) in FIG. 22. As shown in graph (b) in FIG. 22, the ignition interval Dsb, which is the interval between the base first injection time Tpb and the base ignition time Tsb, is kept constant. Consequently, in the high load range R6, the base ignition time Tsb is also kept constant.

Then, in step S507, the base third injection time Tppb is determined using the control map represented by line L33 in graph (b) in FIG. 22. As described above, in the high load combustion control according to this example, it is necessary to provide an appropriate second injection interval Di2 as the interval between the base first injection time Tpb and the base third injection time Tppb so that the third injected fuel is burned by self-ignition or diffusion combustion after the start of the second injection. Therefore, the base third injection time Tppb is determined relative to the base first injection time Tpb in such a way that the second injection interval Di2 as such is provided. In the high load range R6, as described above, the base third injected fuel quantity Sppb is increased in response to increases in the engine load. Therefore, in the high load range R6, as shown in graph (b) in FIG. 22, as the engine load increases up to a certain engine load, the base third injection time Tppb is advanced in such a way as to increase the second injection interval Di2. The larger the second injection interval Di2 is, the more extensively the third injected fuel is diffused in the combustion chamber till the time at which the first injection is performed. The more the third injection time is advanced, the lower the pressure in the combustion chamber at the third injection time is, and hence the higher the penetration of the spray of the third injected fuel is relatively. For this reason also, the more the base third injection time Tppb is advanced, the more extensively the third injected fuel is diffused in the combustion chamber. As the third injected fuel is diffused more extensively in the combustion chamber, the third injected fuel is unlikely to be burned by propagation of flame generated by ignition of the pre-spray of the first injected fuel (namely, the proportion of the fuel that is burned by propagation of flame generated by ignition in the third injected fuel decreases more).

In the high load range R6, the base values of the parameters relating to the first injection, second injection, third injection, and ignition are determined in the above-describe way. When the operation state of the internal combustion engine 1 is steady-state operation (in other words, when the actual EGR rate in the intake air is equal to the target EGR rate corresponding to the target engine load Qet) in the high load range R6, if the combustion control is performed with the first injected fuel quantity, the second injected fuel quantity, the third injected fuel quantity, the first injection time, the second injection time, the third injection time and the ignition time being set to the respective base values determined as above, an amount of unburned residue of the first injected fuel represented by M1 in graph (a) in FIG. 22 remains after the ignition of the pre-spray of the first injected fuel. As described above, in the high load range R6, the base first injected fuel quantity Spb, the first injection interval D1i, and the ignition interval Ds are equal to those in the low load range R3. Consequently, the quantity of the unburned residue of the first injected fuel is substantially constant, as in the low load range R3.

Referring back to the flow shown in FIG. 20, in step S402, after the base first injected fuel quantity Spb, the base second injected fuel quantity Smb, the base third injected fuel quantity Sppb, the base first injection time Tpb, the base second injection time Tmb, the base third injection time Tppb, and the base ignition time Tsb corresponding the target engine load Qet are calculated in step S402, the actual EGR rate Regr in the intake air supplied to the internal combustion engine 1 is calculated in step S403. In this step, the actual EGR rate Regr in the intake air is calculated in the same way as in step S204 of the flow shown in FIG. 13.

Then, in step S404, it is determined whether the EGR rate Regr calculated in step S403 is substantially equal to the target EGR rate Regrt corresponding to the target engine load Qet in the same way as in step S205 of the flow shown in FIG. 13. As described above, when the operation state of the internal combustion engine 1 is steady-state operation, the actual EGR rate in the intake air is substantially equal to the target EGR rate Regrt. In this case, an affirmative determination is made in step S404. On the other hand, when the operation state of the internal combustion engine 1 is transient operation, the actual EGR rate Regr in the intake air is different from the target EGR rate Regrt during the response delay period in changing the EGR rate. In this case, a negative determination is made in step S404. In step S404, it may be determined that the actual EGR rate Regr in the intake air is substantially equal to the target EGR rate Regrt, if the difference between the EGR rate Regr calculated in step S403 and the target EGR rate Regrt is in a predetermined range.

If the determination made in step S404 is affirmative, then in step S405, the parameters of the combustion control are set to the base values calculated in step S402. Specifically, the first injected fuel quantity Sp, the second injected fuel quantity Sm, the third injected fuel quantity Spp, the first injection time Tp, the second injection time Tm, the third injection time Tpp, and the ignition time Ts are set to the base first injected fuel quantity Spb, the base second injected fuel quantity Smb, the base third injected fuel quantity Sppb, the base first injection time Tpb, the base second injection time Tmb, the base third injection time Tppb, and the base ignition time Tsb calculated in step S402, respectively. Then, in step S406, the first injection, the second injection, and the third injection by the fuel injection valve 6 and ignition by the ignition plug 5 are performed according to the first injected fuel quantity Sp, the second injected fuel quantity Sm, the third injected fuel quantity Spp, the first injection time Tp, the second injection time Tm, the third injection time Tpp, and the ignition time Ts set in step S405.

On the other hand, if the determination made in step S404 is negative, then in step S407, a factor c2 used to calculate a corrected third injected fuel quantity Sppa2 and a corrected third injection time Tppa2. The factor c2 is calculated by the following equation 11 based on the actual EGR rate Regr in the intake air calculated in step S403 and the target EGR rate Regrt:

$$c2 = Regr/Regrt \qquad \text{(Equation 11)}.$$

Then, in step S408, the corrected third injected fuel quantity Sppa2 and the corrected third injection time Tppa2 are calculated by the following equations 12 and 13 using the factor c2 calculated in step S407:

$$Sppa2 = Sppb \times c2 \qquad \text{(Equation 12)},$$

and $$Tppa2 = Tppb \times c2 \qquad \text{(Equation 13)}.$$

Then, in step S409, the corrected second injected fuel quantity Sma2 and the corrected second injected fuel quantity Tma2 are calculated by the following equations 14 and 15:

$$Sma2 = Sat - Spb - Sppa2 \qquad \text{(Equation 14)},$$

where Sat is the target total fuel injection quantity (Sat=Spb+Smb+Sppb), and $$Tma2 = Tmb \times (Smb/Sma2) \qquad \text{(Equation 15)}.$$

According to the above equations 14 to 15, when the actual EGR rate Regr in the intake air is higher than the target EGR rate Regrt, namely during the response delay period in changing the EGR rate during transient operation in which the EGR rate is decreased in response to a change in the engine load, the corrected third injected fuel quantity Sppa2 is larger than the base third injected fuel quantity Sppb, and the corrected second injected fuel quantity Sma2 is smaller than the base second injected fuel quantity Smb. Moreover, the corrected third injection time Tppa2 and the corrected second injection time Tma2 are larger than the respective base values. (In other words, the corrected third injection time Tppa2 is earlier than the base third injection time Tppb, and the corrected second injection time Tma2 is earlier than the base second injection time Tmb.) According to the above equations 14 to 15, when the actual EGR rate Regr in the intake air is lower than the target EGR rate Regrt, namely during the response delay period in changing the EGR rate during transient operation in which the EGR rate is increased in response to a change in the engine load, the corrected third injected fuel quantity Sppa2 is smaller than the base third injected fuel quantity Sppb, and the corrected second injected fuel quantity Sma2 is larger than the base second injected fuel quantity Smb. Moreover, the corrected third injection time Tppa2 and the corrected second injection time Tma2 are smaller than the respective base values. (In other words, the corrected third injection time Tppa2 is later than the base third injection time Tppb, and the corrected second injection time Tma2 is later than the base second injection time Tmb.)

Equations to be used to calculate corrected values of the parameters for controlling the second injection and the third injection in this example are not limited to the above equations 11 to 15. In cases where other correction factor and equations are used, the above-described relationships between the base values of the parameters and the corrected values of them in the case where the actual EGR rate Regr in the intake air is higher than the target EGR rate Regrt and in the case where the actual EGR rate Regr is lower than the target EGR rate Regrt also apply.

Then in step S410, the corrected first injection time Tpa2 and the corrected ignition time Tsa2 are calculated. The corrected first injection time Tpa2 is calculated as a time that provides an appropriate first injection interval Di1 with the corrected second injection time Tma2 and an appropriate second injection interval Di2 with the corrected third injection interval Tppa2. Relationship between the corrected second injection time Tma2 and the corrected third injection time Tppa2 with the corrected first injection time Tpa2 is determined in advance by, for example, an experiment and stored in the ECU 20 as a map or function. In step S410, the corrected first injection time Tpa2 is calculated using this map or function. The corrected ignition time Tsa2 is calculated based on the corrected first injection time Tpa2 as a time that keeps the ignition interval Ds between the corrected ignition time Tsa2 and the corrected first injection time Tpa2 constant. In consequence, during the period in which the actual EGR rate Regr in the intake air is higher than the target EGR rate Regrt, namely during the response delay period in changing the EGR rate during transient operation by which the EGR rate is decreased in response to a change in the engine load, the corrected first injection time Tpa2 and the corrected ignition time Tsa2 are larger than the respective base values. (In other words, the corrected first injection time Tpa2 is earlier than the base first injection time Tpb, and the corrected ignition time Tsa2 is earlier than the base ignition time Tsb.) On the other hand, during the period in which the actual EGR rate Regr in the intake air is lower than the target EGR rate Regrt, namely during the response delay period in changing the EGR rate during transient operation by which the EGR rate is increased in response to a change in the engine load, the corrected first injection time Tpa2 and the corrected ignition time Tsa2 are smaller than the respective base values. (In other words, the corrected first injection time Tpa2 is later than the base first injection time Tpb, and the corrected ignition time Tsa2 is later than the base ignition time Tsb.)

Then, in step S411, the first injected fuel quantity Sp is set to the base first injected fuel quantity Spb calculated in step S402. Thus, the first injected fuel quantity Sp is set to the base first injected fuel quantity Spb regardless of the actual EGR rate in the intake air. In step S411, the first injection time Tp and the ignition time Ts are set respectively to the corrected first injection time Tpa2 and the corrected ignition time Tsa2 calculated in step S410. In step S411, the second injected fuel quantity Sm, the third injected fuel quantity Spp, the second injection time Tm, and the third injection time Tpp are set respectively to the corrected second injected fuel quantity Sma2, the corrected third injected fuel quantity Sppa2, the corrected second injection time Tma2, and the corrected third injection time Tppa2 calculated in steps S408 and S409. Then, in step S406, the first injection, the second injection, and the third injection by the fuel injection valve 6 and ignition by the ignition plug 5 are performed according to the first injected fuel quantity Sp, the second injected fuel quantity Sm, the third injected fuel quantity Spp, the first injection time Tp, the second injection time Tm, the third injection time Tpp, and the ignition time Ts set in step S410.

If the third injection time is too early in the compression stroke, the third injected fuel is likely to adhere to the surface of the cylinder bore. Therefore, in order to reduce the adhesion of the third injected fuel to the bore surface, an upper limit value (maximum advancement) may be set for the third injection time. If the base third injection time Tppb reaches the upper limit in the course of advancing the base third injection time Tppb in response to increases in the engine load, the base third injection time Tppb is kept at the upper limit value, even when the base third injected fuel quantity Sppb is increased in response to further increases in the engine load. Moreover, when the value of the corrected third injected fuel quantity Sppa2 calculated by equation 13 presented above is larger than the aforementioned upper limit, the third injection time is set to the upper limit value.

In this example also, as in example 1, when the degree of opening of the EGR valve 32 is changed by the EGR control shown in FIG. 12, the parameters of the combustion control may be corrected during a predetermined period that is supposed to be the response delay period in changing the EGR rate from the time at which the degree of opening of the EGR valve 32 is changed. Furthermore, in this example also, as in example 1, it is not necessarily required that the parameters of the combustion control be corrected throughout the entirety of the response delay period in changing the EGR rate.

In the above-described control, corrected values of the parameters relating to controlling the second injection and the third injection are calculated according to equations 11 to 15. Alternatively, the values of the parameters of the combustion control corresponding to the actual EGR rate in the intake air may be determined by other methods. For example, values of the parameters relating to controlling the second injection and the third injection may be calculated using a plurality of maps corresponding to different EGR rates respectively, as in the alternative method of calculating the corrected values of the parameters of the combustion control described by way of example in the description of example 1.

In this example, what is shown in FIG. 22 is only exemplary relationships between the engine load of the internal combustion engine 1 and the base values of the parameters of the combustion control, and the relationships between them are not limited to those shown in FIG. 22. For example, in the high load range R6, the base first injected fuel quantity Spb may be fixed at a maximum base first injected fuel quantity Spbmax. Furthermore, in the high load range R6, the base first injected fuel quantity Spb or the base second injected fuel quantity Smb may be increased in response to increases in the engine load within an allowable range, which is determined taking account of the amount of smoke generated and stability of combustion.

Example 3

In example 3, the base combustion control same as that in example 1 is performed. In this example, when the engine temperature of the internal combustion engine 1 is low, the supply of EGR gas into the intake air by the EGR apparatus 30 is suspended in order to raise the temperature of the internal combustion engine 1 and the exhaust gas quickly.

<EGR Control Flow>

In the following, a control flow of the EGR control according to this example will be described with reference to FIG. 23. FIG. 23 is a flow chart of the control flow of the EGR control according to this example. Steps S101 through S104 in this flow are the same as those in the flow shown in FIG. 12, and the processing in these steps will not be described. This control flow is stored in the ECU 20 in advance and carried out repeatedly at predetermined intervals by executing a control program stored in the ECU 20 while the internal combustion engine 1 is operating.

In this flow, firstly in step S601, it is determined whether or not the cooling water temperature (that is, the engine temperature of the internal combustion engine 1) Tw measured by the water temperature sensor 23 is higher than a predetermined temperature Tw0. The predetermined temperature Tw0 mentioned above is a threshold set to determine whether or not the supply of EGR gas is to be suspended in order to raise the engine temperature as soon as possible. This predetermined temperature Tw0 is determined in advance by, for example, an experiment. If the determination made in step S601 is affirmative, namely if the cooling water temperature Tw is higher than the predetermined temperature Tw0, it may be concluded that normal EGR control based on the engine load may be performed. In this case, the processing of step S101 is performed next. On the other hand, if the determination made in step S601 is negative, namely if the cooling water temperature Tw is not higher than the predetermined temperature Tw0, the EGR valve 32 is closed in step S602. Thus, the supply of EGR gas to the intake air is suspended.

<Fuel Injection Control Taking Account of EGR Rate>

When the supply of EGR gas into the intake air is suspended by the above-described EGR control, combustion in the combustion chamber is more promoted than when EGR gas is supplied. In consequence, the first combustion efficiency in the spray guide combustion of the first injected fuel becomes higher (in other words, the unburned residue rate becomes lower). As described previously, in such cases, the quantity of oxygen consumed by combustion of the first injected fuel before the second injection becomes larger. Therefore, even though the quantity of oxygen supplied into the combustion chamber increases because of the suspension of the supply of EGR gas, the quantity of oxygen consumed in combustion of the first injected fuel increases too much, making it difficult to provide a sufficient quantity of fuel needed to burn the second injected fuel satisfactorily when the second injection is performed. Consequently, the amount of smoke generated will increase.

In the control according to this example, when the supply of EGR gas into the intake air is suspended, the first injection ratio is made lower than when EGR gas is supplied. In other words, when the supply of EGR gas into the intake air is suspended, the second injection ratio is made higher than when EGR gas is supplied. This can reduce the quantity of oxygen consumed in combustion of the first injected fuel before the second injection is performed, when the supply of EGR gas is suspended. Therefore, deficiency in the quantity of oxygen available for combustion of the second injected fuel can be prevented when the second injection is performed. In consequence, the amount of smoke generated can be reduced.

If the second injection ratio is increased while the supply of EGR gas is suspended, the possibility of occurrence of knocking becomes high. In this example, the second injection time is retarded or made later when the supply of EGR gas is suspended than when EGR gas is supplied. In this case, the amount of retardation of the second injection time is set in accordance with the amount of increase in the second injected fuel quantity. This can prevent the occurrence of knocking resulting from the increase in the second injected fuel quantity.

<Combustion Control Flow>

A control flow of the combustion control according to this example will be described with reference to FIG. 24. FIG. 24 is a flow chart of the control flow of the combustion control according to this example. Steps S201 to S203, S206, and S207 in this flow are the same as those in the flow shown in FIG. 13, and the processing in these steps will not be described. This control flow is stored in the ECU 20 in advance and carried out repeatedly at predetermined intervals by executing a control program stored in the ECU 20 while the internal combustion engine 1 is operating. This control flow is executed concurrently with the control flow of the EGR control shown in FIG. 23.

In this flow, after the base first injected fuel quantity Spb, the base second injected fuel quantity Smb, the base first injection time Tpb, the base second injection time Tmb, and the base ignition time Tsb are calculated in step S203, the processing of step S704 is executed. In step S704, it is determined whether or not the cooling water temperature Tw measured by the water temperature sensor 23 is higher than the predetermined temperature Tw0. If the determination made in step S704 is affirmative, it may be concluded that the supply of EGR gas into the intake air is being performed, namely the normal EGR control based on the engine load of the internal combustion engine 1 is being performed. Then, the processing of step S206 is executed next.

On the other hand, if the determination made in step S704 is negative, the supply of EGR gas into the intake air is under suspension. Then, in step S705, a corrected first injected fuel quantity Spa3, a corrected first injection time Tpa3, and a corrected ignition time Tsa3 are calculated by the following equations 16 to 18:

$$Spa3 = Spb \times c3 \tag{Equation 16}$$

$$Tpa3 = Tpb \times c3 \tag{Equation 17}$$

and $$Tsa3 = Tsb \times c3 \quad \text{(Equation 18)}.$$

In the above equations, the factor $c3$ is a positive value smaller than 1. The factor $c3$ is a value determined in such a way as to adapt the parameters of the combustion control to the state in which the supply of EGR gas into the intake air is suspended. This factor $c3$ is determined in advance by, for example, an experiment. This factor $c3$ may either a constant value or a variable value varied depending on the target engine load Qet calculated in step S201.

Then, in step S706, a corrected second injected fuel quantity Sma3 and a corrected second injected fuel quantity Tma3 are calculated by the following equations 19 and 20:

$$Sma3 = Sat - Spa3 \quad \text{(Equation 19)},$$

where Sat is the target total fuel injection quantity (Sat=Spb+Smb), and $$Tma3 = Tmb \times (Smb/Sma3) \quad \text{(Equation 20)}.$$

According to the above equations 16 to 20, the corrected first injected fuel quantity Spa3 is smaller than the base first injected fuel quantity Spb, and the corrected second injected fuel quantity Sma3 is larger than the base second injected fuel quantity Smb. Moreover, the corrected first injection time Tpa3 and the corrected second injection time Tma3 are smaller than the respective base values. (In other words, the corrected first injection time Tpa3 is later than the base first injection time Tpb, and the corrected second injection time Tma3 is later than the base second injection time Tmb.) Equations to be used to calculate corrected values of the parameters of the combustion control in this example are not limited to the above equations 16 to 20. In cases where other equations are used, the above-described relationships between the base values of the parameters and the corrected values of them also apply.

Then in step S707, the parameters of the combustion control are set to the corrected values calculated in steps S705 and S706. Specifically, the first injected fuel quantity Sp, the second injected fuel quantity Sm, the first injection time Tp, the second injection time Tm, and the ignition time Ts are set to the corrected first injected fuel quantity Spa3, the corrected second injected fuel quantity Sma3, the corrected first injection time Tpa3, the corrected second injection time Tma3, and the corrected ignition time Tsa3 respectively. Then, in step S207, the first injection and the second injection by the fuel injection valve 6 and ignition by the ignition plug 5 are performed according to the first injected fuel quantity Sp, the second injected fuel quantity Sm, the first injection time Tp, the second injection time Tm, and the ignition time Ts set in step S707.

According to the above-described flow, at the same engine load, the first injected fuel quantity is made smaller and the second injected fuel quantity is made larger when the supply of EGR gas into the intake air is suspended than when the supply of EGR gas into the intake air is performed. Thus, the first injection ratio is lower when the supply of EGR gas into the intake air is suspended than when the supply of EGR gas into the intake air is performed. Moreover, according to the above-described flow, the second injection time during the time when the supply of EGR gas into the intake air is suspended is retarded from (or made later than) the second injection time during the time when the supply of EGR gas is performed. The first injection time during the time when the supply of EGR gas into the intake air is suspended is also retarded from (or made later than) the first injection time during the time when the supply of EGR gas is performed.

The amount of retardation of the first injection time is set in accordance with the amount of retardation of the second injection time. Thus, an appropriate first injection interval Di can be maintained.

In the above-described control, corrected values of the parameters of the combustion control are calculated according to equations 16 to 20. Alternatively, the values of the parameters of the combustion control during the time when the supply of EGR gas into the intake air is suspended may be determined by other methods. For example, maps representing relationship between the engine load of the internal combustion engine 1 and the parameters of the combustion control that are prepared on the assumption that the supply of EGR gas into the intake air is suspended may be stored in the ECU 20, and the values of the parameters of the combustion control may be determined using the maps.

In the above-described EGR control, the supply of EGR gas into the intake air is suspended when the cooling water temperature Tw is equal to or lower than the predetermined temperature Tw0. Alternatively, when the cooling water temperature Tw is equal to or lower than the predetermined temperature Tw0, the supply of EGR gas is made smaller than when the cooling water temperature Tw is higher than the predetermined temperature Tw0 instead of suspending the supply of EGR gas into the intake air. In this case also, the first injection ratio is made lower when the cooling water temperature Tw is equal to or lower than the predetermined temperature Tw0 than when the cooling water temperature Tw is higher than the predetermined temperature Tw0. Thus, when the supply of EGR gas into the intake air is decreased, the first injection ratio is decreased. Therefore, the amount of smoke generated can be reduced. In this case also, when the cooling water temperature Tw is equal to or lower than the predetermined temperature Tw0, the second injection time is retarded from the second injection time during the time when the cooling water temperature Tw is higher than the predetermined temperature Tw0. Thus, when the second injected fuel quantity is increased under the circumstances where the supply of EGR gas into the intake air is decreased, the second injection time is retarded. This can prevent the occurrence of knocking resulting from the increase in the second injected fuel quantity.

<Modification>

Next, a modification of the above-described example will be described. In this modification, the high load combustion control is performed in the high load range, as in example 2. Specifically, in the high load range, the third injection is performed in addition to the first injection and the second injection in one combustion cycle. If the supply of EGR gas into the intake air is suspended when the engine load of the internal combustion engine 1 is in the high load range, the quantity of the third injected fuel that is burned by propagation of flame generated by ignition of the pre-spray of the first injected fuel by the ignition plug 5 increases. As described previously, this leads to an increase in the quantity of oxygen consumed in combustion of the third injected fuel before the second injection is performed. Therefore, even though the quantity of oxygen supplied into the combustion chamber increases with the suspension of the supply of EGR gas, an excessive increase in the consumption of oxygen in the combustion of the third injected fuel makes it difficult to provide a sufficient quantity of oxygen needed to burn the second injected fuel satisfactorily when the second injection is performed. This leads to an increase in the amount of smoke generated.

In this modification, when the supply of EGR gas into the intake air is suspended while the engine load of the internal combustion engine 1 is in the high load range, the first injection ratio is set equal to that during the time when the supply of EGR gas is performed, and the third injection ratio is made lower than that during the time when the supply of EGR gas is performed. In other words, when the supply of EGR gas into the intake air is suspended, the first injection ratio is set equal to that during the time when the supply of EGR gas is performed, and the second injection ratio is made higher than that during the time when the supply of EGR gas is performed. With this control, during the time when the supply of EGR gas is suspended, the quantity of oxygen consumed in combustion of the third injected fuel before the second injection is performed can be decreased. Therefore, deficiency of oxygen available for combustion of the second injected fuel can be prevented when the second injection is performed. Consequently, the amount of smoke generated can be reduced.

In this modification also, when the cooling water temperature Tw is equal to or lower than the predetermined temperature Tw0, the supply of EGR gas is made smaller than when the cooling water temperature Tw is higher than the predetermined temperature Tw0 instead of suspending the supply of EGR gas into the intake air. In this case also, the third injection ratio is made lower when the cooling water temperature Tw is equal to or lower than the predetermined temperature Tw0 than when the cooling water temperature Tw is higher than the predetermined temperature Tw0. Thus, when the supply of EGR gas into the intake air is decreased, the third injection ratio is decreased. Therefore, the amount of smoke generated can be reduced.

In this modification also, when the cooling water temperature Tw is equal to or lower than the predetermined temperature Tw0, the second injection time is retarded from the second injection time during the time when the cooling water temperature Tw is higher than the predetermined temperature Tw0. This can prevent the occurrence of knocking resulting from the increase in the second injected fuel quantity. In this case, the first injection time, the third injection time, and the ignition time are also retarded from those during the time when the cooling water temperature Tw is higher than the predetermined temperature Tw0 in accordance with the retardation of the second injection time. Thus, an appropriate first injection interval Di1, an appropriate second injection interval Di2, and an appropriate ignition interval Ds can be maintained.

The invention claimed is:

1. A control apparatus for an internal combustion engine comprising:
    a fuel injection valve configured to inject gasoline as fuel into a combustion chamber of the internal combustion engine;
    an EGR apparatus that supplies a portion of exhaust gas flowing in an exhaust passage of the internal combustion engine into an intake passage of the internal combustion engine as EGR gas through an EGR passage;
    an ignition plug that has a position relative to said fuel injection valve that is set in such a way that fuel spray injected through said fuel injection valve passes through an ignition-capable region and the ignition plug can spark-ignite the fuel spray directly; and
    a controller comprising at least one processor configured to control the internal combustion engine to perform first fuel injection through said fuel injection valve at a first injection time during a compression stroke, ignite pre-spray formed by the first injection by said ignition plug, and start to perform second injection through said fuel injection valve at a second injection time after the ignition of said pre-spray by said ignition plug and before the top dead center of the compression stroke with a predetermined first injection interval between said first injection time and said second injection time, said first injection interval being set in such a way that combustion of the fuel injected by said second injection is started by a flame generated by ignition of said pre-spray, thereby causing self-ignition of fuel to occur and causing at least a portion of fuel injected by said second injection to be burned by diffusion combustion,
    wherein said controller performs a first fuel injection control to make a ratio of a fuel injection quantity in said first injection to a total fuel injection quantity higher when an EGR rate in the intake air of the internal combustion engine is above a predetermined rate value, as compared to when the EGR rate is below the predetermined rate value, for the same total fuel injection quantity in one combustion cycle,
    wherein said controller controls the EGR rate in the intake air based on an engine load of the internal combustion engine,
    wherein said controller determines a base first injected fuel quantity and a base second injected fuel quantity, based on the engine load of the internal combustion engine, the base first injected fuel quantity being a base value of the fuel injection quantity in said first injection, and the base second injected fuel quantity being a base value of the fuel injection quantity in said second injection, and
    wherein when the EGR rate in the intake air is decreased during transient operation by which the engine load of the internal combustion engine is changed to a target engine load, said controller performs said first fuel injection control by making the fuel injection quantity in said first injection larger than the base first injected fuel quantity corresponding to said target engine load and making the fuel injection quantity in said second injection smaller than the base second injected fuel quantity corresponding to said target engine load, during at least a part of a period during which the actual EGR rate in the intake air is higher than a target EGR rate corresponding to said target engine load.

2. A control apparatus for an internal combustion engine according to claim 1, wherein
    said controller controls the EGR rate in the intake air based on the engine load of the internal combustion engine; and
    said controller determines a base first injected fuel quantity and a base second injected fuel quantity based on the engine load of the internal combustion engine, the base first injected fuel quantity being a base value of the fuel injection quantity in said first injection, and the base second injected fuel quantity being a base value of the fuel injection quantity in said second injection,
    wherein when the EGR rate in the intake air is increased during transient operation in which the engine load of the internal combustion engine is changed to a target engine load, said controller performs said first fuel injection control by making the fuel injection quantity in said first injection smaller than the base first injected fuel quantity corresponding to said target engine load and making the fuel injection quantity in said second injection larger than the base second injected fuel quantity corresponding to said target engine load, during at least a part of the period during which the actual EGR rate in the intake air is lower than a target EGR rate corresponding to said target engine load.

3. A control apparatus for an internal combustion engine according to claim 1, wherein
said controller makes the EGR rate in the intake air at the same engine load lower when an engine temperature of the internal combustion engine is equal to or lower than a predetermined temperature than when the engine temperature is higher than said predetermined temperature,
wherein when the engine temperature of the internal combustion engine is equal to or lower than said predetermined temperature and the EGR rate in the intake air is made lower than when the engine temperature of the internal combustion engine is higher than said predetermined temperature, said controller performs said first fuel injection control by making the ratio of the fuel injection quantity in said second injection to the total fuel injection quantity higher than when the engine temperature of the internal combustion engine is higher than said predetermined temperature.

4. A control apparatus for an internal combustion engine according to claim 1, wherein in said first fuel injection control, said controller makes the ratio of the fuel injection quantity in said first injection to the total fuel injection quantity higher and makes said first injection time earlier when the EGR rate in the intake air of the internal combustion engine is above the predetermined rate value as compared to when the EGR rate is below the predetermined rate value.

5. A control apparatus for an internal combustion engine according to claim 1, wherein in said first fuel injection control, said controller makes the ratio of the fuel injection quantity in said second injection to the total fuel injection quantity higher and makes said second injection time later when the EGR rate in the intake air of the internal combustion engine is below the predetermined rate value as compared to the EGR rate is above the predetermined rate value.

6. A control apparatus for an internal combustion engine according to claim 1, wherein in a predetermined operation range in which the engine load of the internal combustion engine is higher than a predetermined load, said controller performs a third injection through said fuel injection valve in addition to said first injection and said second injection at a third injection time prior to said first injection time during the compression stroke with a predetermined second injection interval between said first injection and said third injection, said second injection interval being set in such a way that the fuel injected by said third injection is burned by self-ignition or diffusion combustion after the start of said second injection, and
in an operation range in which the engine load of the internal combustion engine is equal to or lower than said predetermined load, said controller performs said first fuel injection control, and in said predetermined operation range, said controller performs second fuel injection control in which the ratio of the fuel injection quantity in said first injection to the total fuel injection quantity is kept constant for the same total fuel injection quantity in one combustion cycle regardless of the EGR rate in the intake air and the ratio of the fuel injection quantity in said third injection to the total fuel injection quantity is made higher when the EGR rate in the intake air is above the predetermined rate value as compared to the EGR rate is below the predetermined rate value for the same total fuel injection quantity in one combustion cycle.

7. A control apparatus for an internal combustion engine according to claim 6, wherein
said controller controls the EGR rate in the intake air based on the engine load of the internal combustion engine; and
said controller determines a base first injected fuel quantity, a base second injected fuel quantity, and a base third injected fuel quantity, based on the engine load of the internal combustion engine, the base first injected fuel quantity being a base value of the fuel injection quantity in said first injection, the base second injected fuel quantity being a base value of the fuel injection quantity in said second injection, and the base third injected fuel quantity being a base value of the fuel injection quantity in said third injection,
wherein when the EGR rate in the intake air is decreased during transient operation by which the engine load of the internal combustion engine is changed to a target engine load in said predetermined operation range, said controller performs said second fuel injection control by making the fuel injection quantity in said first injection equal to the base first injected fuel quantity corresponding to said target engine load, making the fuel injection quantity in said third injection larger than the base third injected fuel quantity corresponding to said target engine load, and making the fuel injection quantity in said second injection smaller than the base second injected fuel quantity corresponding said target engine load, during at least a part of the period during which the actual EGR rate in the intake air is higher than a target EGR rate corresponding to said target engine load.

8. A control apparatus for an internal combustion engine according to claim 6, wherein
said controller controls the EGR rate in the intake air based on the engine load of the internal combustion engine; and
said controller determines a base first injected fuel quantity, a base second injected fuel quantity, and a base third injected fuel quantity, based on the engine load of the internal combustion engine, the base first injected fuel quantity being a base value of the fuel injection quantity in said first injection, the base second injected fuel quantity being a base value of the fuel injection quantity in said second injection, and the base third injected fuel quantity being a base value of the fuel injection quantity in said third injection,
wherein when the EGR rate in the intake air is increased during transient operation by which the engine load of the internal combustion engine is changed to a target engine load in said predetermined operation range, said controller performs said second fuel injection control by making the fuel injection quantity in said first injection equal to the base first injected fuel quantity corresponding to said target engine load, making the fuel injection quantity in said third injection smaller than the base third injected fuel quantity corresponding to said target engine load, and making the fuel injection quantity in said second injection larger than the base second injected fuel quantity corresponding said target engine load, during at least a part of the period during which the actual EGR rate in the intake air is lower than a target EGR rate corresponding to said target engine load.

9. A control apparatus for an internal combustion engine according to claim 6, wherein said controller makes the EGR rate in the intake air at the same engine load lower when an engine temperature of the internal combustion engine is equal to or lower than a predetermined temperature than when the engine temperature is higher than said predetermined temperature, wherein in said predetermined operation range, when the engine temperature of the internal combustion engine is equal to or lower than said predetermined temperature and the EGR rate in the intake air is made lower than when the engine temperature of the internal combustion engine is higher than said predetermined temperature, said controller performs said second fuel injection control by making the ratio of the fuel injection quantity in said second injection to the total fuel injection quantity higher than when the engine temperature of the internal combustion engine is higher than said predetermined temperature.

10. A control apparatus for an internal combustion engine according to claim 6, wherein when performing said second fuel injection control, said controller makes the ratio of the fuel injection quantity in the third injection to the total fuel injection quantity higher and said third injection time earlier when the EGR rate in intake air of the internal combustion engine is above the predetermined rate value as compared to the EGR rate is below the predetermined rate value.

11. A control apparatus for an internal combustion engine according to claim 6, wherein when performing said second fuel injection control, said controller makes the ratio of the fuel injection quantity in the second injection to the total fuel injection quantity higher and said second injection time later when the EGR rate in intake air of the internal combustion engine is below the predetermined rate value as compared to when the EGR rate is above the predetermined rate value.

* * * * *